United States Patent [19]

Ravizza

[11] 4,318,142
[45] Mar. 2, 1982

[54] AUTOMATICALLY COMPENSATED MOVABLE HEAD SERVO CIRCUIT AND METHOD

[75] Inventor: Raymond F. Ravizza, Cupertino, Calif.

[73] Assignee: Ampex Corporation, Redwood City, Calif.

[21] Appl. No.: 109,013

[22] Filed: Dec. 31, 1979

Related U.S. Application Data

[63] Continuation of Ser. No. 889,994, Mar. 23, 1978, abandoned.

[51] Int. Cl.³ .................... G11B 5/52; G11B 21/10
[52] U.S. Cl. ................................. 360/77; 360/70
[58] Field of Search ............... 360/77, 70, 71, 75, 360/109, 90, 130, DIG. 1; 310/331, 316, 332, 317, 130.23

[56] References Cited

U.S. PATENT DOCUMENTS

| | | | |
|---|---|---|---|
| 4,056,832 | 11/1977 | Boer et al. | 360/77 |
| 4,080,636 | 3/1978 | Ravizza | 360/77 |
| 4,093,885 | 6/1978 | Brown | 310/331 |
| 4,099,211 | 7/1978 | Hathaway | 360/77 |
| 4,143,405 | 3/1979 | Kubota | 360/77 |
| 4,148,083 | 4/1979 | Watanabe | 360/DIG. 1 |
| 4,163,994 | 8/1979 | Sakamoto et al. | 360/70 |
| 4,167,762 | 9/1979 | Hashizaki et al. | 360/70 |
| 4,172,265 | 10/1979 | Sakamoto et al. | 360/DIG. 1 |

FOREIGN PATENT DOCUMENTS 49-9919 1/1974 Japan.

Primary Examiner—Alfred H. Eddleman
Attorney, Agent, or Firm—Roger D. Greer; Ralph L. Mossino; Joel D. Talcott

[57] ABSTRACT

In an apparatus for automatically maintaining a transducing head assembly on the proper track, which is particularly adapted for a helical scan recording and/or reproducing apparatus capable of providing special motion effects, an automatically compensated movable head servo is disclosed. The apparatus is of the type which utilizes transverse positioning of the transducing head assembly to accurately follow a track during reproducing and, at the completion of the reproduction from the track, to properly position the head in position to either reproduce the next adjacent successive track, reproduce the same track or reproduce another track so that the appropriate special motion effect is achieved. Proper tracking is maintained by applying a small oscillatory motion to the head to cause it to vibrate laterally of the track, examining the resulting modulation of the reproduced signal's envelope to generate a tracking error correction signal and applying the error correction signal to the head assembly. The reference signal employed in the generation of the tracking error correction signal is automatically phase synchronized in response to the head vibrations to correct errors introduced to the tracking error signal as a result of phase changes introduced to the modulation of the reproduced signal's envelope by effects other than mistracking by the head.

4 Claims, 34 Drawing Figures

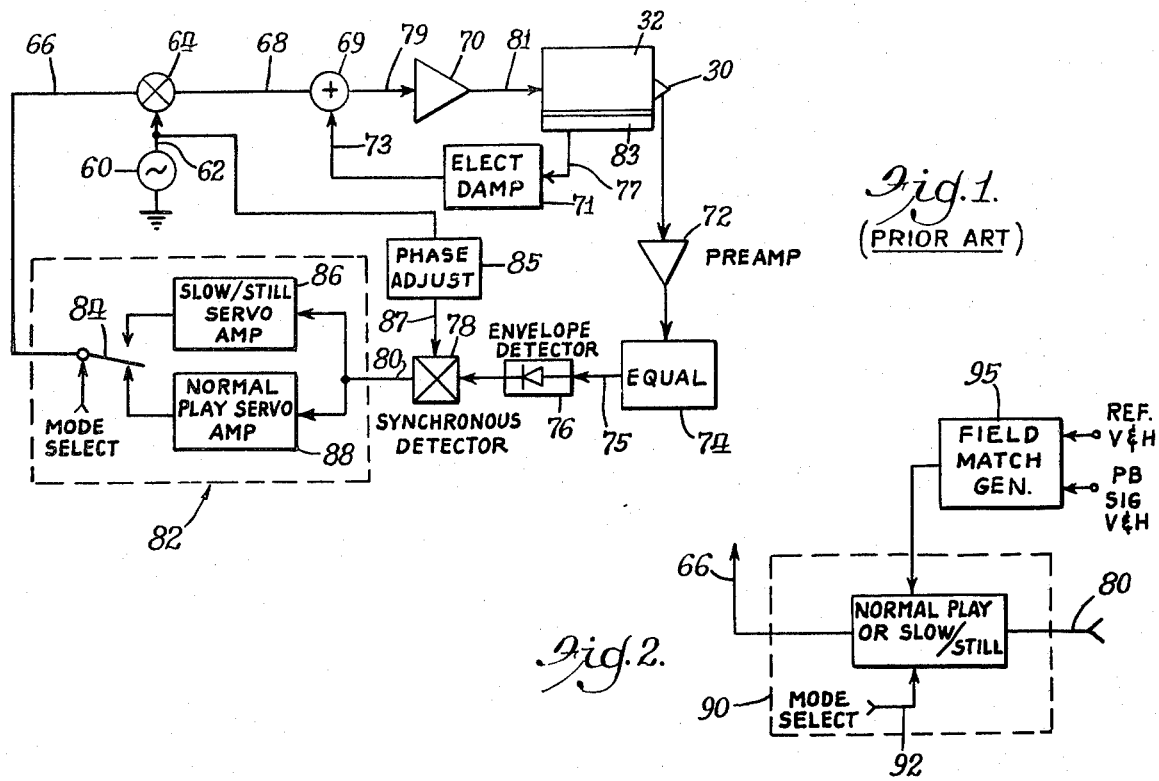
Fig. 1. (PRIOR ART)
Fig. 2.
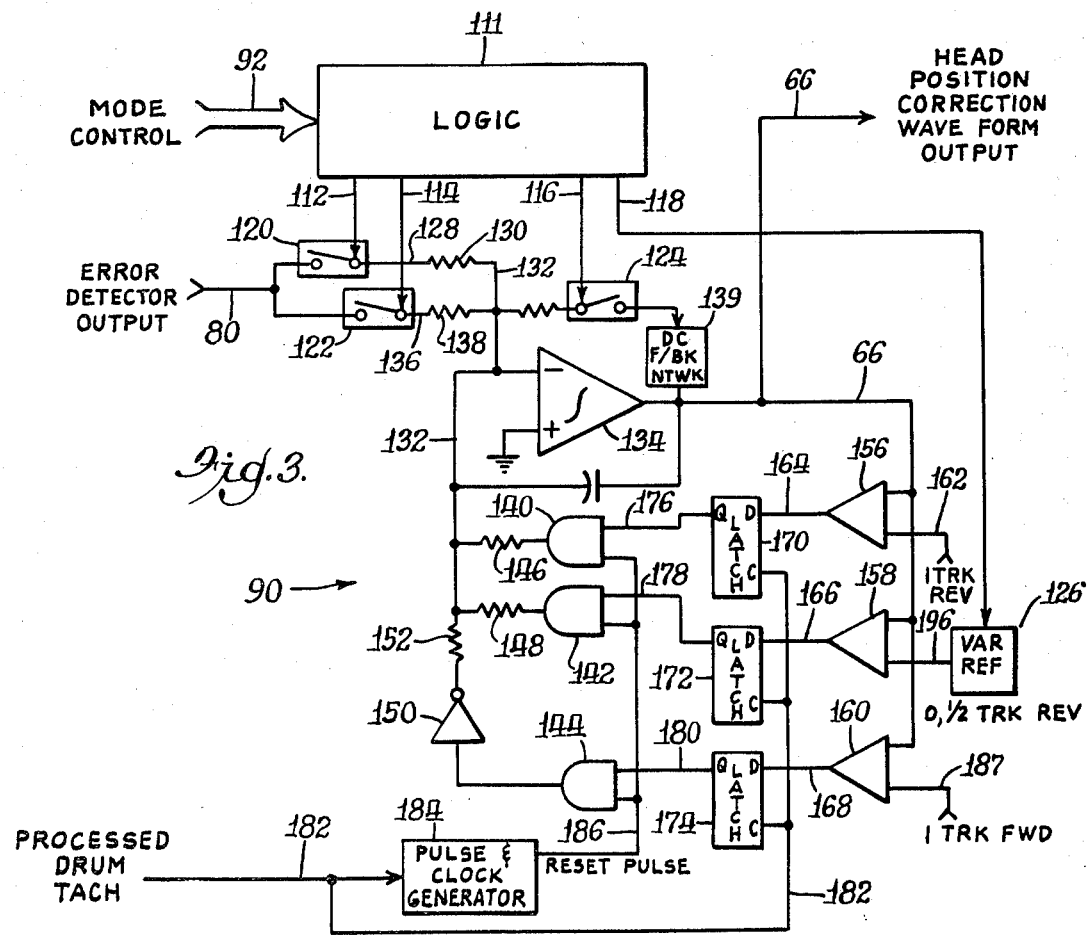
Fig. 3.

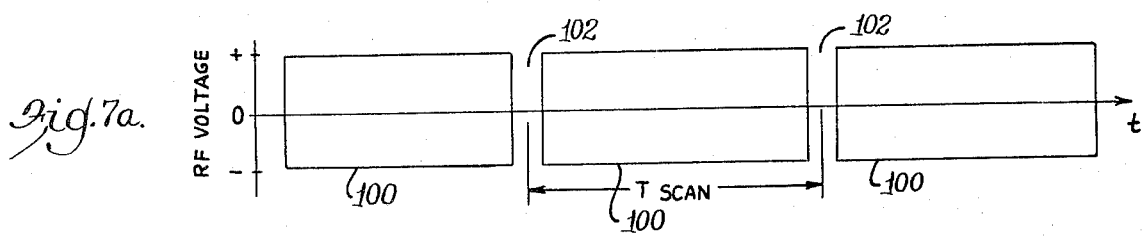
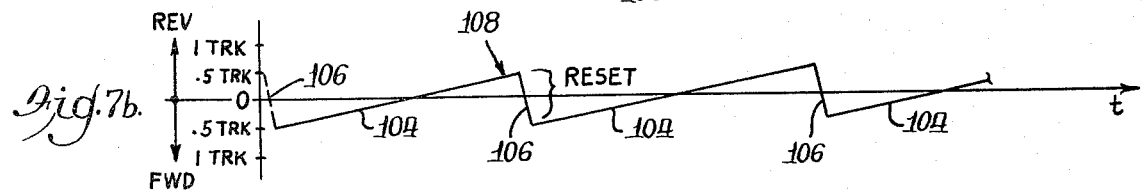
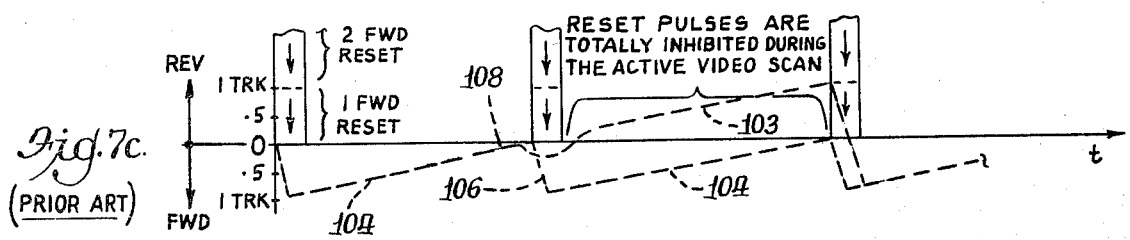
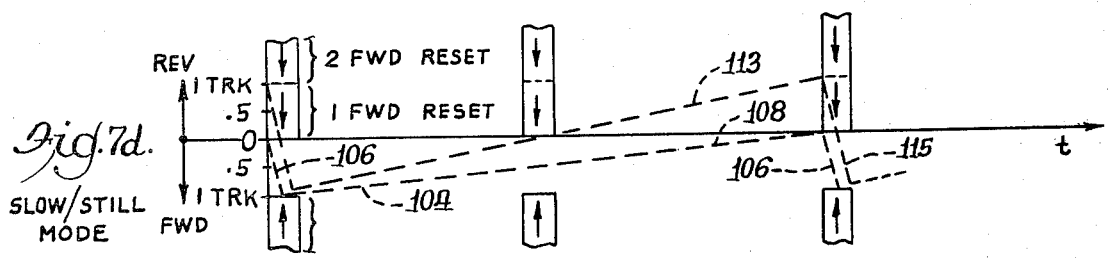
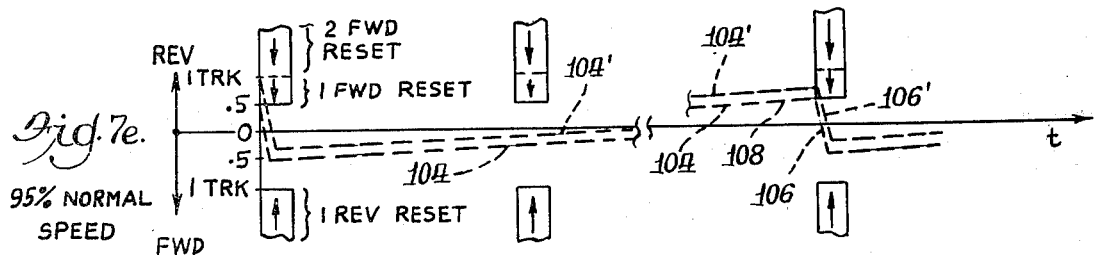
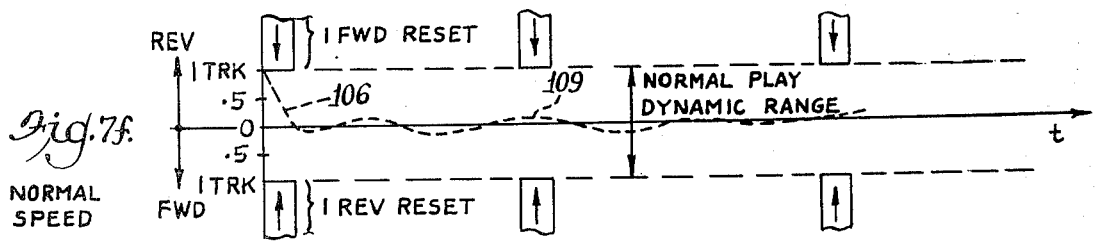
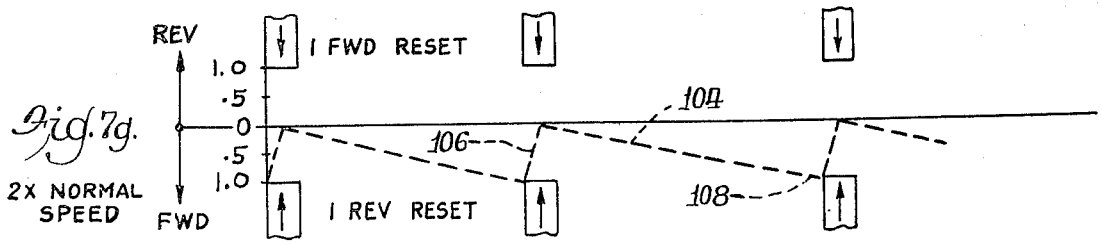

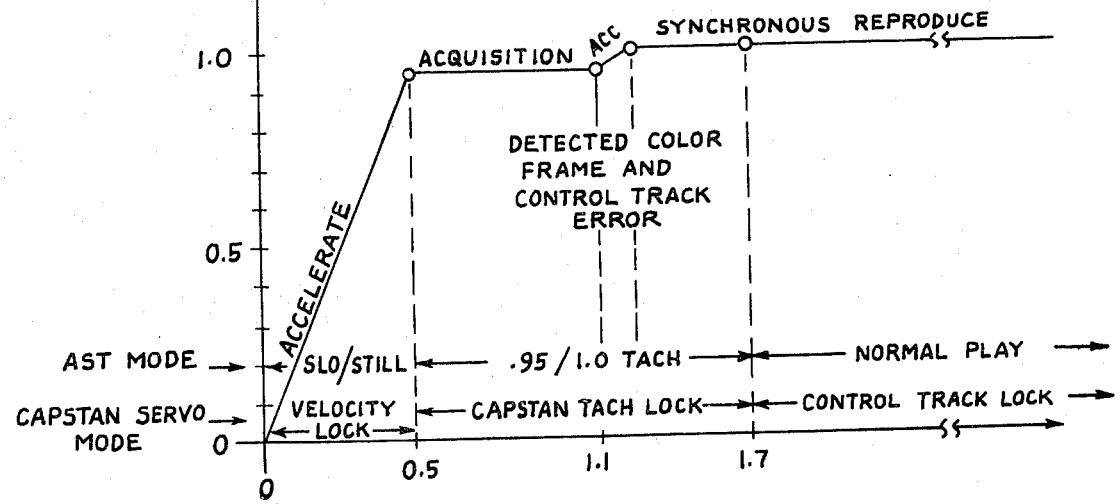
Fig. 9.
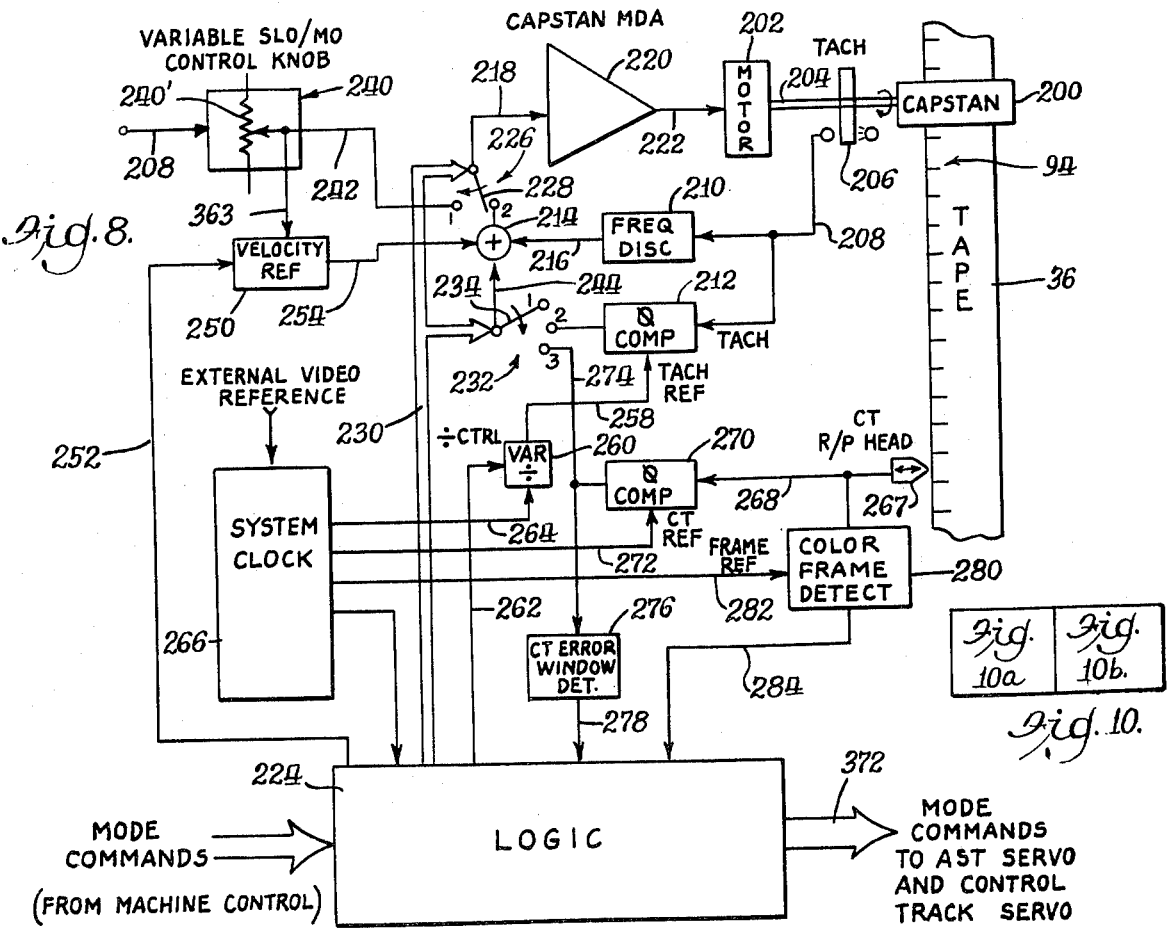
Fig. 8.
Fig. 10.

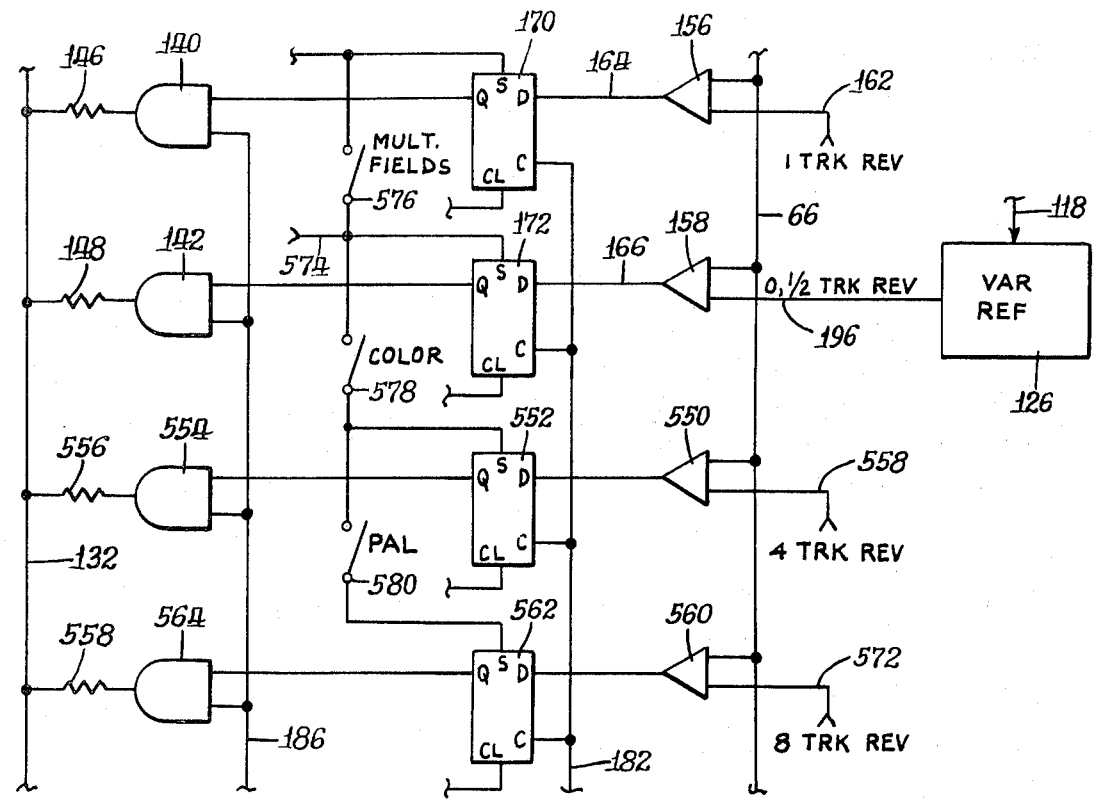
Fig. 10d.
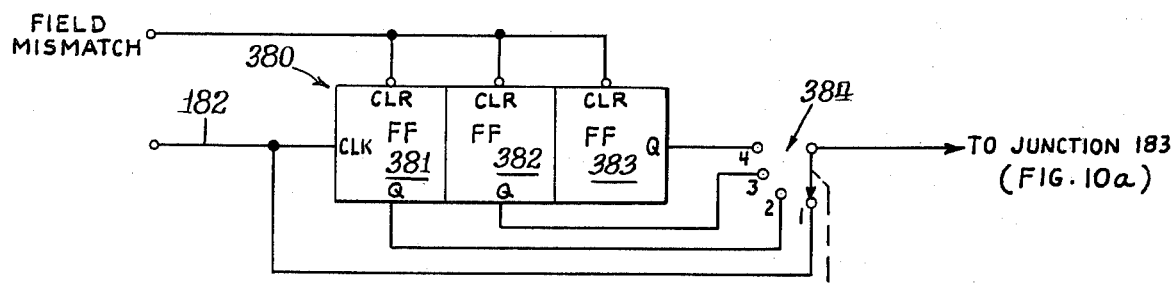
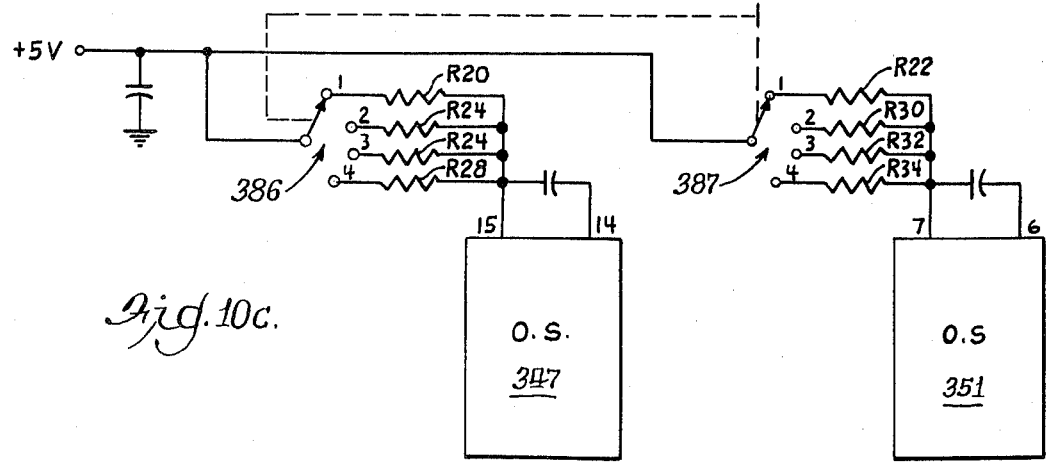
Fig. 10c.

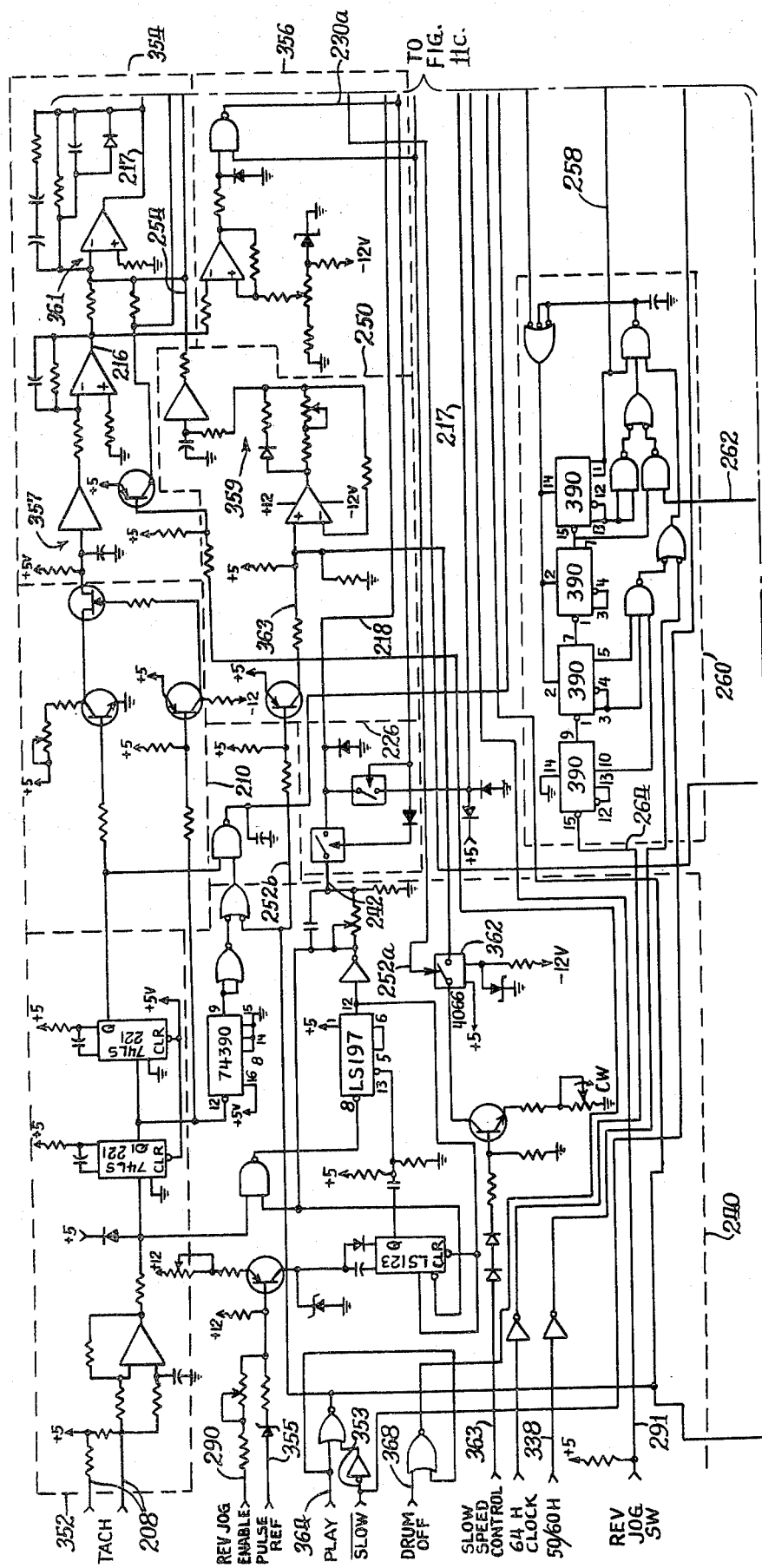

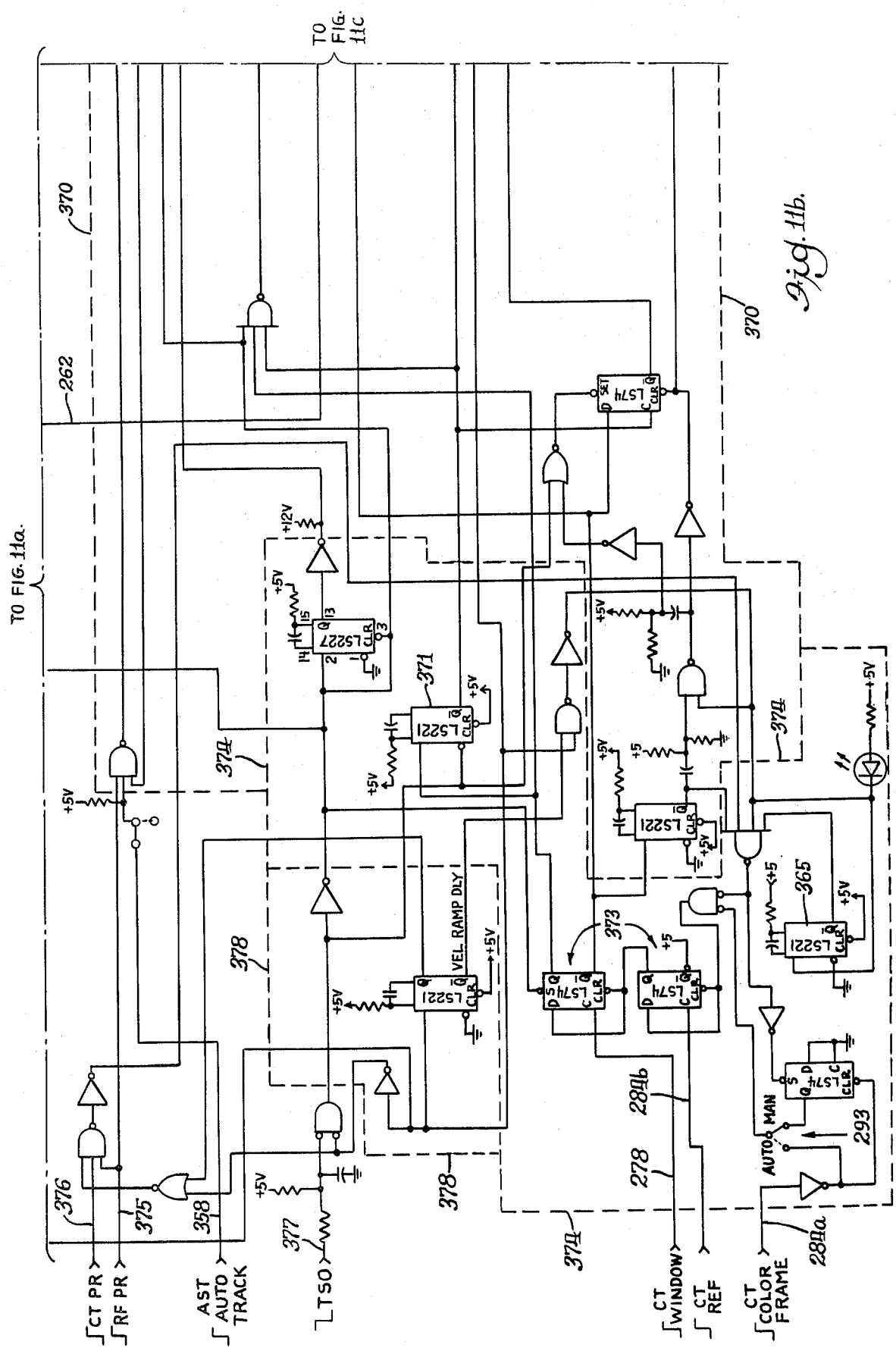

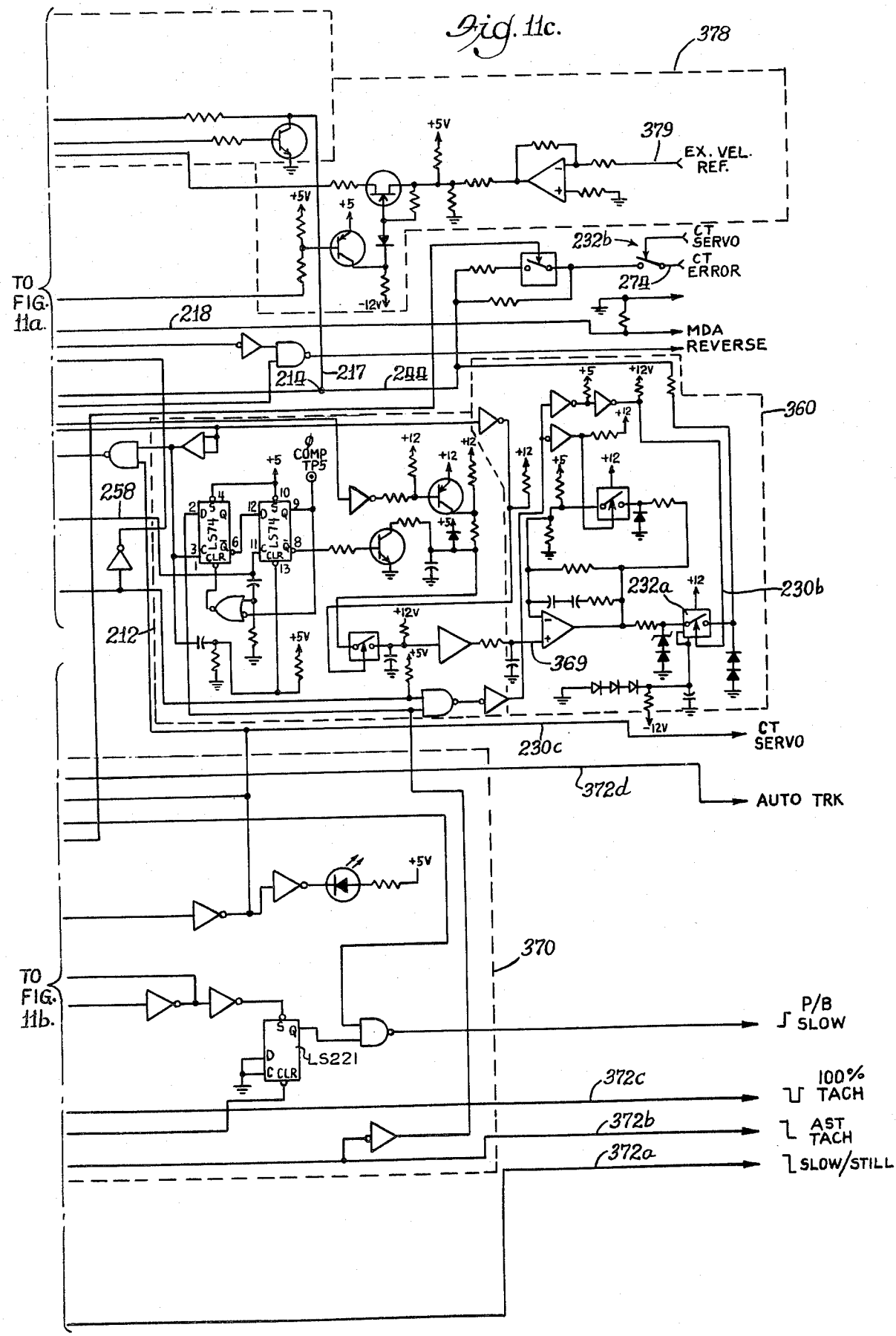

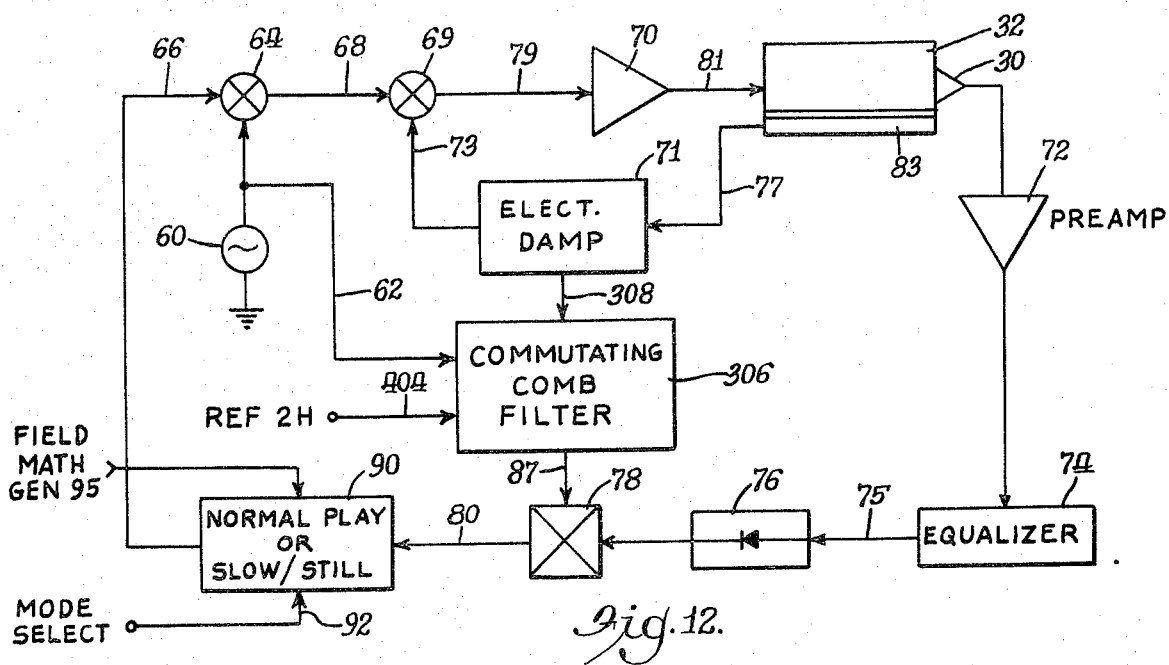
Fig. 12.
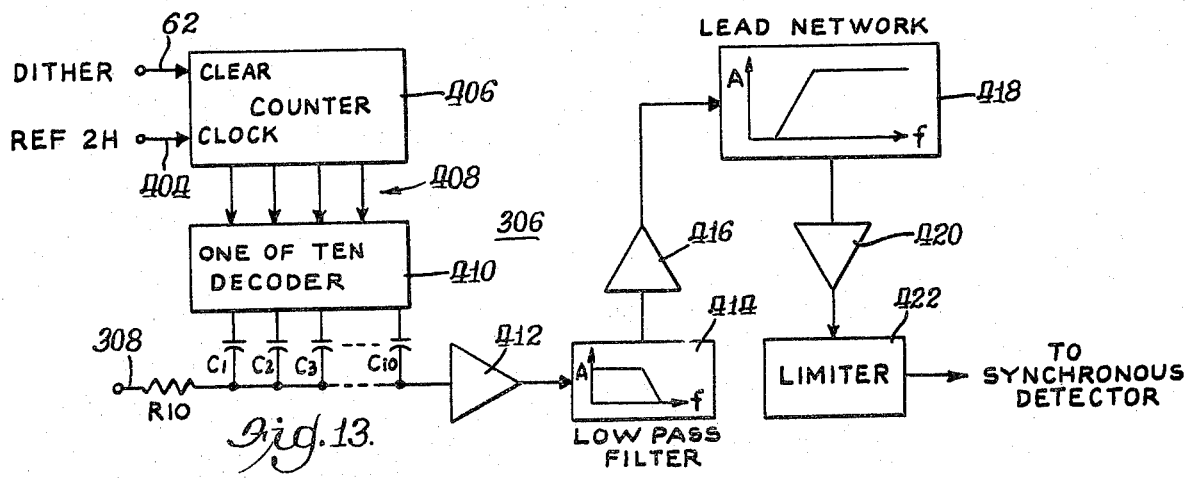
Fig. 13.
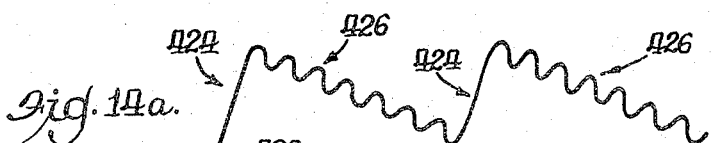
Fig. 14a.
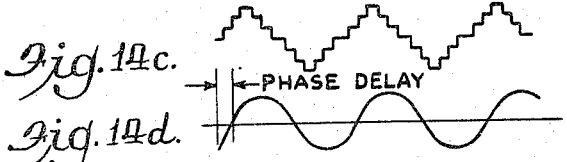
Fig. 14b.
Fig. 14c.
Fig. 14d.
Fig. 14e.
Fig. 14f.
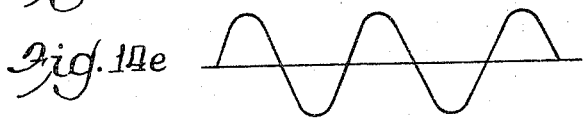
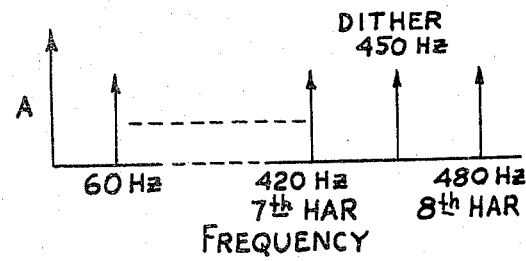
Fig. 15.

AUTOMATICALLY COMPENSATED MOVABLE HEAD SERVO CIRCUIT AND METHOD

This is a continuation application of Ser. No. 889,994, filed Mar. 23, 1978, now abandoned.

CROSS REFERENCE TO RELATED APPLICATIONS AND PATENTS

Hathaway et al., application Ser. No. 677,815, filed Apr. 16, 1976, entitled "Method and Apparatus for Producing Special Motion Effects in Video Recording and Reproducing Apparatus", and assigned to the same assignee as the present invention.

Ravizza, application Ser. No. 669,047, filed Mar. 22, 1976, now U.S. Pat. No. 4,151,570, entitled "Automatic Scan Tracking Using a Magnetic Head Supported by a Piezoelectric Bender Element", and assigned to the same assignee as the present invention.

Ravizza, application Ser. No. 677,828, filed Apr. 16, 1976, now U.S. Pat. No. 4,106,065, entitled "Drive Circuitry for Controlling Movable Video Head", and assigned to the same assignee as the present invention.

Ravizza, application Ser. No. 677,827, filed Apr. 16, 1976, now U.S. Pat. No. 4,080,636, entitled "System for Damping Vibrations in a Deflectable Transducer", and assigned to the same assignee as the present invention.

Brown, application Ser. No. 677,683, filed Apr. 16, 1976, now U.S. Pat. No. 4,093,885, entitled "Transducer Assembly Vibration Sensor", and assigned to the same assignee as the present invention.

Mauch, application Ser. No. 874,739, filed Feb. 3, 1978, entitled "Method and Apparatus for Controlling the Movement of a Recording Medium", now U.S. Pat. No. 4,224,645, and assigned to the same assignee as the present invention.

Ravizza, application Ser. No. 889,451, filed Mar. 23, 1978, now U.S. Pat. No. 4,163,993, entitled "Continuous Slow Motion Automatic Tracking System", and assigned to the same assignee as the present invention.

Ravizza, application Ser. No. 889,995, filed Mar. 23, 1978, entitled "Movable Head Automatic Position Acquisition Circuit and Method", and assigned to the same assignee as the present invention.

Ravizza, application Ser. No. 889,597, filed Mar. 23, 1978, entitled "An Automatically Calibrated RF Envelope Detector Circuit", now U.S. Pat. No. 4,197,564, and assigned to the same assignee as the present invention.

Ravizza, application Ser. No. 889,461, filed Mar. 23, 1978, entitled "Track Selection Method and Apparatus", now U.S. Pat. No. 4,215,362, and assigned to the same assignee as the present invention.

DESCRIPTION

The present invention generally relates to magnetic recording and reproducing apparatus, and more specifically to transducing head servo apparatus for accurately positioning a head relative a track it scans.

In the first five above-identified cross referenced related applications, and, particularly, the Hathaway et al., application, Ser. No. 677,815, recording and reproducing apparatus as well as methods are disclosed which represent significant improvements in achieving superior recording and reproducing of video signals whereby special motion effects are obtained. While the apparatus disclosed therein is applicable to various alternative types of equipment and is not limited to recording and reproducing video signals, the apparatus is advantageously adapted for recording and reproducing video signals on magnetic tape. This is because the apparatus can reproduce signals in a manner whereby normal speed reproducing, as well as special motion effects, such as slow and stop motion and faster than normal motion can be produced without experiencing a noise band or picture breakup in the video display.

There are many different formats that have been developed in magnetic tape recording and, as described in the above-identified Hathaway et al application, the recording format that results from transporting tape in a helix around a cylindrically shaped drum guide as it is scanned by a transducing head has exhibited many distinct advantages in terms of relative simplicity of the tape transport drive and control mechanism, the necessary electronics involved, the number of transducing heads in the apparatus, and the efficient use of magnetic tape in terms of the quanitity of tape that is required to record a given amount of information. By helically wrapping the tape around a drum guide, a single transducing head mounted on a rotating drum guide can be utilized for recording and reproducing information. When a single head is used in a helical scan tape recording apparatus, there are two widely used alternative configurations of guiding (i.e., wrapping) the tape around the cylindrical drum guide for scanning by the head. They are generally referred to as the alpha wrap and the omega wrap types of helical scan apparatus. Both wrap configurations involve guiding the tape generally in a helix around the drum guide with the tape exiting the drum surface at a different axially displaced position relative to its entry position. In other words, if the drum is vertically oriented, the tape leaves the drum surface either higher or lower than when it first contacts the surface. The video or other data information signals are recorded along discrete parallel tracks that are positioned at a small angle relative to the length of the tape so that a track length greatly exceeds the width of the tape. The angular orientation of the recorded tracks are a function of both the speed of the tape being transported around the drum guide as well as the speed of rotation of the scanning head. The resultant angle therefore varies depending upon the relative speeds of the rotating scanning head and the tape being transported.

It should be appreciated that the information signals are recorded on a tape at a predetermined angle that results from precise rotational scanning head and tape transport speeds, and that the subsequent reproducing of the information signal should be performed at these same speeds or the transducing head will not follow the track with precision. If the tape speed is changed during reproducing, i.e., it is reduced or even stopped, the transducing head will no longer precisely follow the recorded track and may cross onto an adjacent track. The failure to precisely follow the track in registry during playback results in cross tracking noise and other undesirable signal effects that appear in the represented information, such as the video picture, in the event video information is being reproduced. While various prior art systems have been proposed to reduce the undesirable effects due to the lack of precise head-to-track registry such systems have not been entirely successful even at speeds that are intended to be identical to those that were used during recording.

Helical tape recorders that are adapted to create special altered time base reference effects have not been particularly successful to date because of the spurious noise that is generated during playback due to the transducing head crossing from one track to another. For example, slow motion effects and video recording necessarily require that the data on a track, typically a full video field on each track, be repeated one or more times during playback so that the visual motion is slowed down. If data is recorded without redundancy, a track must be reproduced one or more times to accomplish this and hence the tape speed must be slowed. The resultant path that the transducing head follows along the tape during such reproduction processes will therefore be substantially different than the recorded track that was made during the recording process. A more extreme difference is found in stop motion or still frame operation, where the tape transport is stopped and the video head scans the same portion of the tape a number of times. During stop motion operations, the scanning head can cover a portion of the tape corresponding to that occupied by the two or more adjacent tracks of recorded information. To reduce the disturbing effects of noise bars in displayed video still frames, it has been the practice to adjust the tape position relative to the location of the scanning head so that the head begins and ends each tape scan in the guardbands adjacent to the desired track and scans the desired track during the intermediate interval of each tape scan. This places the visual disturbance noise bars at the top and bottom of the displayed video still frame, leaving the center of the displayed video relatively free of disturbing effects.

While techniques have been proposed to reduce or overcome the noise bar that is generated by crossing tracks, such techniques have not been particularly successful until the advent of the apparatus described in the first five above-identified cross referenced applications, particularly, Hathaway et al., Ser. No. 677,815. As is comprehensively set forth therein, the method and apparatus automatically positions a transducing head to accurately follow a desired path along a magnetic tape and to rapidly position the transducing head, if necessary, at the beginning of the path that is desired to be followed next. The next track that is to be followed, whether during reproducing or recording, is a function of the mode of operation that is selected. From the playback of video signals, the various modes may include a slow and still motion effect mode, a speeded up or fast motion effect mode, and a reverse motion effect mode. Other modes of operation may include skip field recording and compensation playback mode as well as a surveillance mode. In both of the latter modes, the period of time that can be recorded on a given length of tape is greatly increased by skipping one or a number of fields during the recording operation, such as recording every other field or one of every sixty fields, for example. The apparatus permits the tracks to be accurately followed even though the transport speed of the tape can vary within wide limits. In the event fast motion effects are to be achieved during playback of video signals, the transport speed of the tape must be increased and, conversely, for slow motion effects the transport speed must be slowed. For the stop motion effect, one field is typically reproduced many times over and, in such mode, the tape is not moving at all, the relative motion between the tape and the transducing head being supplied by the rotation of a rotating drum guide carrying the head. Changing the tape transport speed changed the angle of the path followed by the head along the tape. Consequently, if the video transducing head carried by the rotating drum guide is maintained in a fixed position relative to the drum, it can not exactly follow a previously recorded track when the transport speed of the tape is altered during reproduction relative to its speed during recording.

The apparatus disclosed in the first five above-identified cross-referenced applications employs means that move the transducing head transversely relative to the longitudinal direction of the tracks so that the head follows selected tracks along the magnetic tape and, thereafter, selectively alters or changes the position of the head after the head completes the scan of a selected track so as to correctly position the head to commence following another track. In the event the head is to follow the next adjacent downstream track, the head would be in the correct position to begin following it at the completion of the scan of a previously selected track. It should be understood that one complete revolution of the transducing head causes the head to scan a track at a predetermined angular orientation relative to the length of the tape and, at the end of the revolution, the movement of the tape causes the head to be gradually displaced a predetermined distance downstream of the tape in position to begin scanning the next adjacent track. In this manner, the head, for example, during recording operations, records information along tracks that are parallel to one another and, assuming the transport speed of the tape and the speed of rotation of the scanning head are maintained constant, the tracks will have a constant spacing relative to adjacent tracks, i.e., the center to center distance between adjacent tracks will be substantially constant in the absence of geometric errors. Geometric errors are introduced by temperature or humidity induced dimensional changes of the tape, by faulty tensioning mechanism in the tape transport that causes stretching of the tape, or by imperfect control of the relative head to tape speed. During normal speed playback operations, i.e., the tape is being moved and the head is being rotated at the same speeds as they were during the recording operation, the scanning head will follow a track during a single revolution and be in position to begin following the next adjacent downstream track during the next revolution. Furthermore, each track will be followed once and produce unaltered time base effects as would be expected, such as normal speed visual effects of recorded video information. In the event it is desired to produce a still frame or stop motion effect, the transport of the tape is stopped and one recorded track is typically repeated indefinitely. In this mode of operation, the transducing head will be continuously deflected to follow the track from beginning to end and, at the end, the head will be reset in the direction opposite the direction it has been deflected to position it at the beginning of the same track. The distance that the head is deflected from its normal path as it scans the track, and subsequently reset, is equal to the center to center spacing between adjacent tracks. Thus, by continuously deflecting the head to follow a track, resetting the head and deflecting the head again to follow the same track, a single field is repetitively reproduced, thereby permitting a stop motion or still frame visual picture to be displayed. This will be more comprehensively described herein with respect to certain figures of the drawings, and is comprehensively described in the aforementioned Hathaway et al. application, Ser. No. 677,815.

The apparatus described in the Hathaway et al application represents a significant improvement over other tape recorders in that it is capable of producing special motion effects, such as slow motion and still frame motion as well as regular motion, all of which can be carried out without the typically experienced disturbing noise bar occurring in the display of the video picture during playback. Thus, when the apparatus is operating in any of its modes, it will reliably operate and produce noise free reproductions of the signal information recorded on the tape. However, if for any reason the transducing head assembly is changed, thereby changing the natural resonant frequency thereof, it may be necessary to readjust the control circuitry for the head assembly following each such change.

Accordingly, it is an object of the present invention to provide an improved recording and/or method and apparatus that is capable of operating in various signal reproducing modes, including slow/still motion mode, reverse mode, and regular motion mode and which is uniquely adapted to automatically correct errors introduced to the head tracking error signal by effects other than actual mistracking by a transducing head.

Yet another object of the present invention is to provide a method and circuitry for automatically compensating for any changes in the natural resonant frequency of the transducing head assembly of the improved recording and/or reproducing apparatus described hereinbelow.

Other objects and advantages will become apparent upon reading the following detailed description, while referring to the attached drawings, in which:

FIG. 1 is an electrical block diagram illustrating automatic tracking control circuitry in a recording and reproducing apparatus, as generally disclosed in the aforementioned Hathaway et al cross referenced application, Ser. No. 677,815;

FIG. 2 is a block diagram of circuitry embodying the improved recording and/or reproducing apparatus, the portions shown in the dotted line box being adapted for substitution in the circuitry shown within the dotted line box of FIG. 1;

FIG. 3 is a more detailed electrical block diagram of the circuitry shown in FIG. 2;

FIG. 7a is a diagram illustrating the voltage amplitude versus time characteristic of a typical RF envelope and having time exaggerated drop out areas, which diagram may be produced using the drum and head assembly shown in FIGS. 4 and 5 on the magnetic tape shown in FIG. 6;

FIG. 7b is a diagram illustrating a typical voltage waveform that may be produced to provide the desired head deflection of the reproduce head shown in FIGS. 4 and 5 when the apparatus is in the slow/still mode and the transport of the tape is stopped;

FIG. 7c is a diagram of the time versus amplitude of the head deflection waveform for the slow/still motion mode and illustrates the operation of circuitry disclosed in the aforementioned Hathaway et al application, Ser. No. 677,815;

FIG. 7d is a diagram of time versus amplitude of the head deflection waveform for a slow motion operation and illustrates the operation of circuitry incorporated in the improved apparatus, when in the slow/still motion mode;

FIG. 7e is a diagram of time versus amplitude of the head deflection waveform for a slow motion operation and illustrates the operation of circuitry embodying the improved apparatus when in the 95% of normal speed mode;

FIG. 7f is a diagram of time versus amplitude of the head deflection waveform during acquisition of the proper track and for a subsequent normal speed operation and illustrates the operation circuitry of the improved apparatus when in the normal speed mode of operation;

FIG. 7g is a diagram of time versus amplitude of the head deflection waveform for a 2 times normal speed operation and illustrates the operation of circuitry embodying the improved apparatus when in the 2 times normal speed mode.

FIG. 8 is a block diagram of the capstan and control track servo circuitry portion of the improved apparatus;

FIG. 9 is a diagram illustrating the tape velocity versus time profile that is produced by the capstan and control track servo circuitry shown in FIG. 8;

Figure 10A:
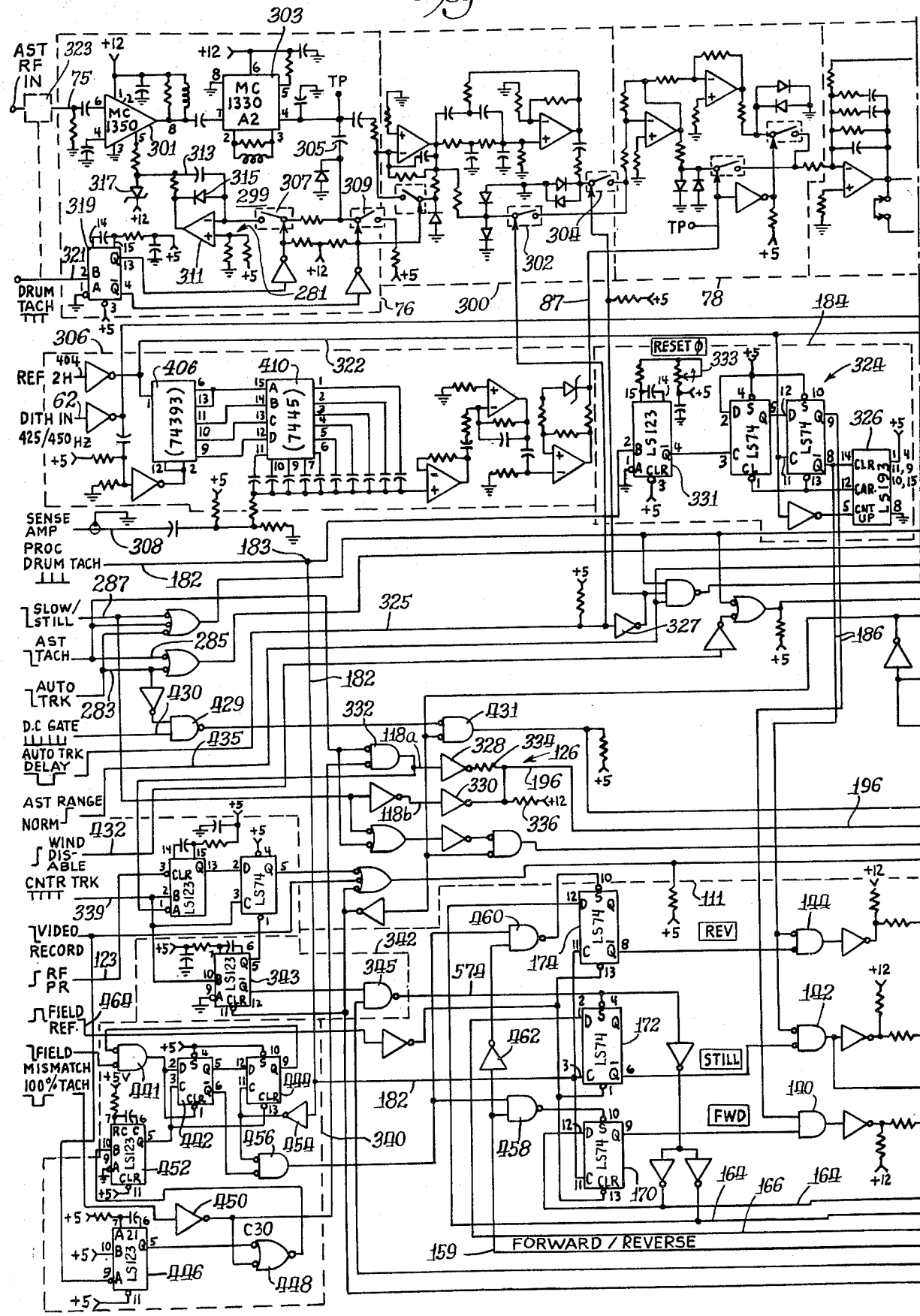
FIG. 10 is a unitary diagram illustrating orientation of the sheets containing FIGS. 10a and 10b.
Figure 10B:
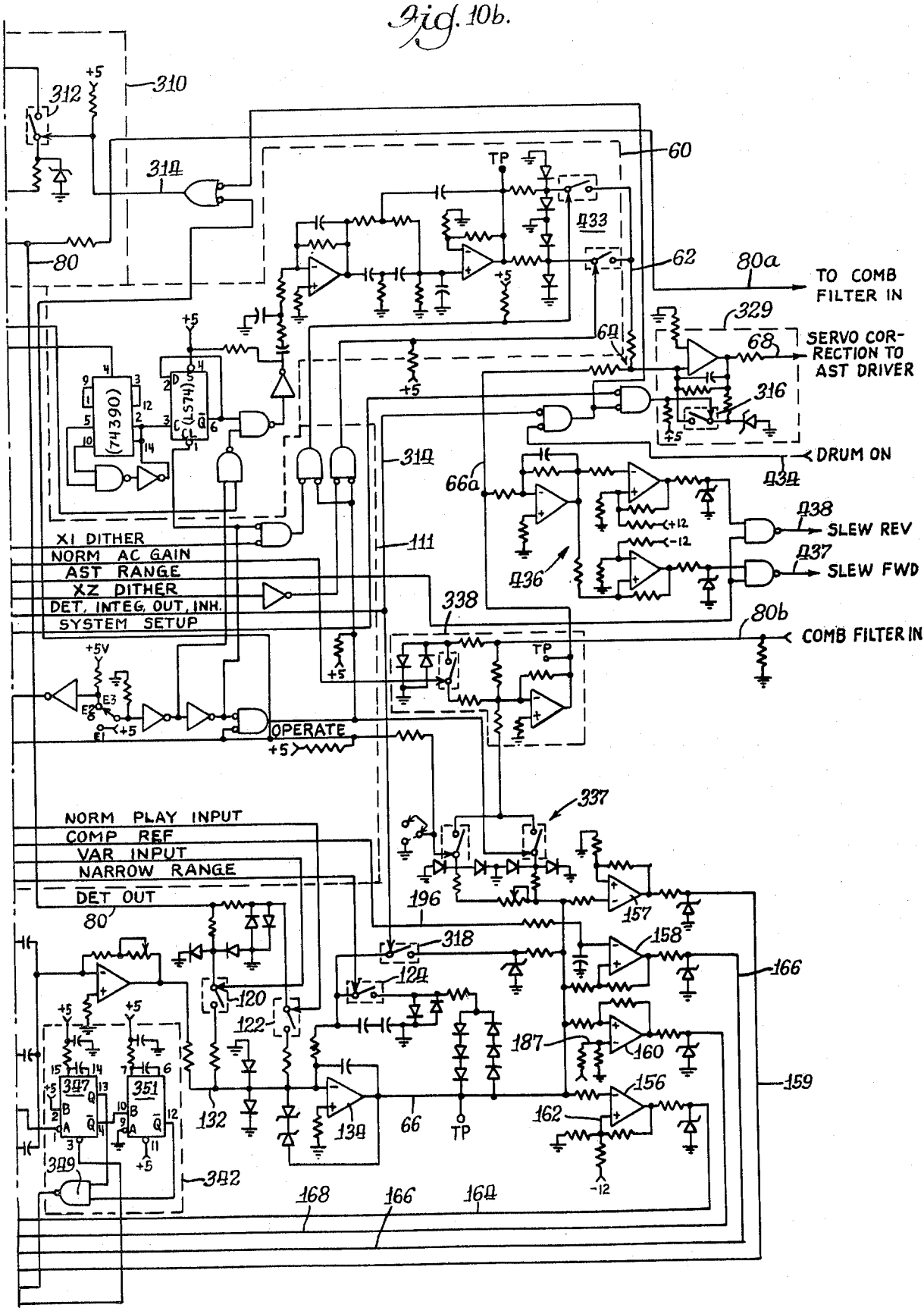
Figure 16:
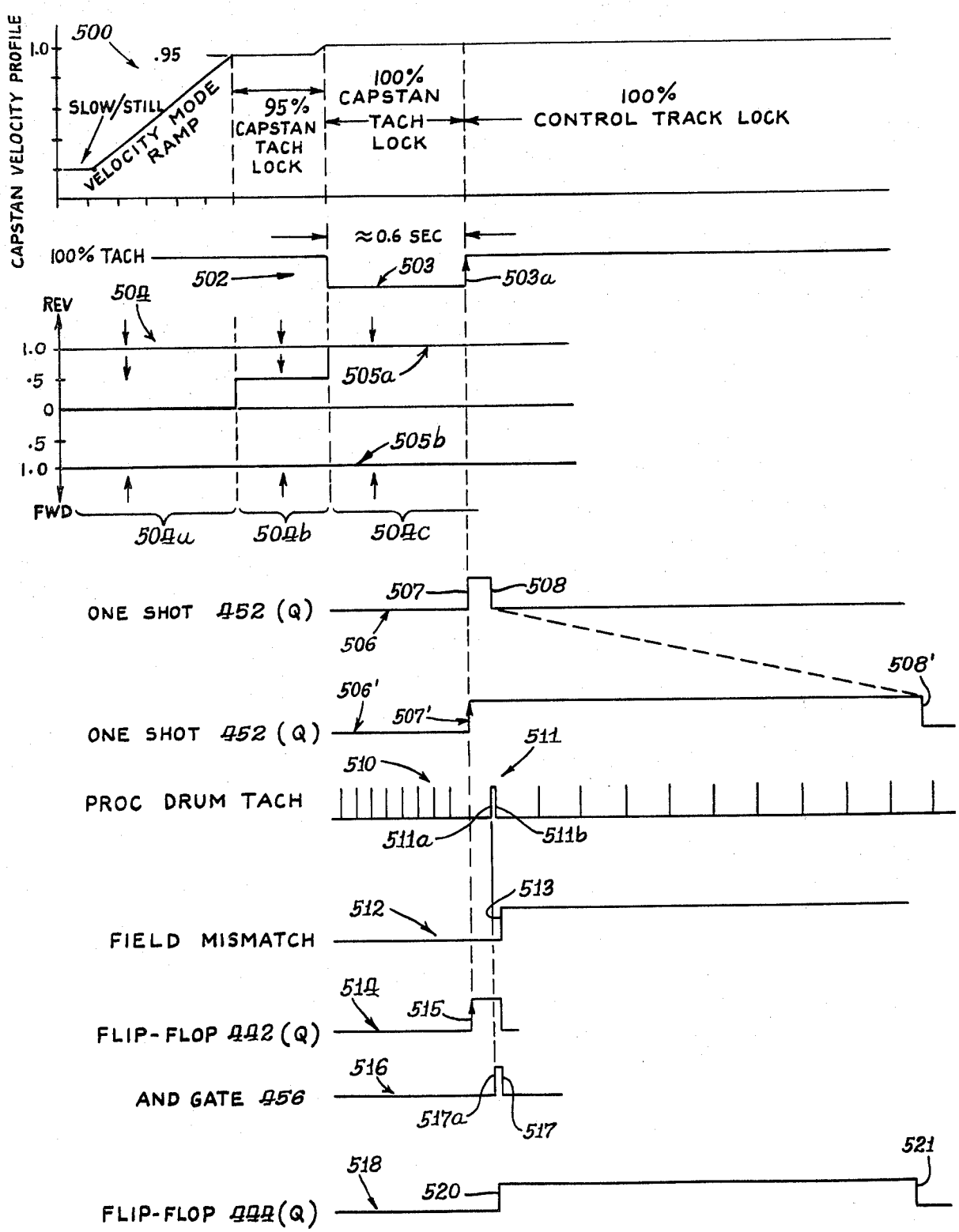

FIGS. 10a and 10b together comprise a detailed electrical schematic diagram illustrating circuitry that may be used to carry out the operation of the block diagram of FIG. 3 as well as certain portions of the block diagram shown in FIG. 1;

FIGS. 10c and 10d illustrate electrical schematic diagrams of modifications of the circuitry shown in FIGS. 10a and 10b that may be used to control still frame modes during which more than one television field is reproduced to generate still frame displays;

FIG. 11 is a unitary diagram illustrating orientation of the sheets containing FIGS. 11a, 11b and 11c;

FIGS. 11a, 11b and 11c together comprise a detailed schematic diagram of circuitry that can be used to carry out the operation of the capstan servo circuitry portion of the block diagram shown in FIG. 8;

FIG. 12 is an electrical block diagram illustrating the automatic tracking control circuitry in a recording and/or reproducing apparatus employing the present invention;

FIG. 13 is a schematic block diagram of the automatically compensated movable head servo;

FIGS. 14a–14f are timing diagrams illustrating operation of the movable head servo shown in FIG. 13;

FIG. 15 is a frequency spectrum diagram illustrating selection of the dither frequency so as to avoid spectrum overlap; and FIG. 16 is a timing diagram illustrating operation of the track selection logic.

Before describing the method and apparatus that embodies the present invention, the environment in which the present invention can be utilized will initially be broadly described so as to provide a better understanding of the present invention. While the aforementioned Hathaway et al application, Ser. No. 677,815, as well as Ravizza application, Ser. No. 669,047, now U.S. Pat. No. 4,151,570, comprehensively set forth the background and the environment to which the present invention can be applied, a brief description of the environment will be set forth herein. Also, while the present invention is particularly adapted for use with helical scan types of video tape recorders for automatically providing continuous adjustment of the position of the transducing head thereof with respect to only head mistracking errors, it should be understood that the present invention is not limited to helical recorders and may be used with quadrature, segmented helical, arcuate and other types of rotary scan video tape recorders. In addition, the present invention is suited for use with various tape recording formats characteristic of the various rotary scan tape recorders. Furthermore, the present invention is not limited to use in rotary scan tape recorders designed for processing video signals. It is contemplated that the present invention will find utility in any application where it is desired to record or reproduce, i.e., transfer information with respect to a tape recording medium without the introduction of disturbing transients into the transferred information while the relative head-to-tape speed undergoes changes.

Figure 4:
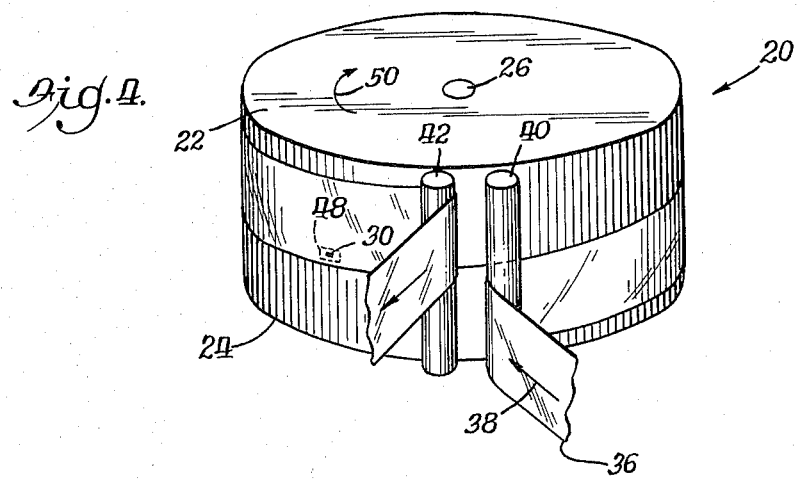
FIG. 4 is a perspective view of the helical tape guide and scanning head assembly portion of an omega wrap helical scan recording and/or reproducing apparatus which is simplified for the sake of clarity.
Figure 5:
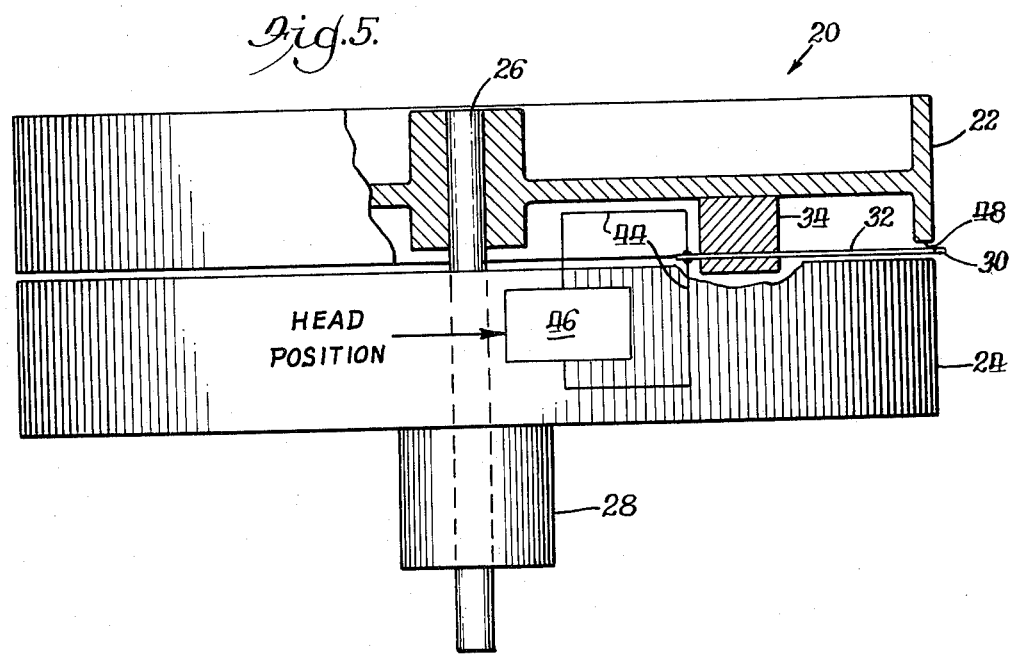
FIG. 5 is a side elevation of the drum tape guide and scanning head assembly shown in FIG. 1, with portions removed and partially in cross section.

Turning now to the drawings, and particularly FIGS. 4 and 5, there is shown a helical video scanning head and cylindrical tape guide drum assembly indicated generally at 20, with FIG. 5 showing portions broken away. The head-drum assembly 20 is shown to comprise a rotatable upper drum portion 22 and a stationary lower drum portion 24, the upper drum portion 22 being fixed to a shaft 26 which is rotatably journaled in a bearing 28 that is mounted on the lower drum 24, the shaft 26 being driven by a motor (not shown) operatively connected thereto in a conventional manner. The head-drum assembly 20 has a video transducing head 30 carried by the rotatable drum portion 22 and is shown to be mounted on an elongated movable support element 32 that is in turn mounted at one end in a cantilever type support 34 that is fixed to the upper drum portion 22. The element 32 is preferably of the type that flexes or bends in a direction transversely of the recorded track with the amount and direction of movement being a function of the electrical signals that are applied to it.

As is best shown in FIG. 4, the head-drum assembly 20 is part of a helical omega wrap video tape recorder which has the magnetic tape 36 advancing toward the lower drum 24 in the direction of the arrow 38 as shown. More specifically, the tape is introduced to the drum surface from the lower right as shown in the drawing and is fed around a guide post 40 which brings the tape into contact with the outer surface of the stationary lower drum portion 24 whereupon the tape travels substantially completely around the cylindrical drum tape guide until it passes around a second guide post 42, which changes the direction of the tape as it exits the head-drum assembly 20.

Figure 6:
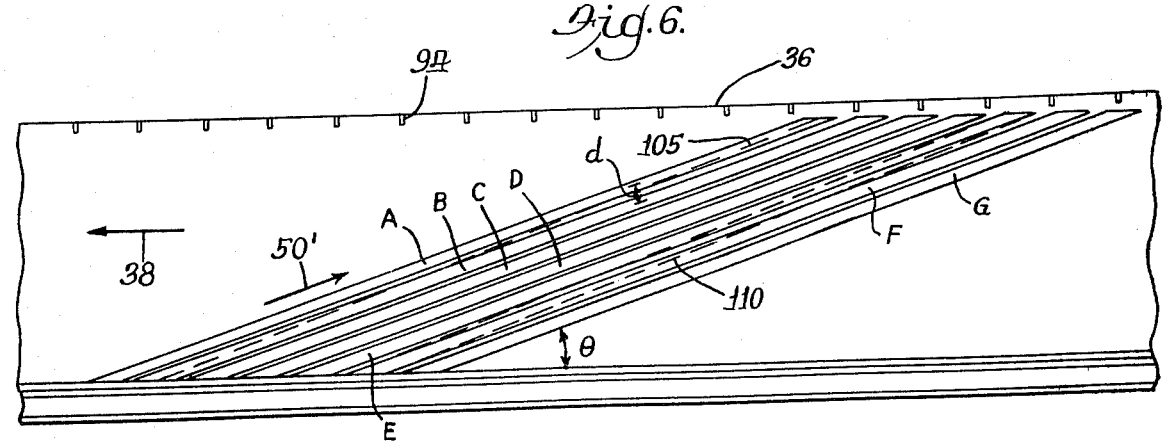
FIG. 6 is an enlarged segment of magnetic tape having tracks A-G recorded thereon.

As is best shown in FIGS. 4 and 6, the configuration of the tape path is such that the tape 36 does not contact the guiding drum surface over a full 360 degree rotation because of the clearance that is required for entrance and exit of the tape. This gap preferably does not exceed a drum angle of more than about 16 degrees which has the effect of creating a drop out interval of information. In the case of recording video information, the occurrence of the drop out is preferably chosen relative to the video information being recorded so that the information that is lost does not occur during the active portion of the video signal and, in the case of recording and reproducing video signals, so that the start of the scan of a track can be properly field synchronized to the video signal.

The transducing head 30 is mounted upon the elongated movable, preferably flexible, element 32 which may comprise an elongated two layer element (sometimes referred to as a bimorph) that exhibits dimensional changes in the presence of an electric or magnetic field. The deflectable, movable element 32 is effective to move the transducing head 30 mounted thereto in a vertical direction as shown in FIG. 5 in accordance with the electrical signals that are applied through conductors 44 from the automatic head tracking servo circuitry schematically illustrated by block 46. The head 30 is mounted to extend slightly beyond the outer surface of the rotating drum portion 22, the head extending through an opening 48 in the outer surface thereof. The movable element 32 is adapted to sweep or bend and displace the transducing head along a path that is transverse to the direction of relative motion of the head 30 with respect to the magnetic tape 36, i.e., transverse to the direction of the recorded tracks.

If the transport speed of the magnetic tape 36 is changed during the reproducing of recorded information, relative to the speed at which the information was recorded on the tape, then the angle of the path scanned by the head 30 relative to the length of the tape 36 is changed and head positioning error correcting signals will be produced for the purpose of having the transducing head follow the track of recorded information which is at the different angle. Since the movable element 32 is movable in either direction, the tape can be transported around the tape guide drums 22, 24 at either a faster or slower speed relative to the recording speed and the movable element can position the head 30 to follow the recorded track for either condition.

Referring to FIG. 6, there is illustrated a segment of magnetic tape 36 having a number of tracks A–G thereon as may be recorded by the transducing head 30 as the tape is transported about the guide drums 22, 24 shown in FIG. 4. The segment of tape is shown to have an arrow 38 which illustrates the direction of tape movement around the drum and an arrow 50 which shows the direction of the scanning head movement relative to the tape. Thus, when the upper portion 22 rotates in the direction of the arrow 50 (FIG. 4), the transducing head 30 moves along the tape in the direction of the arrow 50' shown in FIG. 6. With a constant transport speed of the tape 36 and angular velocity of the rotating drum portion 22, tracks A–G will be substantially straight and parallel to one another at an angle $\theta$ (of about 3, for example) relative to the longitudinal direction of the tape, with each rightward track shown in the drawing being successively produced during a recording operation. Since track B, for example, would be recorded immediately after track A was recorded during constant drum and head rotation and tape transport speeds, it should also be appreciated that if these speeds are maintained during the reproducing or playback operation, the transducing head 30 would play back track B during a successive revolution immediately after having reproduced the information from track A.

If conditions were ideal and no tape transport disturbance was introduced, then the transducing head 30 would simply successively follow the adjacent tracks without adjustment, because no error signals would be produced for transversely moving the transducing head 30 relative to the track. Stated in other words, the transducing head is automatically in position to begin reproducing the subsequent track B after completing the reproducing of the information from track A. It should also be appreciated that even if the tape transport speed is varied during reproducing relative to the tape transport speed during recording and the head is transversely moved to maintain accurate head tracking during reproduction of the track, then at the end of the head's scanning of a track being reproduced, the head is nevertheless in a position to begin reproducing the next adjacent downstream track, i.e., track B in the event reproduction of track A was completed. This occurs even when the tape is stopped or is traveling slower or faster than the transport recording speed.

To achieve special motion and other effects during reproduction of the information signals that are recorded on a tape, it is necessary to vary or adjust the transport speed of the tape past the location of the scanning head, hence, around the tape guide drums 22, 24 in the illustrated embodiment. To produce a speeded up or fast motion effect, the transport speed is increased during reproducing relative to that which was used during the recording process. Similarly, to produce slow motion effects, it is necessary to reduce the speed of the transport tape around the tape guide drums during reproducing relative to that which was used during the recording process. In stop motion modes the tape is stopped during reproducing so that the rotating transducing head 30 can repetitively reproduce the signals, typically from a single recorded track.

The apparatus disclosed in the aforementioned Hathaway et al application, Ser. No. 677,815, can be placed in different modes of operation wherein either forward or reverse motion effects are achieved and the motion can be speeded up or slowed down by simply adjusting the transport speed of the tape in such forward or reverse directions to obtain the desired speed of motion upon reproducing the recorded information. Once a motion direction is chosen, the apparatus effectively automatically positions the transducing head to follow a track from beginning to completion and to thereafter adjust the position of the transducing head (if adjustment is needed) to the beginning of the proper track. The apparatus automatically provides for transversely moving or resetting the transducing head 30 at the end of the head scan of a track to a position corresponding to the start of a track other than the next successive adjacent track under certain predetermined conditions and not transversely moving or resetting the transducing head under other conditions. The decision to transversely adjust the position of the transducing head depends upon the mode in which the apparatus is operating and whether the amount of transverse movement is within the predetermined limits that can be achieved. If the transducing head 30 is deflected the maximum amount in one direction permitted by the movable element 32, it cannot be moved further in that direction. The total range of movement shall be within the practical limits determined by the characteristics of the movable element 32.

When the apparatus is in the slow motion or still frame mode of operation, the transducing head 30 may be required to be reset at the completion of the scan by the head of the track being reproduced depending upon whether the deflection of the transducing head reaches the predetermined threshold limits set for the displacement of the element 32 at the completion of a track. When the tape 36 is stopped so as to provide still frame or stop motion, the transducing head 30 is typically reset at the completion of the scan by the head of the track being reproduced and is thereby reset to the beginning of that track so that its scan can be repeated by the head as many times as is required for the duration of the display of the scene. Thus, the information recorded in the track is effectively reproduced over and over since the tape 36 is stationary. Since the transducing head 30 is deflected in the reverse direction relative to the direction the tape is transported during a record operation to follow the track during each repeating reproduction, the total deflection in the reverse direction being equal to the track center to track center spacing, d, of the recorded tracks, the head 30 must be reset a corresponding distance in the opposite, or forward direction at the completion of the scan of the track in order to be correctly positioned to rescan the same track. Since the angle of the path followed by the head 30 relative to the tape 36 is different when the tape is stopped from the angle of recorded tracks, the position of the head is also gradually being adjusted in the axial direction of the head-drum assembly 20 through the course of reproducing the information signal on a track. Thus, as the scanning head 30 moves along the track, the head positioning error correcting signals cause it to be moved transversely to maintain head to track registry and the head is reset at the end of its scan of the track essentially one track transverse distance, d, in order to be in position for beginning the rescan of the same track.

To maintain the transducing head 30 in registration with the track as it follows a track during a revolution of the rotating drum 22, a servo circuit is used which produces an error correcting signal that is preferably a low frequency or changing DC level and is produced by apparatus such as disclosed in the aforementioned Ravizza application, Ser. No. 669,047. As the head 30 scans a track, the error signal causes the head to be adjusted so as to follow the track regardless of the speed of tape transport, provided it is within the limits of movement of the element 32.

Referring to FIG. 1, which illustrates a block diagram of circuitry generally embodying the apparatus described in the aforementioned Ravizza U.S. Pat. No. 4,151,570 and Hathaway et al application, Ser. No. 677,815, a dither oscillator 60 applies a sinusoidally varying signal of frequency $f_d$ on line 62 that is coupled to a summing circuit 64, where it is added to a DC error correction signal from line 66. The output of the summing circuit 64 is applied on line 68 to a second summing circuit 69 where it is added to the damping signal provided by an electronic damping circuit 71 over line 73, such as disclosed in the aforementioned Ravizza U.S. Pat. No. 4,080,636. As described in that Ravizza application, extraneous disturbing vibrations in the movable element 32 are detected by the electrically isolated sense strip 82 proximate an edge of the piezoelectric transducer located on one side of the movable element. The sense strip 83 longitudinally extends along the movable element 32 and is constructed in the manner described in the aforementioned Brown U.S. Pat. No. 4,093,885. The sense strip 83 generates a feedback signal representative of the instantaneous deflection velocity of the movable element and applies the signal to line 77 extending to the input of the electronic damping circuit 71.

The electronic damping circuit responsively generates a damping signal of the proper phase and amplitude for application to the movable element to oppose and, thereby dampen the extraneous disturbing vibrations present therein. The combined error correction signal and damping signal provided by the second summing circuit 69 is coupled by the line 79 to the input of a drive amplifier 70 which then provides a signal over a line 81 to the piezoelectric movable element 32 carrying the transducing head 30. The dither drive signal causes the movable element 32 to impart a small peak-to-peak oscillatory motion (dither) to the head 30 to cause the head to move laterally relative to the track alternately between limits as it scans longitudinally along the track to reproduce the recorded signal. The oscillatory motion imparted to the head 30 causes an amplitude modulation of the reproduced signal which, when recording video or other high frequency signals, is in the form of an RF envelope of a frequency modulated carrier. The oscillating motion of the movable element 32 produces an amplitude modulation of the RF envelope. If the head is located in the center of the track, only even harmonic amplitude modulation components of the dither signal are produced on the RF envelope by the action of the movable element 32, because the average head position is at track center and the RF envelope variation caused by dithering appears as a symmetrical function. With the head 30 at track center, the amplitude of the RF produced from the tape is maximum. As the head 30 moves to either side of track center during each half cycle of the dither signal, the amplitude of the reproduced RF envelope decreases.

On the other hand, if the transducing head 30 is located slightly off the center to either side of a track, the reproduced RF envelope amplitude variation will not be symmetrical because the head 30 excursions to one side of the track will produce a different RF envelope amplitude change than produced by an excursion towards the opposite side. Hence, a maximum-to-minimum envelope amplitude variation occurs once for each cycle of the dither signal, or at the dither frequency, $f_d$, with the order of occurrence of the maximum and minimum envelope amplitudes depending upon the side of the track center to which the head 30 is offset. The fundamental of the dither frequency is no longer balanced out, and the reproduced RF envelope variations will contain a fundamental component of the dither frequency, with the phase of the fundamental component for an offset to one side of the center of a track being 180 degrees different with respect to that for an offset to the other side of the center of the track. Detection of the order of occurrence of the maximum and minimum envelope amplitudes, i.e., phase of the envelope amplitude variations, provides information definitive of the direction the transducing head 30 is offset from the center of a track being scanned, and detection of the envelope amplitude variation provides information definitive of the amount of offset.

To obtain the head position information, the modulated RF envelope signal reproduced by the head 30 is coupled to detection circuitry through a video preamplifier 72 and is applied to equalization circuitry 74 before it is coupled by a line 75 to an amplitude modulation RF envelope detector circuit 76 that is constructed to recover the dither signal fundamental and its side bands. The output of the envelope detector circuit 76 is then applied to a synchronous amplitude modulation detector 78. The synchronous detector 78 operates on the principle of coherently detecting the amplitude and polarity of an unknown actual phase but known frequency input signal with reference to the phase of a reference signal of the same nominal frequency. The reference signal is provided by the dither generator 60 through line 62 which is connected to a phase adjust means 85 and, subsequently to the detector 78. The phase adjust means 85 in the VPR-1 video production recorder manufactured by Ampex Corporation is a manually-controlled adjustment that is typically set for each head and movable element assembly used in a recorder. The phase of the reference signal is adjusted to compensate for phase changes introduced to the dither signal by factors other than the transducing head 30 being located off the center of a track being scanned, such as changes in mechanical resonance characteristic of the head and movable element assembly. However, as will be described in detail hereinbelow with reference to FIGS. 12–15, the present invention utilizes an automatically phase compensated reference dither signal to avoid the necessity of having to manually adjust the phase of the dither reference signal for each video record/reproduce apparatus having a positionable head that is controlled in the manner accomplished by the apparatus described herein or in the aforementioned Ravizza application, Ser. No. 669,047.

The synchronous detector 78 provides a rectified output having the amplitude of the unknown recovered dither signal with the rectified output being positive when the reference and recovered dither signals are in phase and negative when the two signals are 180 degrees out of phase. Since the signal present at the input of the detector from the envelope detector 76 will have a component at the fundamental dither frequency, $f_d$, whenever an error occurs in the head track position, the sync detector 78 will provide on its output line 80 a track error signal representative of the head track position error. The amplitude of the error is proportional to the amount that the head 30 is displaced from track center and the polarity of the track error signal is indicative of the direction of head displacement from the track center. The output line 80 is coupled to circuitry 82 shown in the dotted line box, and the output from that circuitry provides the error correcting signal on line 66 to the summing circuit 64 as previously described. In the event a reset signal is to be produced for resetting the head 30 to a different track upon completion of the scan of a track, it is accomplished by the circuitry 82.

In the apparatus described in the aforementioned Hathaway et al. application, the circuitry 82 which generates the pulses for changing the position of the head 30 relative to its location at the conclusion of scanning a track is in part determined by the mode of operation of the apparatus, i.e., normal reproduction mode, slow motion mode, etc., and, in part, by the circuitry which determines the position of the head 30 with respect to its range of movement. As can be seen from FIG. 1, the aforementioned Hathaway et al. application has a mode select switch 84 that is adapted to bring into operation an upper slow/still servo amplifier circuit 86 or a lower normal play servo amplifier circuit 88, with the mode being determined by the operator using the recording apparatus. As is evident from the drawing, it is seen that the mode select switch 84 must be changed from one position to the other when changing from normal play to the slow/still mode of operation or from the latter to the former. When changing between the normal play and the slow/still modes by the operation of the switch 84, a disturbing transient interruption occurs in the reproduced video signal because the proper controlling head position error signal is temporarily lost. Reacquisition of the correct controlling error signal can take 100 milliseconds or six television fields. It should be appreciated that this would produce a discontinuous video picture on a monitor.

Referring to FIG. 2, the circuitry 82 shown in the dotted line box of FIG. 1 is replaced with the universal circuitry 90 which has input line 80 and output line 66 corresponding to the input and output lines of the circuitry 82 in FIG. 1. The circuitry 90 of FIG. 2 effectively carries out both the normal play as well as the slow/still modes of operation with the mode select line 92 controlling the circuitry which replaces the separate circuits 86 and 88 of FIG. 1. The universal circuitry allows the automatic head tracking servo circuitry to be switched from the slow/still mode to normal play mode without producing servo unlocking and reacquisition transitions, as is experienced by the circuitry of FIG. 1, when switching between the slow/still servo amplifier circuit 86 and the normal play servo amplifier circuit 88. The circuitry of FIG. 2 broadly illustrates that a mode change will not cause the switching out of one circuit and switching in of another and, thereby, does not result in the loss of and necessitate the reacquisition of the error signal. However, it should be appreciated that different servo response characteristics are needed for normal play operations and for slow/still operations; and the circuitry 90 shown in FIG. 2 provides the needed different servo response characteristics.

In addition to the universal automatic head tracking servo circuitry, the improved apparatus includes improved circuitry for controlling the movement of the tape around the tape guide drums 22 and 24, herein referred to as the tape transport servo. The improved tape transport servo provides coordinated sequences for changing from a slow/still motion mode of operation to the normal speed mode of operation in a manner whereby the automatic tracking servo circuitry can be coordinated to produce the desired stable, noise free video picture on a monitor, for example.

The sequence of events that occur during the switching between the slow/still mode of operation and the normal speed mode enables continuous video reproducing throughout the period of changing velocity because the automatic head tracking servo circuitry operates throughout the time in which the tape is moved between a stop or slow motion and the normal speed motion by the tape transport servo system. As used herein, normal speed is intended to mean the tape speed that is used during recording. When changing from a stop or slow motion operation to a normal speed operation, the tape 36 is accelerated for a period of about ½ second until it reaches and is moving at a constant speed that is about 95% of the normal speed. When the tape 36 is moving at 95% of the normal speed, the rate at which the tape 36 is transported past the location of the scanning head 30 is 5% less than the normal rate. This decrease in the unit length of tape transported past the scanning head location per unit time is referred to as tape slippage. It is during this time that the initial color frame decision is made. Color framing is the final step in a video record/reproduce system servo operation in correctly positioning a head to scan a selected track at the proper head-to-tape speed relative to a controlling reference, typically studio reference. In the color framing servo operation, the head and tape positioning drives are controlled so that recorded video fields are reproduced having a color subcarrier to vertical sync phase relationship which corresponds to that of the studio reference. Because the automatic tracking servo circuitry is fully operational during this initial color frame acquisition time, the video framing information can be evaluated along with the reproduced control track data in order to initially determine the color frame. The initial acquisition period varies between about 0.3 and 0.6 second; and, once the initial color frame determination has been made, the tape transport servo system switches to accelerate the tape to 100% of normal speed.

It should be understood that a control track 94 (shown in FIG. 6 to be in the longitudinal direction of the tape 36) provides different color frame information than the actual color frame information obtainable from the video information recorded in the tracks A–G as shown in FIG. 6. Because of machine-to-machine tolerance variations affecting the location of the control track reproduce head 267 (FIG. 8), such as, for example, variations in the distance separating the control track and movable video heads and in the mounting of the video head 30 on the rotating drum portion 22, it is possible that an initial color framing operation performed with respect to a comparison of control track information and studio reference will result in positioning the tape 36 relative to the location of the movable video head 30 with the head mispositioned as far as plus or minus one (1) track from the proper track for the correct color frame condition. In other words, instead of the video head 30 of the reproduce video tape recorder being positioned to scan the same track that was previously recorded simultaneously with the detected control track pulse, it is positioned over one of the adjacent tracks because of the aforementioned machine-to-machine tolerance variations although the reproduced control track information indicates that color framing has been achieved. As will be described in greater detail hereinbelow, the apparatus described herein includes means for automatically verifying that the initial color frame acquisition is correct and, if color frame acquisition is not verified, for automatically relative positioning the video reproduce head 30 and the tape 36 to place the head over the proper track for achieving color frame. Thereafter, the tape transport servo maintains the transport of the tape 36 phase locked to the reproduced control track signals.

The exemplary embodiment of the apparatus described in the aforementioned Hathaway et al. application, Ser. No. 677,815, utilizes level detectors during the slow/still mode of operation to determine if reset pulses are to be applied to the deflectable piezoelectric element 32. In this regard, reference is made to FIG. 7a which illustrates a diagram of the RF envelopes 100 that are produced during successive scanning revolutions, with signal drop out intervals 102 occurring in the RF envelope which corresponds to the interval that the head 30 is between the guides 40 and 42 (FIG. 4) where no tape is present during the transducing head's rotation. In FIG. 7a, the drop out intervals 102 are exaggerated to facilitate the description. Thus, more specifically with respect to FIG. 7a, as the rotating head 30 makes a revolution, an RF envelope 100 is reproduced each revolution, with a drop out interval 102. When the transducing head 30 is reproducing a track from beginning to end, the RF envelope 100 is produced from the left to the right as portrayed in FIG. 7a, with each area 100 representing the signal information that is reproduced or recorded on a single track and, in the case of video recording, preferably represents at least the complete portion of a field of video information displayed on a monitor. In the event the apparatus is operating in the slow/still mode of operation and the tape 36 is stopped so as to be producing a still frame or stop motion video image on a monitor, it is necessary to reset the transducing head 30 at the end of its scan of every track, or a sequence of tracks if a still image monochrome frame or color frame is to be repetitively generated, so that it is in position to repeatedly reproduce from the same track or sequence of tracks. When such is done, it should be appreciated that the automatic head tracking circuitry will follow the track during reproducing and will produce a reset pulse for resetting the transducing head 30 at the completion of its scan of the track or sequence of tracks. A head deflection voltage versus time waveform diagram for still frame operation in which a single field is repetitively reproduced to form the displayed still image is shown in FIG. 7b and includes ramp portions 104 as well as vertical reset portions 106 and generally represents the waveform that is necessary to maintain head tracking during reproducing of a track and resetting of the transducing head 30 at the end of its scan of the track. The timing of the reset is advantageously set in the exemplary embodiment of the aforementioned Hathaway et al. application to occur during the drop out interval 102 and the amplitude of the reset pulses effecting the resetting of the head 30 depicted by the reset portion 106 of the head deflection waveform in FIG. 7b is shown to be that which produces a transverse movement of the head 30 that is equal to the center to center distance d between adjacent tracks, which will often hereafter be referred to as a full one track reset. It is advantageous to time the resetting of the movable head 30 with the occurrence of the drop out interval 102 because that interval typically occurs during the vertical blanking period of the video signal, which provides more than sufficient time to reposition the movable head 30 before the video image portion of the recorded video signal is positioned to be reproduced by the head. However, it is not a requirement of the apparatus constructed in accordance with the principles described herein that the resetting of the movable head 30 be timed to occur during a drop out interval. For example, in video record/reproduce apparatus characterized by recording formats without drop out intervals or with the vertical blanking period not aligned with the end of the recorded track, or in data recording apparatus for signals other than analog video signals, the resetting of the head position may be selected to occur during the intermediate portion of a track so that a segment of information is transferred with respect to the recording medium by a movable head that scans portions of adjacent tracks and is reset between intermediate locations of the adjacent tracks to rescan the track portions.

Resetting of the movable head 30 is synchronized to occur during the drop out intervals 102 that are located at the ends of the recorded tracks. In this regard, level detectors in the circuitry 90 effectively monitor the voltage waveform, such as that shown in FIG. 7b, and provide a reset pulse 106 when the voltage near the end of the ramp 104 shown at point 108 exceeds a certain level. As shown in FIGS. 7, the resetting of the movable head 30 begins at the start of the drop out interval 102 and is completed before the end of the drop out interval.

In the apparatus described in the aforementioned Hathaway et al. application, the threshold levels for determining whether a head position reset should occur are shown in FIG. 7c, together with a representative head deflection waveform including the ramp portions 104 and reset portions 106 shown by phantom lines. The logic is responsive to a processed once around drum tach pulse each time the head 30 reaches a point in its rotation corresponding to the point 108 in FIG. 7c to provide a single amplitude reset pulse (1 track forward reset) if the head deflection waveform is at a voltage level corresponding to a head deflection in a direction reverse to the travel of the tape 36 past the scanning head location (labeled reverse) and a double amplitude reset pulse (2 track forward reset) when the voltage exceeds a level corresponding to a head deflection in a direction reverse to the travel of the tape in excess of the spacing between adjacent tracks, for example, as depicted ramp portion 103. When the voltage of the ramp 104 is at a level below that corresponding to a one track reset, no reset pulses are generated and the transducing head 30 will merely follow the next track rather than being reset to rescan the same track. It should also be appreciated that the reset pulses are only produced during the drop out interval and are inhibited when the transducing head 30 is scanning a track and reproducing active video information. In other words, the level of the voltage of the ramp 104 is detected at the decision point 108 of the ramp 104 just before the drop out interval 102 and, if it is found to be within reset range, an appropriate reset pulse will be generated and applied during the drop out interval for deflecting the movable element 32 the required amount in the direction opposite that it was previously deflected by the ramp portion 104 of the head deflection voltage waveform.

To more readily visualize the function of the forward and reverse direction reset pulses, reference is made to FIG. 6, which illustrates a path 110 shown by phantom lines followed by the scanning head 30 relative to the tape 36 during a stop mode of operation. As seen therein, the head starts its scan of the tape 36 at the beginning of track F and cuts across the track to the end of track E during a single revolution. This occurs if the tape 36 is not moving and the transducing head 30 is not deflected. It should therefore be appreciated, that if the automatic head tracking circuitry is operative to maintain the transducing head 30 so as to follow track F, the head will gradually be deflected in the reverse direction by a ramp portion of the head deflection waveform, i.e., in the direction opposite the arrow 38, and if it were not deflected at the end of the track F, it would be in a position to begin playing the track G. To rescan track F, it is necessary to apply a reset pulse that will move the head 30 in the forward direction, i.e., in the direction of the arrow 38 so as to have the head in position to begin reproducing the beginning of track F. Thus, the reverse and forward terms in FIGS. 7b-7g are in the context of reverse and forward directions of tape movement and the movement of the head is referenced to these same directions.

The circuitry for generating the reset pulses is operable to selectively generate the reset pulses, depending upon the mode of operation of the apparatus. Thus, referring to FIGS. 7d, 7e, 7f, and 7g, it is seen that reset pulses will not be produced when the head 30 is deflected in the forward direction by an amount less than a selected distance depending upon the operating mode and a single reset pulse will be produced to reset the head 30 in the reverse direction when the head is deflected in the forward direction by an amount greater than the distance separating adjacent tracks. This appears in all of the diagrams shown in FIGS. 7d, 7e, 7f, and 7g. The reverse direction reset pulses will regularly occur when the tape is moving at a speed between normal speed and twice normal speed.

When the improved apparatus is operating in the slow/still mode, it is desired that reset pulses be generated in the same manner as was performed by the apparatus disclosed in the aforementioned Hathaway et al. application. Accordingly, the diagram shown in FIG. 7d illustrates the operation circuitry of the apparatus when it is operating in the slow/still mode; and it is seen that its characteristics for head deflections in the reverse directions are similar to those shown in the diagram of FIG. 7c. Typically, when operating in the slow/still mode, if the waveform 104 at the end of a track scan corresponds to a head deflection from zero to just greater than one track center-to-track center spacing in the reverse direction, then a track reset will occur which will move the transducing head 30 in the forward direction a distance equal to the separation of adjacent track centers. The head deflection waveform 104 of FIG. 7d depicts the operating condition whereby the movable element 32 is deflected between its zero deflection condition and a deflection condition just greater than one track center-to-track center spacing in the forward direction.

However, as can be seen from the head deflection waveforms 104, 106 and 104', 106' shown in FIG. 7e and 113 shown in FIG. 7d, the average level of the head deflection waveform, hence, average position of the movable element 32, can vary for the same head tracking condition. For the operating modes illustrated by FIGS. 7d, 7e, 7f and 7g, the head position waveform can be anywhere within a range corresponding to 1 track deflection in the forward direction and 1 track deflection in the reverse direction for any instantaneous head tracking condition and precise head tracking will be maintained. A different position within the range only has the effect of altering the average position about which the movable element 32 is deflected.

FIG. 7d includes a head deflection waveform 104, 106 shown by phantom lines for a slow motion speed of ½ normal speed. As shown therein, this slow motion operation results in the movable head 30 being reset after every other one of its rotations to rescan every other track, hence, field a second time. Between consecutive resets of the movable head 30, the head is deflected to account for the different path angle the head would otherwise follow along the tape 36 and allowed to scan two adjacent tracks during successive rotations of the head 30.

FIG. 7d also includes a head deflection waveform 113, 115 shown by phantom lines for a stop motion or still image operation wherein two adjacent tracks are consecutively scanned to reproduce two consecutive television fields before the movable head 30 is reset or repositioned to rescan the tracks. This is in contrast to the stop motion operation previously described with reference to FIG. 7c, wherein the movable head 30 is controlled to scan s single track repetitively to reproduce a single television field for the generation of the desired still image displays. As will be described in detail hereinbelow with reference to FIGS. 10a, 10b, 10c and 10d, the record/reproduce apparatus includes a transducing head tracking servo that employs circuitry for detecting when the movable head 30 must be repositioned or reset to rescan previously scanned tracks and applying a reset signal to the movable element 32 at the proper time. This detection and resetting circuitry is arranged to selectively permit still image reproduction from a single repetitively reproduced field, a repetitively reproduced sequence of two field, i.e., a monochrome frame, or a repetitively reproduced sequence of four fields, i.e., a color frame. The selective monochrome frame or color frame still image reproduction is achieved by means that prohibits the application of the head repositioning reset signal that normally is applied at the end of the scan of each track when in the still mode until the desired sequence of fields has been reproduced and by means that applies the appropriate amplitude reset pulse to reposition the head 30 to the track containing the first field of the sequences upon each completion of the sequence.

The head positioning waveform 113, 115 shown in FIG. 7d illustrates the manner in which the movable head 30 is deflected to repetitively reproduce a sequence of two fields recorded in adjacent tracks so that monochrome frame still image displays can be generated. Generating still image displays from a monochrome frame composed of two consecutively reproduced fields has the advantages over the use of a single field of increased vertical resolution of the image (525 line resolution instead of 262-½ line resolution) and of avoiding the necessity of introducing a ½ line delay in alternate reproductions of a single field. Generating still image displays from a color frame composed of four consecutively reproduced fields has the further advantage of providing the entire color information content of the displayed image and of avoiding the necessity of separating the luminance and chrominance components of a composite video signal so that the chrominance component can be inverted to provide the proper color subcarrier phase when forming a still image color display from a single field or a monochrome frame.

The aforedescribed operation of the transducing head tracking servo for generating a still color image display from a sequence of fields containing the entire color code sequence is described as arranged to generate the still displays from an NTSC standard color television signal, which requires four consecutive fields to color encode the signal. In the PAL and SECAM standards, color frames are composed of 8 and 4 fields, respectively. As described hereinbelow, the head tracking servo can be arranged to reproduce a color frame in each of these standards in the still frame mode. For PAL standard color television signals, the head positioning reset signal is inhibited to permit the reproduction of 8 consecutive fields before a head positioning reset signal is provided to effect the repositioning of the head 30 to rescan the 8 consecutive fields. While SECAM standard color television signals have a 12 field color frame sequence, th nature of SECAM signals enables satisfactory color displays to be generated from the repetitive reproduction of 4 consecutive fields. Therefore, the head positioning reset signal is inhibited to permit the reproduction of 4 consecutive SECAM standard fields before a head positioning reset signal is provided to effect the repositioning of the head 30 to rescan the 4 consecutive fields.

It should be appreciated that if relative motion is present in the images represented by two or more television fields used to generate monochrome frame or color frame still images, jitter will be present in the repetitively displayed monochrome or color frame. If the jitter is objectionable, the monochrome or color frame display can artificially be generated from a single field or only those fields without relative motion.

Although readily apparent from the above description of the improved record/reproduce apparatus, it should be emphasized that, when in the monochrome frame or color frame still image mode, the tape 36 is typically stopped and the head 30 is continuously deflected, for example, as depicted by the ramp portion 113 of the head deflection waveform shown in FIG. 7d, between the applications of appropriately timed consecutive head reset signals, such as, for example, reset step 115 in FIG. 7d. With respect to the particular embodiment of the automatic tracking circuitry shown in FIGS. 10a and 10b, in color frame still image modes, the variable reference threshold circuitry 126 (FIG. 3) employed in conjunction with associated latches and gates to generate the appropriate amplitude head resetting signal is modified to include additional parallel latches and gates as shown in and described hereinbelow with reference to FIG. 10d. Also, as shown in FIG. 10c, and will be described hereinafter, the ambiguous head track lock circuitry includes means to properly time its operation so that artificial head resetting signals are properly provided in accordance with the particular still frame mode.

When the apparatus is switched from the slow/still motion mode of operation to normal speed mode of operation, the tape transport servo system accelerates the tape 36 up to about 95% of normal speed. During the tape acceleration interval, which lasts about 0.5 sec. when the tape 36 is accelerated from stop, the variable reference threshold circuitry 126 establishes the same head reset reference threshold levels as it does for slow/still operating modes. Upon reaching 95% of normal speed, the automatic head tracking servo circuitry switches to have the characteristics shown in the diagram FIG. 7e, which is different than the slow/still characteristic shown in FIG. 7d in that a reset pulse is produced for head deflections in the reverse direction in an amount less than one-half the spacing between adjacent track centers. However, a one track reset pulse will continue to be produced to move the head 30 in the forward direction whenever the head is deflected in reverse direction by an amount in the range of one-half to just greater than the distance between adjacent track centers. It is during this time when the tape 36 is being transported at the 95% normal speed, that the initial color frame determination is made. During this initial determination stage, it is desired that the forward reset pulses be provided only whenever the movable head 30 is deflected in the reverse direction an amount between one-half and just greater than the distance between adjacent track centers so that the head positioning correction waveform will remain more closely centered about the zero voltage level, rather than at an average negative value as could be the case with respect to FIG. 7d. By not resetting the head 30 when it is deflected in the reverse direction by an amount less than one-half the distance separating adjacent tracks, the average value of the head deflection waveform will more closely approach that shown in FIG. 7b, where it is generally centered around the zero head deflection mark. Once the initial color framing determination operation is complete and provided that the phase of the control track signals is within a predetermined "window" when compared to a reference signal, as will be hereinafter described, the tape transport servo system switches from the 95% normal speed to 100% or normal speed. The tape 36 is quickly accelerated to 100% of normal speed and the automatic tracking circuitry is then switched to the normal speed mode which has the characteristics illustrated in FIG. 7f. However, before initiating normal reproducing operations in the normal speed mode, the reproduced video signal is examined to determine whether the initial monochrome and color frame determination has been correctly made. Because the aforementioned machine-to-machine tolerance variations in professional quality video record/reproduce apparatus typically do not vary outside of a tolerance range that would produce more than a plus or minus one (1) track head positioning error when monochrome and color framing relative to the recorded control track signal, the apparatus herein described can take advantage of the information content of the reproduced video signal's H sync to V sync phase relationship, i.e., monochrome frame information to verify the correctness of the initial monochrome and color framing. As will be described in further detail hereinbelow, the reproduced video signal's H sync to V sync phase relationship is compared to the equivalent phase condition of the studio reference. If the monochrome frame of the reproduced video signal differs from that of the studio reference, the automatic tracking circuitry responds to a field match signal generator 95 (FIG. 2) to deflect the movable element 32 a distance equal to that separating adjacent track centers and in the proper direction to achieve color framing. FIG. 7f includes a head deflection waveform 106, 109 shown by phantom lines for a normal speed mode of operation, including a forward reset portion 106 representing a typical one track deflection of the head 30 for color framing purposes followed by a typical head position correction waveform 109 occurring during normal speed mode operations. Furthermore, as shown in FIG. 7f, the normal speed dynamic range of the automatic tracking circuitry is shown to extend from a head deflection in the forward direction just greater than the distance separating adjacent track centers to a head deflection in the reverse direction of a corresponding amount, which means that no reset will occur if the instantaneous voltage level just before the drop out interval 102 is within this dynamic range. The single track reset pulses (in both directions) are provided to center the transducing head 30 if an external disturbance or the like causes the movable element 32 carrying the transducing head 32 to be outside of its normal operating range.

In the two times normal speed mode, the tape 36 is transported past the scanning head location at a rate that is two times that for the normal speed operating mode. Consequently, as a track is being scanned by the head 30 during this mode, the track is advanced a distance in the forward direction beyond the scanning head location corresponding to the distance separating adjacent track centers. Therefore, to maintain head-to-track registration, the scanning head 30 must be deflected in the forward direction a corresponding distance during the scan of a track. Two times normal speed motion is achieved by reproducing every other recorded field at the normal field rate for video signals, i.e., 60 Hz. By resetting the position of the scanning head 30 in the reverse direction at the conclusion of the scan of a track a distance corresponding to the distance separating adjacent tracks, the scanning head 30 skips the adjacent downstream track that it would normally follow if not reset, which contains the next field of the recorded sequence of video fields, and instead is positioned to reproduce the field recorded in the track that is located two recorded track positions from the track whose scan has just been completed. FIG. 7g illustrates the head deflection waveform generated by the circuitry 90 of the apparatus when the tape transport servo system is controlled to transport the tape at two times normal speed. As can be appreciated from the illustrated waveform, when the tape 36 is transported at twice normal speed, the movable head 30 is deflected in the forward direction an amount exceeding the distance separating adjacent track centers. When the deflection exceeds that amount, a one (1) track reverse reset pulse is produced to position that head 30 over a track located two recorded track positions from the track whose scan has just been completed.

The operational characteristics shown in FIGS. 7d, 7e, 7f, and 7g are carried out by the circuitry 90 shown in the block diagram of FIG. 3. The mode control line 92 is connected to logic circuitry indicated generally at 111 and has lines 112, 114, 116 and 118 extending to respective switches 120, 122, 124 and a variable reference or threshold producing circuit 126. The error detector output signal from the synchronous detector 78 (FIG. 1) is applied via line 80 to the switches 120 and 122, only one of which can be closed at one time by operation of the logic circuitry 111. The switch 120 is connected via line 128, resistor 130 and line 132 to the negative input of an integrator 134, while the switch 122 is connected via line 136, resistor 138 and line 132 to the same integrator input. The values of the resistors 130 and 138 are different and effectively change the loop gain or compensation of the error signal on line 80 as applied to the input line 132 of the integrator 134 according to which one of the switches 120 or 122 is closed. When the apparatus is operating in the slow/still mode, switch 120 is closed and switch 122 is open so that the gain of the head track positioning servo system is increased so it can react faster, since there is more movement required of the movable element 32 carrying the transducing head 30 during the slow/still mode of operation than in most other modes. When the apparatus is placed in normal speed mode, switch 122 is closed and switch 120 is open so that the gain is reduced, less movement for correction being required in this mode because the transducing head 30 will normally closely follow the track. When the apparatus is in its slow/still mode of operation, switch 124 is also closed to connect a DC voltage centering network 139 for the integrator. During slow motion modes of operation below one-half normal speed, there is a need for the centering network around the integrator 134 to prevent the integrator from swinging too far out of its normal operating range and, thereby, require excess time for servo acquisition after the apparatus is turned on. During the normal speed mode, the network 139 is unnecessary and therefore switch 124 only brings it into operation during the slow/still mode of operation. Furthermore, when reproduced video is initially detected during an operating mode signified by a high logic RF PR signal level on input line 123 (FIG. 10a), the logic circuit 111 functions to close switch 124, to facilitate rapid servo locking.

When the error signal is applied to the input line 132 of the integrator 134, the error signal causes the transducing head 30 to be adjusted so as to follow the track regardless of the speed of tape transport, provided it is within the limits of deflection of the movable element 32. The integrator 134 provides a ramp signal that has a slope which is determined by the speed of transport of the tape 36 and an average DC value that is determined by the DC or low frequency error signal that is derived from the head tracking servo circuitry. Thus, the servo error modulates the average level of the ramp as the transducing head position error changes and the output of the integrator appears on line 66, which extends to the summing circuit 64 shown in FIG. 1. The reset pulses are summed at the input line 132 of the integrator 134, with the reset pulses being derived from the processed drum once around tach and selectively passed by AND gates 140, 142 and 144. The processed once around tach is derived from a tach pulse generated by a tachometer (not shown) operatively associated with the rotating drum 22, one tach pulse being provided for each revolution of the rotating drum, hence, the scanning head 30. Conventional tachometer processing circuitry provides the pulse at the desired system time and of selected width. The AND gate 140 has its output connected to line 132 via a resistor 146 and AND gate 142 has its output connected to line 132 via a resistor 148 and the output of AND gate 144 is connected to an inverter 150 which in turn is connected to line 132 via a resistor 152. If either of the AND gates 140 and 142 are activated, then a predetermined current pulse whose amplitude is determined by resistors 146, 148 and 152 will appear on line 132 and be applied to the integrator 134 for the purpose of resetting the voltage level at the output thereof. The actuation of either of the AND gates 140 and 142 will produce a reset step in the output of the integrator 134 of predetermined value that will correspond to the proper amplitude reset step required to deflect the movable element 32 a distance in the forward direction corresponding to the center to center distance between adjacent tracks, i.e., a one track position deflection distance. If the AND gate 144 is actuated, then by virtue of the inverter 150, an opposite polarity reset pulse is produced on line 132, as compared to the polarity of the pulse from the AND gates 140 and 142, and which opposite polarity effectively causes a reset of the movable element 32 in the reverse direction as is desired. If both of the AND gates 140 and 142 are activated simultaneously, for example, as occurs during the 95% normal speed mode when the head 30 is deflected in the reverse direction a distance greater than that corresponding to the track-to-track separation, a twice amplitude current pulse will appear on line 132 and be applied to the integrator 134 for the purpose of resetting the voltage level at the integrator's output, hence, the position of the movable head 30, the equivalent of two track positions in the forward direction.

The output line 66 of the integrator 134 is coupled to one input of each of three level detectors 156, 158 and 160, each of which effectively monitors the instantaneous voltage on line 66 to determine if reset pulses are to be generated. The level detector 156 has its other input coupled to line 162, which is provided with a constant threshold voltage that corresponds to the level for producing the one track forward reset pulse shown in FIGS. 7d, 7e and 7f. Thus, if the instantaneous voltage level on line 66 exceeds the value of the threshold voltage on line 162, i.e., the instantaneous level is above the one track reverse threshold voltage, then a forward reset pulse will be generated. The level detector 160 has its other input coupled to line 187, which is provided with a constant threshold voltage that corresponds to the level for producing the one track reverse reset pulse shown in FIG. 7g. If the instantaneous voltage level on line 66 is less than the value of the threshold voltage on line 187, i.e., the instantaneous level is below the one track forward threshold voltage, a reverse reset pulse will be generated. The level detector 158 has its other input coupled to the variable reference 126 and, as will be explained further hereinafter, it receives one of alternative reference level signals, the selected alternative being dependent upon the operating mode of the record/reproduce apparatus. In the embodiment of the apparatus shown by FIGS. 10 and 11, the variable reference 126 establishes threshold voltage levels used to control the generation of forward head position reset pulses in operating modes below normal speed.

To generate the reset pulses, each of the level detectors 156, 158 and 160 have respective output lines 164, 166 and 168 which are respectively connected to the D input of latches 170, 172 and 174. The Q outputs of the respective latches are connected via lines 176, 178 and 180 to the AND gates 140, 142 and 144. A line 182 is connected to the clock inputs, C, of the latches 170, 172 and 174 and to a pulse and clock generator circuit 184. The generator circuit 184 also has an output line 186 connected to a second input of the respective AND gates 140, 142 and 144. A pulse derived from the processed once around tach is used by the circuitry 90 to trigger the pulse and clock generator circuitry 184 and to clock the latches 170, 172 and 174. In one embodiment of the apparatus described herein, the tachometer processing circuit generates the processed drum tach pulse about 16 msec. after the occurrence of the once around drum tachometer pulse. The once around drum tach pulse occurs at the beginning of the drop out interval 102 (FIG. 7a). The 16 msec. delayed processed drum tach pulse is timed to occur at the following track reset decision time, identified in FIGS. 7b–e and 7f by the reference number 108. It is this processed drum tach pulse that clocks the latches 170, 172 and 174 to enable them to latch the condition of the outputs of the level detectors 156, 158 and 160, thereby, determining whether a step reset of the movable head 30 is required. As will be described in further detail hereinbelow, the actual reset pulse is generated by the pulse and clock generator 184 from the processed drum tach pulse, but delayed about 0.67 msec so that any step resetting of the movable head 30 occurs during a drop out interval 102. During operation, if the instantaneous voltage on line 66 at the occurrence of the processed once around tach pulse on line 182 exceeds the particular value of the threshold voltage applied at the input of the respective level detectors, the output line associated with each Q output of the level detectors whose threshold voltage is exceeded will be latched to a high logic level by the clocking action of the processed once around tach signal on line 182. For example, if the instantaneous voltage on line 66 exceeds a level corresponding to a head deflection in the reverse direction in excess of the distance represented by the reference threshold voltage provided by the variable reference generator 126 (i.e., any reverse deflection of the movable element 30 when in the slow/still operating mode and a reverse deflection, in excess of one-half the distance separating adjacent track centers when in the normal 95% normal speed operating mode), latch 172 is conditioned to enable the associated AND gate 142 to provide a single 1 track reset pulse for effecting a forward 1 track step deflection of the movable head 30. On the other hand, if the instantaneous voltage on line 66 exceeds a level corresponding to a head deflection in the reverse direction in excess of the distance separating adjacent track centers, both latches 170 and 172 are conditioned to enable their respective associated AND gates 140 and 142 to provide 1 track reset pulses, which are summed at the input line 132 of the integrator 134, thereby effecting a forward 2 track step deflection of the movable head 30. In the event the instantaneous voltage on line 66 exceeds a level corresponding to a head deflection in the forward direction in excess of the distance separating adjacent track centers, latch 174 is conditioned to enable the associated AND gate 144 and following inverter 150 to provide a 1 track reset pulse for effecting a reverse direction one track step deflection of the movable head 30.

The line 118 from the logic 111 controls the variable reference circuitry 126 to provide a threshold voltage on line 196 that varies between three levels so as to accomplish selective resetting of the position of the movable head 30, depending upon the operating mode of the apparatus, as shown in FIGS. 7d, 7e, 7f and 7g. As described hereinbefore, when the apparatus is operating in the slow/still mode, the circuitry 126 provides a threshold voltage such that a forward head position reset occurs when the voltage level on line 66 exceeds a level corresponding to any head deflection in the reverse direction at the occurrence of a processed drum tach signal on line 182. When the apparatus is switched from the slow/still mode to the 95% of normal speed mode, the variable reference circuitry 126 applies a different threshold to the level detector 158 so that a 1 track forward reset pulse is produced only when the voltage on line 66 at the occurrence of a processed drum tach pulse exceeds a level corresponding to any head deflection in the reverse direction in excess of one-half the distance separating adjacent track centers. Similarly, when the apparatus is switched to the normal speed mode, the variable reference circuitry 126 supplies a voltage level to the level detector 158 that disables it so that a pulse cannot be passed by its associated AND gate 142 regardless of the instantaneous level on line 66. The one forward reset pulse that is generated in the normal speed mode when the instantaneous voltage on line 66 exceeds the level corresponding to a head deflection in the reverse direction exceeding a distance of about 1.1 times the separation of adjacent track centers, is produced by the operation of the level detector 156. As described hereinbefore, the threshold level for initiating a forward reset step of the movable element 32 is increased in steps from a level corresponding to no head deflection in the reverse direction to a level corresponding to a head deflection in excess of the distance separating adjacent track centers as the video record/reproduce apparatus operating mode is changed, for example, from still motion to normal speed forward motion. This keeps the head positioning waveform generated by the integrator 134 at an average level near zero deflection so when the tape 36 is accelerated to 100% normal speed, the video head 30 will be positioned to scan the right track for proper monochrome frame and color frame conditions relative to the studio reference.

With respect to the diagram shown in FIGS. 7d and 7e, where a two track forward head positioning reset pulse indication is shown to be produced when the voltage on line 66 exceeds that corresponding to a reverse head deflection in excess of the distance separating adjacent track centers, this is accomplished by both level detectors 156 and 158 going high which produces a double amplitude forward reset pulse as previously explained. Both level detectors 156 and 158 cause the enabling of the associated AND gates 140 and 142, respectively, because whenever a reverse head deflection exceeds the distance separating adjacent track centers, the voltage on line 66 will exceed both threshold levels established for the level detectors during the operating modes illustrated by FIGS. 7d and 7e.

With respect to the two times normal speed mode illustrated by FIG. 7g, the level detector 168 functions to cause its associated AND gate 144 and following inverter 150 to deliver an opposite polarity 1 track reverse reset pulse to the integrator 134 to effect the resetting of the movable head 30 because, at the end of the head scan of each track, the voltage level on line 66 exceeds the threshold level established for the level detector on line 187.

With respect to the control of the transport of the tape 36 around the tape guide drums 22, 24 during recording and reproducing operations, reference is made to FIG. 8, which is an electrical block diagram of circuitry of a tape transport servo system that can be used to control the transport of the tape. As previously mentioned, when the apparatus is switched from the slow/still mode of operation to the normal speed mode, the tape transport servo circuitry is made to follow the speed profile shown in FIG. 9. In video tape record/reproduce apparatus, the tape 36 is conventionally transported by a capstan 200, which is driven by a motor 202 through a shaft 204. A capstan tachometer 206 is operably connected to the shaft 204 to provide signals indicative of the rotation of the shaft 204 and the signals appear on line 208 which is coupled to a frequency discriminator 210, to variable slow motion control circuitry 240 and to a phase comparator 212.

The frequency discriminator 210 provides a signal indicative of the velocity at which the capstan 200 is driven. Its output is connected to a summing circuit 214 via line 216 so that the capstan velocity related signal provided by the frequency discriminator 210 is subtracted from the reference velocity drive signal provided by a velocity reference circuit 250 for correcting the velocity drive signal provided to the capstan 200. The output of the summing circuit 214 is connected via a switch means 226 and line 218 to a motor drive amplifier 220 that drives the motor 202 via line 222. The circuitry is controlled by an operator applying, through the operation of appropriate control devices, mode commands to logic circuitry 224, which in turn provides commands to the automatic head tracking circuitry previously discussed as well as to the two position switch means 226 having a movable contact means 228 that can switch between positions 1 as shown or position 2. The commands from the logic circuitry 224 are coupled via control lines 230, these lines also being coupled to control a switch means 232, which has a movable contact means 234 that is capable of being positioned in one of three positions. When the apparatus is operated in the slow/still mode, to provide slow motion reproductions of the recorded video signals requiring very low tape transport speeds, typically, less than 1/5 normal speed, a variable slow motion control 240, including a tape speed control 240' potentiometer, is adapted to apply a pulse drive signal to the motor drive amplifier 220 via a line 242, contact means 228 of switching means 226 (in position 1), line 218. When in this mode, switch means 232 is in position 1 and drive of the capstan motor 202 provided by the motor drive amplifier 220 is controlled during the very low tape speeds solely by the drive signal generated by the variable slow motion control 240. The variable slow motion control 240 provides the pulse drive signal to drive the capstan motor 202 until the velocity of the tape 36 reaches about 1/5 normal speed. At this tape speed, velocity control of the tape drive is switched over to the velocity reference circuit 250, which responds to the tape speed control potentiometer to change the drive signals to motor 202 and selectively vary the speed of the tape 36. The apparatus described herein employs the variable slow motion control circuitry described in the aforementioned Mauch application, Ser. No. 874,739.

To switch the velocity control drive from the variable slow motion control circuit 240 to the velocity reference circuit 250 at the aforementioned cross-over velocity range, the logic circuitry 224 operates the switch means 226 so that the movable contact means 228 is eventually placed in position 2 and triggers a velocity reference circuitry 250 via a command placed on line 252 extending from the logic circuitry 224. The velocity reference circuit 250 responds to the command placed on line 252 to generate a voltage level in accordance with the position of the operator controlled potentiometer 240'. The voltage level is coupled by line 254, summing circuit 214, contact means 228 of switching means 226 (in position 2) and line 218 to the motor drive amplifier 220. For the acceleration mode, the logic circuitry 224 provides a command on line 252 that triggers the velocity reference circuit 250 to provide a voltage ramp of selected rate and duration, to accelerate the tape 36 to 95% normal speed within an interval of 0.5 sec. When the record/reproduce apparatus is placed in the acceleration mode, the logic circuit 224 issues a command over a control line 230 to cause the movable contact means 228 of the switch means 226 to be placed in position 2 so that the voltage ramp signal is coupled via line 218 to the motor drive amplifier 220 to effect acceleration of the tape 36.

The velocity reference circuit 250 provides the capstan drive velocity servo reference signal for controlled slow motion operating speeds above the cross over tape velocity of about 1/5 normal speed and for accelerating the tape 36 to 95% normal speed when the apparatus is operated to enter a normal speed reproduce mode. During these operating mode conditions, the applied ramp or voltage level velocity servo reference drive signal causes the motor to transport the tape 36 at about the desired speed. The line 208 from the tachometer 206, together with the frequency discriminator 210, line 216, summing circuit 214, contact means 228 and line 218 provide a velocity lock mode of operation, which forces the capstan to follow the velocity servo reference drive signal provided by the velocity reference circuit 250. In this regard, it should be noted that the switch means 232 has the movable contact means 234 in position 1 during the velocity lock mode of operation.

When accelerating the transport of the tape 36 to enter the 95% normal speed mode, the capstan 200 accelerates the tape 36 to the 95% normal speed level and, upon reaching that speed, switch means 232 is switched by the operation logic circuitry 224 so that the movable contact means 234 is in position 2. This places the capstan velocity servo in a capstan tach phase lock mode of operation. In this mode, the phase comparator 212 compares the phase of the capstan tach signal on line 208 with a tach related servo reference signal, which is coupled to line 258 by a variable divider 260. The variable divider 260 is controlled by a control signal placed on the control line 262 by the logic circuitry 224 together with clock signals on line 264 supplied by clock circuitry 266. The clock signals are in the form of a 64H reference signal provided by a conventional video reference source commonly found in video record/reproduce apparatus. The control signal line 262 sets the variable divider 260 so that it provides a divided clock signal to the phase comparator 212 that maintains the speed of the tape 36 at the 95% normal speed until the initial color frame determination has been completed, as generally described hereinbefore and will be described in further detail hereinbelow.

When the initial color frame determination has been completed, it is then desired to switch from the 95% normal speed mode to the normal speed mode, which requires the tape 36 to be accelerated up to the 100% normal speed. However, before the final acceleration is performed, it is desirable, in addition to making the initial color frame determination, to continue the 5% slip or slewing until the phase of the off tape control track 94 is within a predetermined window when compared with the control track reference signal, i.e., within about plus or minus ten percent (10%) of the control track servo reference signal. This is desirable in order to insure that when the control of the capstan 200 is switched to the control track phase lock mode from the capstan tach phase lock mode that there be a minimum tape velocity disturbance introduced to the tape transport servo. If, for example, the control track loop was enabled when the control track was not within the phase window with respect to the control track servo reference, an undesirable tape speed transition may occur due to the tape transport servo loop trying to rephase the transport of the tape 36 and the transition may be drastic enough that the initial color frame condition may be lost.

A control track head 267 of the video record/reproduce apparatus detects the recorded control track 94 and couples it to line 268 extending to the input of the color frame detector 280 and control track phase comparator 270. The phase comparator 270 serves to compare the phase of the reproduced control track signal on line 268 with a 30 Hz control track servo reference signal on line 272 from the system clock circuitry 266. The phase comparator 270 is a typical circuit employed in the control track servo loop of helical scan video tape recorders, such as the VPR-1 video production recorder identified herein. Before the tape 36 is accelerated to 100% normal speed and the apparatus is switched from the capstan tach phase lock mode to the control track phase lock mode, the initial color frame determination is made by the color frame detect circuitry 280 typically included in helical scan video recorders, such as the above-identified VPR-1 video production recorder. The color frame detector 280 compares the 15 Hz color frame component of the recorded control track 94 reproduced on line 268 by the control track head 267 with a color frame reference signal provided on line 282 by the system clock circuitry 266. When the signals received by the color frame detector 280 indicate an initial color frame condition, an output signal is provided on line 284 to the logic circuitry 224. Before final acceleration of the tape 36 to 100% normal speed, the output of the phase comparator 270 is coupled by line 274 to the input of a control track error window detector 276.

Specific circuitry that can be used to carry out the operation of the block diagrams shown in FIGS. 3 and 8 are illustrated in FIGS. 10a and 10b as well as FIGS. 11a, 11b and 11c. The specific circuitry shown in FIGS. 10a and 10b illustrate the automatic tracking circuitry shown in the block diagram of FIG. 3, together with portions of the circuitry shown by the block diagram of FIG. 1. The circuitry shown in FIGS. 10a and 10b, to the extent that it includes circuitry represented by the prior art block diagram of FIG. 1, is contained in and is also described in catalogs illustrating the detailed construction of the prior art apparatus. In this regard, reference is made to catalogs of the VPR-1 Video Production Recorder, catalog Nos. 1809248-01 dated January, 1977 and 1809276-01 dated February, 1977 prepared by the Audio-Video Systems Division of Ampex Corporation, Redwood City, Calif., which catalogs are hereby incorporated by reference herein. In this regard, the circuitry shown in FIGS. 11a, 11b and 11c also incorporate circuitry that exists and is illustrated in the above-referenced catalogs. The operation of the circuitry shown in FIGS. 10a, 10b, 11a, 11b and 11c will not be described in detail since they generally carry out the operation previously described with respect to the block diagrams of FIGS. 3 and 8. Moreover, the schematic diagrams contain circuitry whose operation is not directed to the specific invention described herein and perform functions that can best be understood from the overall operation of the video production recorder, the complete electrical schematics of which are shown in the aforementioned catalogs. However, to the extent that the operation of the block diagrams can be directly correlated to the specific schematic circuitry, reference numbers will be included thereon and certain operations will be hereinafter described.

Turning to the electrical schematic diagram of FIGS. 10a and 10b, the RF signal from the equalizer circuitry 74 is applied via line 75 to an automatically calibrated RF envelope detector circuit 76 which also includes an automatic reference level setting feedback loop 299. Envelope detector circuit 76 includes a variable gain amplifier 301 coupled via output pin 8 to an envelope detector 303 (pin 7) which detects the amplitude of the RF envelope as modulated by the dither signal. Amplifier 301 and detector 303 herein are integrated circuits having a standard industry designation of MC 1350 and MC 1330 respectively, wherein corresponding pin number connections are identified in the drawings for reference thereto. As previously mentioned, the amplitude and polarity of the RF envelope modulation are indicative of the amount and direction respectively of lateral head displacement from track center. Therefore, it is necessary that the envelope detector circuit 76 provide a constant demodulation gain for proper head tracking servo operation. However, detector integrated circuits such as detector 303, exhibit varying sensitivities and DC offset characteristics from chip-to-chip, which inherently causes corresponding variations, and thus inaccurate measurement of the detected amplitudes. Likewise, different tape formulations, different heads, head and/or tape wear, variations in head-to-tape contact, etc., cause differences in recorded RF levels between tapes, which also results in inconsistent envelope detector circuit output signals. The feedback loop 299 thus provides means for automatically compensating for differences between IC component characteristics, tape RF level differences, etc., to provide a constant detector circuit 76 output under all conditions.

To this end, a capacitor 305 is coupled between the output of the detector 303 (pin 4) and a junction of switches 307, 309. The other terminals of switches 309, 307 are respectively coupled to a 5 volt source and to the negative input of a differential amplifier 311. The latter's positive input is selectively referenced to a +2 volt level via a resistive divider network 281 and +5 volt source. An RC network 313 and a diode 315 are coupled across the amplifier 311 negative input (pin 2) and the output (pin 1), with the output coupled in turn to the control input (pin 5) of the variable gain amplifier 301 as well as to a 12 volt source via a zener diode 317. The switches 307, 309 are controlled via inverters coupled to the true and not true outputs (pins 13 and 4) respectively of a one-shot multivibrator 319. The one-shot generates a pulse which approximately matches the drop out interval 102 (FIG. 7a) of the RF envelope, and is clocked via the drum tachometer signal received from the drum tachometer processing circuitry over line 321, to alternately close switch 307 during the interval of the reproduced RF envelope 100 and switch 309 during the drop out interval 102 (FIG. 7a).

During each drop out interval, i.e., once for each transducing head revolution, the RF envelope amplitude is zero, i.e., there is 100% modulation of the envelope, whereby during each closure of the switch 309, a reference level change of +5 volts is set between capacitor 305 and ground. When switch 307 is closed during the reproduction of the RF envelope, the feedback loop 299 is referenced to +2 volts, thus forcing the reference level setting feedback loop 299 to automatically servo a +3 volt change at the output of detector 303 and thereby provide a constant demodulator gain from the envelope detector circuit 76, regardless of any variations in the tape RF levels, component characteristics, etc. The +3 volt change is equivalent to the average amplitude of the RF envelope without amplitude modulation at the output of the envelope detector circuit 76 with the desired average amplitude for an unmodulated RF envelope at the input 75. In the apparatus in which the envelope detector circuit 76 is employed, the RF envelope will be amplitude modulated as a result of the application of the dither signal to the movable element 32. "Average amplitude" and "without amplitude modulation" are used herein to define an RF envelope whose amplitude is not modulated, except by the dither signal, if such signal is applied to the movable element 32.

Note that unlike conventional automatic gain control circuits, the reference level setting feedback loop 299 herein takes the reference level for the detector circuit gain control from the drop out interval 102 of the input video signal itself.

In other versions of video record/reproduce systems, the RF envelope may not have the drop out interval 102 between the RF envelopes 100 (FIG. 7a). For example, the system may include two transducing heads and may instead generate a continuous RF envelope with no drop out intervals between scans across the tape. In such instances, a drop out interval, wherein the RF envelope is 100% modulated, i.e., has an amplitude of zero, may be "artificially" generated. By way of example, in FIG. 10a, a diode matrix modulator 323 may be inserted in the continuous RF envelope input on line 75 leading to the envelope detector circuit 76, as depicted in phantom line. The modulator 323 generates a drop out interval in response to the drum tachometer signal on line 321, whereby an artificial drop out period is generated identical to the drop out period 102 of previous description.

The output of the envelope detector circuit 76 is, in turn, coupled to an active high pass filter 300 which passes signals above about 175 Hz to the synchronous detector 78, when the active filter is connected in the signal path. A pair of switches 302 and 304 operate to alternatively pass the signal through the filter or bypass the filter as is desired. During initial acquisition of tracking, there may be a 60 Hz component present in the signal that is of much higher amplitude than the dither component of about 450 Hz and the closing of the switch 304 for about one second filters the lower frequency component from the signal until the desired tracking is achieved, at which time switch 304 opens and switch 302 closes to bypass the filter 300. The switches 302 and 304 are controlled to be in opposite states by the level of the tracking delay signal placed on line 325 when an operator activates the automatic head tracking control circuitry and the coupling of the signal through an inverter 327 before applying it to the control input of switch 304.

The signal detected by the envelope detector 76 is applied to the synchronous detector 78 from either switch 302 or 304, and the synchronous detector has at its other input the phase compensated dither signal received over line 87 from the commutating comb filter 306 of the automatic dither signal reference phase compensating means of the present invention described in detail hereinbelow. The filter 306 separates and phase compensates the dither frequency components of the signal generated by the sense strip 83 of the bimorph element 32 and coupled to the filter via line 308 that is connected to a sensing circuit associated with the element 32 and contained within the aforementioned electronic dampening circuit 71. The sensing circuit and its operation is comprehensively described in the aforementioned Ravizza U.S. Pat. No. 4,106,065.

Referring now to FIG. 12, which illustrates a block diagram of circuitry generally employing the apparatus of this invention, the head tracking position error signal is detected by the envelope detector 76 and provided to the synchronous detector 78. The synchronous detector 78 also receives a phase compensated reference signal over line 87, which is coupled to its control input. In FIG. 12, line reference numerals identify like components described hereinabove with reference to other figures of the drawings. The phase compensated reference signal is provided by a commutating comb filter 306 which functions to separate the fundamental dither frequency component from all other frequency components established in the movable element 32 by inducing a small oscillatory motion in the element through the application of an oscillatory drive signal to the movable element 32. The oscillatory of dither drive is provided to the movable element 32 by the dither oscillator 60. As a result of the oscillatory drive, a vibration is established in the movable element. Only the fundamental frequency component of the vibration is of interest. Therefore, a comb filter 306 is employed to pass the fundamental component while rejecting all other frequencies generated by movement of the element. The frequency filtered by the comb filter 306 is processed into a reference signal of the proper phase, irrespective of any changes in the mass or other characteristics of the assembly formed of the element 32 and transducing head 30 that effect the response characteristics of the assembly. This processed reference signal is employed by the synchronous detector 78 for detecting the head position error signal applied to the head position servo circuitry 90.

The sense strip 83 of the movable element 32 is coupled to an input of the electronic damping circuit 71 as explained more fully in the aforementioned Ravizza U.S. Pat. No. 4,106,065, which is incorporated herein by reference. The output signal of the sensing strip 83 is buffered in the damping circuit 71 and, subsequently, applied to an input of the filter 306 by means of the line 308. The second output of the damping circuit 71 is coupled to one input of the summing circuit 69 as described hereinbefore to provide a damping signal of proper phase and amplitude to the movable element drive amplifier 70 for compensating extraneous disturbing vibrations induced in the movable element.

The dither signal produced by the oscillator 60 (typically 450 Hz for 60 Hz line standard apparatus and 425 Hz for 50 Hz line standard apparatus) is applied to a second input terminal of the filter 306 by means of the line 62, and the system clock reference signal, REF 2H, is applied to a third input terminal of the filter 306 on a line 404. The output terminal of the filter 306 is coupled to the synchronous detector 78. The remaining circuitry of the apparatus illustrated in FIG. 12 functions in the same manner as described hereinabove with reference to FIG. 1.

The commutating comb filter 306 is illustrated in more detail in the block diagram of FIG. 13. The line 62, which transmits the dither signal to the filter 306, is coupled to the CLEAR input terminal of a counter 406; and, the line 404, which transmits the REF 2H clock signal to the filter, is coupled to the CLOCK input terminal of the counter 406. The counter 406 is a binary counter having four output terminal lines 408 coupled to four input terminals of a one-of-ten decoder 410. The counter 406 and the decoder 410 are illustrated in FIG. 10a (within the dashed-line block 306) with their standard industry designation 74393 and 7445, respectively, along with their connecting pin numbers identified therein.

The output terminals of the decoder 410 are "open" collector terminals of transistors having the emitter terminals thereof coupled to ground potential. Also, when an output transistor in the decoder is not selected, a high impedance appears at the corresponding output terminal.

The decoder 410 output terminals (of which there are ten in this embodiment) are coupled, respectively, to one side of the capacitors C1 through C10. The second side of capacitors C1 through C10 are coupled to the input terminal of a buffer amplifier 412 and to one side of a resistor R10. The second side of the resistor R10 is coupled to the line 308. The output terminals of the decoder 410 are each grounded sequentially in response to incremental counts of the counter 406. Thus, each of the capacitors C1 through C10 samples the amplitude of the sensor signal received on the line 308, and the sampled amplitudes are applied to the amplifier 412. The output of the amplifier 412, which is illustrated by the waveform shown in 14C, is applied to the input of a low pass filter 414.

Frequency components other than that of the dither frequency are incapable of building up the same charge on the capacitors (C1 through C10) from cycle to cycle. Thus, any charge accumulated on the capacitors as a result of frequency components other than the dither frequency will be cancelled out over time. In this manner, the commutating comb filter 306 is designed to have a narrow passband of less than one hertz centered about the dither frequency and any frequency component outside that passband will be suppressed. Accordingly, the signal at the output of the amplifier 412 will have a frequency component equal to the dither frequency only. A general discussion of the operation of filters, such as the combination of counter 406, decoder 410 and capacitors C1 through C10, may be had by reference to an article entitled "GET NOTCH q'S IN THE HUNDREDS" by Mike Kaufman, which was published in Electronic Design 16, Aug. 2, 1974, at page 94.

The low pass filter 414 smooths out the incremental steps in the output signal from the amplifier 412, and the output of this filter is applied to the input of another amplifier 416. The filter 414 causes an unwanted phase delay in the signal. Accordingly, the output of the amplifier 416 is applied to a lead network 418 to compensate for this phase delay of the signal.

The output of the lead network 418 is applied to a level detector amplifier 420, and the output of this amplifier is applied to the input of a limiter 422 having an output terminal coupled to the synchronous detector 78. The level detector amplifier 420 and the limiter 422 operate to shape the phase-corrected and frequency-filtered signal sensed by the sensing strip 83 into a square-wave signal having a frequency and phase corresponding to the mechanical vibrations induced in the movable element 32 in response to the applied dither signal. Therefore, the synchronous detector 78 is operated in response to the actual mechanical vibrations induced in the movable element in response to the applied oscillatory dither signal. Accordingly, it may be appreciated that any slight changes in the phase of the mechanical vibration of the movable element (as may occur when the element is replaced with another, having a different resonant frequency) will effectively be automatically cancelled out, thereby eliminating any need for an operator controlled phase adjustment of the reference signal for the synchronous detector 78 following a subsequent replacement of the movable element 32, or a transducer head 30 on the element.

To more fully understand the operation of the aforedescribed circuitry, reference is made to the waveforms illustrated in FIGS. 14a through 14f. When the system is operating in a slow motion or still frame mode, the oscillatory motion of the movable element 32 corresponds to the waveform shown in FIG. 14a. Portion 424, which is at the 60 Hz standard television vertical frequency for a single field still motion mode, represents the resetting of the movable element 32 following the scan of one track to the beginning rescan of the same track. Portion 426 of the waveform of FIG. 14a represents the oscillatory motion of the movable element 32 in response to application of the oscillatory dither signal. The portion 426 only of the waveform 424 is filtered by the comb filter 306 from the other oscillatory motions, such as that represented by the composite waveform 424. It is noted that the dither frequency is preferably chosen to be between any of the harmonics of the 60 Hz standard television vertical frequency so as to avoid spectrum overlap, which overlap would prevent effective filtering of the dither frequency from the vertical frequency. In one embodiment for 60 Hz line standard apparatus, the dither frequency was chosen at 450 Hz, which is between the seventh (420 Hz) and eighth (480 Hz) harmonics of the vertical frequency. However, the dither frequency need not be at the precise midpoint between vertical frequency harmonics; but may be chosen substantially between such harmonics so long as there is no possibility of spectrum overlap. This may be more fully appreciated by the frequency spectrum diagram of FIG. 15.

When the apparatus is operating in the normal speed mode, the oscillatory motions of the movable element 32 correspond to the waveform illustrated in FIG. 14b. Locations 428 in the illustrated waveform identify the periodicity of the same vertical frequency to be suppressed by the comb filter 306. Here, as in the waveform of FIG. 14a, it is the dither frequency components of the element oscillatory motions that are to be filtered from all other oscillatory motion frequency components of the movable element 32.

It is noted that the waveforms shown in FIGS. 14c through 14f are illustrated on an expanded time scale for clarification purposes only, and should not be confused with the periodic relationships of the waveforms shown in FIGS. 14a and 14b. The waveform shown in FIG. 14c represents the signal appearing at the output of the buffer amplifier 412, while that shown in FIG. 14d represents the signal appearing at the output of the low pass filter 414. Note that the waveform in FIG. 14d is delayed in phase from that shown in FIG. 14c. This phase delay, as stated above is caused by the low pass filter 414.

The waveform shown in FIG. 14e represents the output signal from the amplifier 420, and is shown to be back in phase with the signal represented by FIG. 14c. The waveform shown in FIG. 14f represents the output signal from the limiter 422, which is the wave-shaped and phase-corrected reference signal applied to the synchronous detector 78.

The output of the synchronous detector 78 provides the DC error signal which is applied to an error amplifier servo compensation network 310 shown in FIGS. 10a and 10b and the DC error signal appears on line 80 that is applied to switches 120 and 122 as previously mentioned. The circuit 310 includes a disable switch 312 that is controlled by line 314, which line is also coupled to control another switch 316 in the correction signal output buffer circuitry 329, which includes the movable element's drive amplifier 70. The line 314 is also coupled to a switch 318 associated with the level detectors 156, 157, 158 and 160. The switches 314, 316 and 318 are operative to disable the circuits with which they are associated and such is done when it is not desired that the automatic head tracking circuitry be operating. For example, when the tape is being shuttled at a very fast rate, a low logic level WIND DISABLE signal is placed on line 432 as a result of an operator initiated shuttle command being provided to the record/reproduce apparatus. During such operations, it is essentially impossible for the automatic head tracking circuitry to lock onto a track. Therefore, it is desired that the automatic head tracking circuitry be disabled and line 314 is controlled through the logic circuitry shown in FIGS. 10a and 10b when the operating condition of the video record/reproduce apparatus is placed in a high speed shuttle, as determined by the operator. When the operator terminates the shuttle, the WIND DISABLE signal goes to a high logic signal level and the disable signal is removed from the switches. The input signals on lines 283, 285 and 287 to the circuitry shown in FIGS. 10a and 10b also, dictate that the switches to be set to disable the automatic tracking circuitry. The line 283 receives a logic level state signal indicative of whether the operator has initiated operation of the automatic head tracking circuit. The lines 285 and 287 receive logic level state signals according to whether the record/reproduce apparatus is in a capstan tach phase lock operating mode or a slow/still or acceleration operating mode, respectively. These logic level state signals are received from the portion of the capstan servo circuitry shown in FIGS. 11a, 11b and 11c.

The circuitry for providing reset pulses to the AND gates 140, 142 and 144, as well as the color frame verification circuitry 340 described in further detail hereinbelow, includes line 182 which extends to the clock input of the latches 170, 172 and 174, to the color frame verification circuitry 340 and to the pulse and clock generator circuitry 184. The generator circuitry 184 produces the reset pulses on line 186 that extend to and are passed by any of the gates 140, 142 and 144 that are enabled by their associated latch. The pulse and clock generator circuitry 184 includes a two stage flip-flop circuit 324 that has its clock input coupled to the not true output of a one-shot 331 that serves to delay the generation of the reset pulses so that they coincide with the occurrence of the drop out interval 102 (FIG. 7a). More specifically, the one-shot 331 receives the processed drum tach signal coupled to its clock input by line 182 at a time before the occurrence of the drop out interval 102 of about 0.67 msec., which, as described hereinbefore, is at the reset decision time identified in FIGS. 7 by the reference number 108. The timing circuit of the one-shot 331 is set by the adjustment of the reset potentiometer 333 to have a period that produces a 0.67 msec. negative pulse at its not true output. The positive going trailing edge of the negative pulse is coupled to the clock input of the first stage of the flip-flop circuit 324, which responsively conditions the second stage so that, upon the occurrence of the next reference 2H pulse received over line 322 from the studio reference source, the flip-flop circuit removes an inhibiting signal placed on the clear input, CLR, of a counter 326. In addition, the flip-flop circuit 324 switches the opposite phased signal levels placed on lines 186. Following the removal of the inhibiting signal from its clear input, CLR, the counter 326 counts the 2H pulses received over line 322 until it reaches its terminal count, which takes a time of 512 microseconds. At this time, the count provides a signal to the flip-flop circuit 324 that clears it, which returns the flip-flop circuit to its state that provided an inhibiting signal to the counter by switching signal levels on lines 186 back to the levels that existed prior to the receipt of the processed drum tach signal. This switching of the signal levels on lines 186 serves to generate the reset pulses that are coupled to the AND gates 140, 142 and 144 each time a processed drum tach occurs. A reset pulse is passed by an AND gate to the integrator 134 for resetting the voltage level on its output line 66 whenever the AND gate (or AND gates if a two track forward reset is called for) is enabled by its associated latch.

The three threshold reference levels for the level detector 158 that are produced by the variable reference circuit 126 are shown in FIG. 10a as being produced by the operation of open collector gates 328 and 330, which are in turn controlled by the control lines 118a and 118b from logic gates 332. The logic gates control the open collector gates 328 and 330 in accordance with the conditions of the slow/still, 95% normal speed and normal speed operating mode related input signals applied to the logic gates, which appear on mode control lines 285 and 287 and at the output of the inverter 450, as shown in FIGS. 10a and 10b. Each of the gates 328 and 330 is of the type which effectively apply a low logic signal level at its output when it receives an enabling high logic signal level at its input and, depending on which, or if both of the gates are enabled, results in a different voltage being applied on line 196 which extends to the level detector 158. More particularly, when gate 330 receives a high logic signal level at its input (caused by a SLOW/STILL low logic signal level on mode control line 287 during the velocity ramp and slow/still operating modes), then line 196 is essentially grounded (low logic signal level) to set the threshold reference level for the level detector 158 at a point corresponding to no head deflection in the reverse direction. If gate 328 receives a high logic signal level at its input (caused by an AST tach low logic signal level on mode control line 285 during the 95% normal speed mode and the absence of 100% tach pulse at the input of the inverter 450 during the 100% normal speed mode, i.e., during the entire capstan tach phase lock mode), then its output is essentially grounded and resistors 334 and 336 comprise a voltage divider network which applies an intermediate voltage on line 196. This sets the threshold reference level for the level detector 158 for the 95% normal speed operating mode i.e., at a point corresponding to a head deflection in the reverse direction of just greater than (about 10% more than) one-half the separation of adjacent track centers. If neither of gates 328 and 330 receives a high logic signal level at their respective inputs (when in operating modes other than slow/still and 95% normal), then a high voltage (high logic signal level) appears on line 196. The high voltage on line 196 disables the variable reference level detector 158. With the level detector 158 disabled, only the fixed threshold reference levels associated with the level detectors 156 and 160 control the repositioning of the movable head in the normal speed mode. From the foregoing, it can be seen that the open collector gates 40 function together with the source of fixed threshold reference levels to selectively cause the generation head positioning reset pulses in accordance with the operating mode of the apparatus.

The output of the integrator 134 appears on line 66 which extends to the level detectors 156, 157, 158 and 160 for monitoring and, through gain adjusting switch 337, through an AC and DC correction adder circuit 338 and finally to the output buffer circuit 329 for application to the second summing circuit 69 and eventually the movable element 32 (FIG. 12). The added AC error correction signal is derived from the output of the error amplifier network 310 present on line 80a. The error correction signal provided by the error amplifier network 310 contains AC and low rate, or DC components. Line 80a extends to a band selective filter (not shown) such that the comb filter employed in the apparatus described in the above-identified Ravizza, et al application Ser. No. 669,047, to obtain the AC error component from the composite error signal. The AC error signal provided by the comb filter is coupled to the adder circuit 338 via input line 80b. The AC and DC head position error signals are summed together by the adder circuit 338 and the summed head position error signal is coupled by line 66a to the first summing circuit 64 for combining with the dither signal provided by the dither oscillator 60. The output of the first summing circuit 64 is coupled by the buffer circuit 329 to line 68 that extends to the second summing circuit 69, which adds the dampening signal provided by the electronic dampening circuit 71 (FIG. 12) to form a composite head position error correction signal for driving the movable element 32 via the drive amplifier 70.

A color frame verification circuit 340 shown in FIG. 10a verifies whether a correct initial color frame determination was made and, in the event the movable head 30 is scanning the wrong track for proper color framing, effectively causes it to be deflected to the proper track before initiating normal reproduction operations in the normal speed mode. The color frame verification circuit 340 is enabled during the 100% normal speed operating mode just prior to synchronous reproduction operations by the 100% TACH signal provided by the logic circuitry 224 shown in FIGS. 11b and 11c. This occurs at the time that the control of the transport servo is switched from the capstan tach servo phase lock mode to the control track servo phase lock mode.

A signal entitled "Field Mismatch", which is coupled to one of two inverting input terminals of an AND gate 441, is derived by the field match generator 95 (FIG. 2) of the apparatus from the video transducing head output and not from the control track read head. The field mismatch signal is derived from a comparison between the video tracks being reproduced by the apparatus and reference signals provided by a user of the apparatus, such as conventional studio reference signals. Circuitry for deriving the field mismatch signal is typically found in helical scan video record/reproduce apparatus, such as the aforementioned VPR-1 video production recorder. As previously explained, if a wrong initial color frame determination has been made, the movable element 32 will be in an erroneous deflected position for proper color frame conditions. The color frame verification circuit takes advantage of the condition that, if a wrong initial color frame determination has been made, the incorrect monochrome field will be reproduced. Briefly, however, a monochrome field mismatch is determined by applying the studio reference vertical signal to the date (D) input of a first flip-flop, and the studio reference horizontal signal to the clock (C) input terminal of the same flip-flop. Likewise, the vertical and horizontal signals reproduced by the transducing head 30 of the apparatus are applied to the data (D) and clock (C) input terminals of another flip-flop. The true (Q) output terminals of these two flip-flops are coupled to two input terminals of an EXCLUSIVE OR gate, and the output of this gate comprises the field mismatch signal referred to herein. The output of the EXCLUSIVE OR gate is in opposite states for monochrome field match and mismatch conditions. In the apparatus herein, a low logic level at the input of the AND gate 441 signifies that an erroneous monochrome field match exists, hence, the initial color frame determination was erroneous and a high logic level that a monochrome field match exists, hence, a correct determination was made.

When a field mismatch occurs, circuitry 340 applies a reset step to the movable element output buffer circuit 329 to move the transducing head to the proper track. Alternatively, the capstan drive could be pulsed to move the tape 36 so as to position the head 30 adjacent the proper track as is the practice in the prior art. However, it is virtually impossible in commercially practicable tape record/reproduce apparatus to accelerate and decelerate the tape 36 in the short time alotted (about 0.5 msec.) to reposition the tape within the drop out period and, therefore, it is common to experience disturbances in the display of prior art record/reproduce apparatus when the tape is slewed to correct a field mismatch.

The output terminal of the gate 441 is coupled to the data (D) input terminal of a flip-flop 442 and to the inverting clear (CLR) input terminal of this same flip-flop. The true (Q) output terminal of the flip-flop 442 is coupled to the data (D) input terminal of a flip-flop 444. The true (Q) output terminal of the flip-flop 444 is coupled back to the second inverting input terminal of the AND gate 441, thereby forming a latch that comprises gate 441 and the flip-flops 442 and 444.

A signal entitled "Video Record", which is at a low level when the apparatus is in a record mode of operation and at a high level during a reproduce mode of operation, is applied to an input terminal of a one-shot 446. The true (Q) output terminal of the flip-flop 446 is coupled to one of two inverting input terminals of a NOR gate 448. Another input signal entitled "100% TACH" 502 (FIG. 16) provided by the tape transport servo of the apparatus when switched to the 100% normal speed in the capstan tach lock mode, is coupled to an input terminal of an inverter 450. The output of the inverter 450 is coupled to one of two inverting input terminals of the AND gate 332, and to the second inverting input terminal of the NOR gate 448.

The output terminal of the NOR gate 448 is coupled to the positive trigger input terminal of a one-shot 452. The output terminal of the one-shot 452 is coupled to the clock (C) input terminal of the flip-flop 442 and to the inverting clear (CLR) input terminal of the flip-flop 444. Accordingly, a trailing positive edge transition 503a (FIG. 16) at the conclusion of the 100% TACH signal 502 will trigger the one-shot 452 by means of the inverter 450 and the NOR gate 448.

Assume for the present discussion that the flip-flops 442 and 444 are reset, and that a field mismatch has been detected by the field match generator 95. The output of the AND gate 441 will be at a high level, and the triggering of the one-shot 452 will clock the flip-flop 442 into a set state to enable the AND gate 456 to respond to the receipt of an inverted processed drum tach at the output of the inverter 454.

The processed drum tach signals 510 (FIG. 16), which are supplied on the line 182, are applied to the input terminal of an inverter 454 and the output of this inverter is coupled to the clock (C) input terminal of the flip-flop 444 and into one of two inverting input terminals of an AND gate 456. The not true output terminal of the flip-flop 442 is coupled to the second inverting input terminal of AND gate 456. The output terminal of the AND gate 456 is coupled to one of two input terminals of each of NAND gates 458 and 460. When the flip-flop 442 is in a set state, as described above, the processed drum tach signal is inverted by the inverter 454 and gated through the AND gate 456 to input terminals of the NAND gates 458 and 460. On the positive-going trailing edge of this tach signal, the flip-flop 444 is set which disables the AND gate 456. Consequently only one setting pulse is applied to the NAND gates 458 and 460 in response to the single negative transition of the field mismatch signal.

The output of the level detector 157 (FIG. 10b), indicating the position of the movable transducing head, (that is whether or not the head is deflected in either the forward or reverse direction a distance corresponding to the separation of adjacent track centers after the initial color frame determination is complete), is provided on line 159; and this line is coupled to the second input terminal of the NAND gate 458 (FIG. 10a) and to the input terminal of an inverter 462. The output terminal of the inverter 462 is coupled to the second input terminal of the NAND gate 460. The output terminal of the NAND gate 458 is coupled to the inverting set (S) input terminal of the latch 170. Similarly, the output terminal of the NAND gate 460 is coupled to the inverting set (S) input terminal of the latch 174. The single setting pulse, generated from the processed drum tach signal and provided by NAND gate 458 or 460 for displacing the head one track, if one of these NAND gates is enabled by the signal level appearing on the line 159, causes the generation of a single appropriate reset pulse for displacing the head 30 one track in the appropriate direction for proper color framing as will be further described below.

Following the generation of a reset pulse for effecting the repositioning of the movable head 30, a field reference pulse, designated FIELD REF, generated by a conventional tachometer processing circuitry, is provided on line 464 and is coupled to the clear input terminal of the latches 170, 172 and 174. The field reference pulse is derived from the once around drum tachmeter pulse and is timed to occur about 1/120 of a second following the tachometer pulse. Upon the occurrence of the field reference pulse, each of the latches is placed in its clear state, thereby, removing the enabling input from the associated AND gates 140, 142 and 144. Furthermore, in the modified form of the automatic head tracking servo circuitry described in detail hereinafter with reference to FIGS. 10c and 10d, the field reference pulse is coupled to also clear the additional latches provided for NTSC, PAL and SECAM color frame still motion modes of operation.

To more fully understand the operation of the aforedescribed circuitry 340, reference is made to FIG. 16, wherein a timing diagram illustrating operation of the track selection logic is illustrated. Waveform 500 illustrates the same tape velocity versus time profile shown in FIG. 9 and described hereinabove. Waveform 502 illustrates the 100% TACH signal applied to the input terminal of the inverter 450. Portion 503 of the waveform 502 is approximately a 0.6 second window produced by a one-shot 371 included in the logic circuitry 224 illustrated in FIG. 11b, which is triggered in response to the capstan 200 reaching 100% normal speed.

Waveform 504 is a diagram of the changing track reset conditions during the transitory period of speed changing as illustrated by the waveform 500. The time periods 504a, 504b and 504c correspond to the three different modes of operation illustrated in FIGS. 7d, 7e and 7f, respectively, and described hereinabove. During the time period corresponding to the portion 503 of the waveform 502, a track reset window is opened to plus or minus one track reset range so that if the movable head 30 is mispositioned after the initial color frame determination in the reverse (or forward) direction by one track position, it will not be reset forward due to the threshold level provided to the level detector 158 as the automatic head tracking servo circuitry operates to correct the mispositioned head 30.

Waveform 506 illustrates the signal at the true (Q) output terminal of the one-shot 452 during this transitory time period. The leading edge 507 of the pulse portion of the waveform 506 is timed to trailing edge 503a of the pulse portion 503 of the waveform 502.

Waveform 506' is the waveform 506 shown in expanded time scale for clarification purposes only. Waveform 510 illustrates the processed drum tach signal applied at the input terminal of the inverter 454 and waveform 512 illustrates an erroneous monochrome field mismatch, hence, erroneous initial color frame determination, and the following high level of the same signal illustrates a corrected monochrome field mismatch. Edge 513 is the result of correcting the monochrome field mismatch error that was represented by the low-level signal state at the input of the AND gate 441. The edge 513 coincides with the vertical sync of the reproduced signal (not shown), which is approximately 0.5 msec after the occurrence of edge 511b of the processed drum tach pulse 511 that initiates the one track head positioning step for correcting the field mismatch.

Waveform 514 illustrates the signal appearing at the true (Q) output terminal of the flip-flop 442 as a result of the presence of a field mismatch when the apparatus is switched to the normal speed mode. When the waveform 512 is at a low level and waveform 506 makes a transition to a high level (i.e., at leading edge 507), the flip-flop 442 sets at leading edge 515. Waveform 516 illustrates the signal appearing at the output of the AND gate 456 in response to the above-described signals. In response to leading edge 515 of the pulse signal 514, the AND gate 456 is enabled to pass a setting pulse 517 to enable the setting of latch 170 or 174 as determined by the state of the forward/reverse signal supplied on the line 159 by the level detector 157 as a result of the voltage level on line 66 at the output of the integrator 134. That is, if the transducing head 30 is mispositioned at the conclusion of the initial color frame determination in the reverse direction by one track position, the level detector 157 of the color frame verification circuitry 340 detects an erroneous initial color frame determination and effects a one track forward field mismatch correcting reset movement of the movable element 32. Conversely, if the transducing head 30 is mispositioned in the forward direction by one track position, it is detected by the level detector 157 and circuitry 340 effects a one track reverse field mismatch correcting reset movement of the element. Accordingly, if the transducing head 30 is detected as being on the wrong track after the initial color frame determination, that is a field mismatch condition, the appropriate one of the NAND gates 458 or 460 is enabled by the signal level placed on the line 159 by the level detector 157, and the enabled NAND gate passes the setting pulse 517 to the set (S) terminal of the appropriate one of the latches 170 or 174, if a setting pulse 517 is provided by the AND gate 456. By setting one of the latches 170 or 174, the associated AND gate 140 or 144 is enabled and as described hereinbefore, this places a reset pulse on line 186 to be coupled to the integrator 134 for resetting the head 30 the necessary one track forward or reverse direction as required to obtain proper color frame field match. The direction of the reset is determined by the position of the head 30 at the occurrence of the leading edge 517a of the setting pulse 517.

Should the initial color frame determination be correct, the resulting high level of the field mismatch signal 512 at the input of the AND gate 441 disables the color frame verification circuit 340 and the AND gate 456 does not provide a setting pulse 517 to the latches. Hence, the head 30 is allowed to remain in the same position after the initial color frame determination as it was at the determination.

During the time frame encompassed by pulse portion of the waveform 506 (time duration of the one-shot 452) numerous processed drum tach pulses (waveform 510) occur. As briefly discussed above, only a single reset step should be applied to the movable element 32 to correct for a single detected one track mispositioning of the head 30. To this end, the flip-flop 44 operates to lock out the additional processed drum tach pulses during the color frame correction period as described above. Waveform 518 illustrates the true (Q) output signal of the flip-flop 444 which is applied to the input of the AND gate 441. The pulse 517 coincides with the processed drum tach pulse 511. The processed drum tach pulse 511 is expanded in time for sake of clarification of the description. The leading edge 520 of the waveform 518 provided at the output of the flip-flop 444 coincides with the trailing edge 511b of the tach pulse 511. This resets the latch comprising the AND gate 441 and flip-flops 442 and 444, which disables the AND gate 456, thereby inhibiting any additional setting pulses (waveform 516) being applied to the NAND gate 458 or 460. The trailing edge 521 of the waveform 518 coincides with the trailing edge 508 of the waveform 506 as a result of the one-shot 452 being timed out. This defines a color frame correction head track adjustment window of about 0.25 second, after which no further reset pulses are applied to the integrator 134 by the color frame verification circuit 340. This condition remains until another color frame correction is required.

Changes in the head to track positioning error exceeding the bandwidth of the automatic head tracking servo circuitry will not, of course, be processed and, hence, not corrected. Operating characteristics of the particular video record/reproduce apparatus, for which the automatic head tracking servo illustrated by FIGS. 10a and 10b is designed, dictated that a servo bandwidth of 30 Hz was preferred. However, some operating conditions of the video record/reproduce apparatus can result in the head 30 being mispositioned so that the resulting track positioning error signal is at a rate that exceeds the 30 Hz servo bandwidth. For example, when the video record/reproduce apparatus is in the still frame operating mode, the automatic head tracking servo may initially provide a head positioning signal on line 66 (FIG. 3) that causes the head 30 to be mispositioned so that at the start of the scan of the tape 36 of head starts its scan over one track, crosses the guard band between adjacent tracks and ends its scan over an adjacent track. Under these circumstances, the track crossing of the head 30 produces a 60 Hz error signal and the head tracking servo will be unable to respond to correct the head's misposition. Instead the head tracking servo would act as if the head 30 is correctly positioned and, thereby, issue an output signal that leaves the head 30 mispositioned. As a result of such crosstracking, the resulting RF envelope reproduced by the transducing head 30 shrinks in amplitude to a minimum amplitude when the head crosses the center of the guard band. Because of limited bandwidth of the servo circuit, a transient reset pulse is produced by the integrator 134 in the head positioning signal on line 66. This transient reset pulse typically is of insufficient amplitude to trigger the reset of the movable element 32. Accordingly, the servo system is in an ambiguous state of scanning portions of two adjacent tracks as a result of not resetting the position of the movable elements 32 for a rescan of the first of the two adjacent tracks. The scanning path 105 followed by the head 30 along the tape 36 under such circumstances is depicted in phantom line in FIG. 6.

A disturbance in the head positioning servo circuitry or in the deflection of the movable element can also lead to permanent head mispositioning. If the disturbance is synchronous with the timing of alternate resets of the head position during a still frame mode so that such resets are not performed, the head positioning servo circuit will allow the head to sacn two adjacent tracks in succession and then issue a two track forward reset step to the movable element 32. The two track forward reset step is issued because after the scan of the second of the two consecutively scanned tracks, the head positioning signal provided on line 66 by the integrator 134 is in excess of both the 0 and 2 track forward reset threshold levels of the level detectors 158 and 156 (FIG. 3). Consequently, as previously described, a two times amplitude reset pulse is provided to the integrator 134. As long as the synchronous disturbance persists, the movable element 32 will be controlled by the automatic head positioning servo to repetitively scan two adjacent tracks. If the image information contained in the two video fields reproduced from the two tracks contains relative movement, a horizontal jitter will appear in the displayed signal. The head positioning signal provided by the integrator 134 under such condition is depicted in the connected phantom lines 103 and 104 in FIG. 7c.

Ambiguous track lock resolving circuitry 342 (portions in both FIGS. 10a and 10b) prohibits the servo system of the apparatus from locking in the aforementioned ambiguous states when the video record/reproduce apparatus is operating in a still frame mode. The circuitry 342 is disposed for detecting such a reset failure at the end of a scan of a single track. One-shot 343, having an input terminal coupled to receive a signal on input line 339 derived from the reproduced control track pulses 92 detects the absence of tape motion such as occurs during the still frame mode of operation. The output of one-shot 343 is coupled to one of two input terminals of a NAND gate 345, and the output terminal of this NAND gate is coupled to the set input terminal of the latch 172.

The not true output terminal of the latch 172 is coupled to one of two input terminals of the NAND gate 142, and the second input terminal of this AND gate is coupled to receive, over one of the lines 186, the reset pulse from the not true output terminal of the flip-flop circuit 324 located within the pulse and clock generator circuit 184. In the still frame operating mode, the output terminal of the gate 142 should produce a reset pulse for stepping the movable element 32 every head revolution. In addition, the output of the AND gate 142 is coupled to the negative trigger input terminal of a one-shot 347, and the true output terminal of this one-shot is coupled to one of two input terminals of a NAND gate 349. The positive trigger input terminal of the one-shot 347 is coupled to +5 volts, and the one-shot time duration is determined by the time constant of the associated resistor/capacitor network coupled to pins 14 and 15 of this one-shot. The not true output terminal of the one-shot 347 is coupled to a set input terminal of another one-shot 351.

The embodiment shown in FIGS. 10a and 10b is arranged for controlling the tracking position of the scanning head 30 when NTSC standard television signals are recorded and reproduced by the apparatus described herein. Modifications of the automatic head tracking servo shown in FIGS. 10a and 10b for controlling the scanning head's tracking position when other television signal standards, such as PAL and SECAM, are recorded and reproduced by the apparatus described herein are shown in FIGS. 10c and 10d. For NTSC television signals, one-shot 347 is set for a timing of approximately 25 msecs., and the one-shot 351 is set for a timing of 160 msecs. Thus, the resulting 25 msec. pulse provided by the one-shot 347 is greater than the interval between consecutive reset pulses provided to the AND gate 142, and less than the time required between three consecutive reset pulses. As described hereinbefore, a reset pulse is provided by the pulse and clock generator circuit 324 for each revolution of the head 30, hence, at a frequency of a 60 Hz. Consequently, if a reset pulse is not provided at the output of the AND gate 142, the one-shot 347 will time out and, thereby, set the one-shot 351 and condition the NAND gate 349. The setting of the one-shot 351 corresponds to the time required for approximately ten consecutive reset pulses. Conditioning of the NAND gate 349 in response to setting of the one-shot 351 will condition the NAND gate 345, which will hold the latch 172 in a set state for the approximately ten reset pulse time period. Accordingly, ten consecutive reset pulses will be provided at the output terminal of the AND gate 142, at the proper times for such reset pulses, to thereby reset the output of the integrator 134 an amount equivalent to a forward 1 track deflection of the movable head 30 and force the servo system out of the ambiguous state.

The modifications to the automatic head tracking servo circuitry shown in FIGS. 10a and 10b to condition the circuitry for still mode operations during which multiple fields are reproduced from a plurality of tracks and to condition the ambiguous track lock resolving circuitry 342 for proper operation with a signal standards other than NTSC, as briefly discussed hereinabove, are illustrated in FIGS. 10c and 10d. The illustrated modifications permit operations with PAL and SECAM television signals. The line 182, which transmits the processed drum tach signal, is coupled to the clock input terminal of an 8-bit divider circuit 380 formed of three flip-flops 381, 382 and 383 coupled in a conventional cascaded manner. Also, the line 182 is coupled to a position 1 contact terminal of a switch 384. The output terminals of the flip-flops 381, 382 and 383 are coupled to position 2, 3 and 4 contact terminals of the switch 384. The operating terminal of the switch 384 is coupled to junction 183 along line 182, which extends to the reset enabling latches associated with the integrator 134, flip-flop circuit 324 and color frame verification circuitry 340 (FIG. 10a). The "Field Mismatch" signal, as discussed above, is applied to the inverting clear input terminals of the flip-flops 381, 382 and 383 to inhibit operation of the divider 380 until a field match condition exists. Changing the position of the movable contact of the switch 384 results in changing the number of processed drum tach pulses required to be received over line 182 before a reset pulse is provided to the AND gate circuitry connected to line 132 extending to the integrator 134 (FIG. 3). This permits the frequency of the reset signal provided to the integrator 134 to be selectively varied for different still frame modes.

Switch 384 is mechanically coupled to switches 386 and 387, having operating terminals thereof coupled to the +5 volt supply. Positions 1-4 of the switches 384, 386 and 387 correspond to one another so that when switch 384 is in position 1, switches 386 and 387 are also in position 1. The position 1 contact terminal of the switch 386 is coupled to pin 15 of the oneshot 347 through resistor R20, and position 1 of the switch 387 is coupled to pin 7 of the oneshot 351 through resistor R22. The values for the resistors R20 and R22 are the same as that discussed above to provide a 25 msec. time duration for oneshot 347 and a 160 msec. time duration for oneshot 351. With the movable contacts of switches 386 and 387 in position 1, the ambiguous track lock resolving circuitry is arranged for operation in the still frame mode wherein a single field is repetitively reproduced to generate a still display.

The three contact terminals (positions 2, 3 and 4) of switch 386 are coupled through resistors R24, R26 and R28, respectively, to pin 15 of the oneshot 347. Positions 2, 3 and 4 of the switch 387 are similarly coupled through resistors R30, R32 and R34 to pin 7 of the oneshot 351. The values for the resistors R26, R28 and R30 are selected to provide time durations of 46 msec. or 170 msec., respectively, of the oneshot 347. Similarly, the values for the resistors R30, R32 and R34 are selected to provide time durations of 320 msec., 640 msec. or 1280 msec., respectively, of the oneshot 351.

With the movable contact of the switches 386 and 387 respectively in one of the positions 2, 3 and 4, the ambiguous track lock resolving circuitry 342 is arranged for operation in one of the still frame modes, wherein a two (for monochrome frame), four (for NTSC or SECAM color frame) or eight (for PAL color frame) field sequence, respectively, is repetitively reproduced to generate a still display.

The values of the capacitors bridging the pins 15 and 14 of the oneshot 347 and pins 7 and 6 of the oneshot 351 remain unchanged in this embodiment. However, the capacitors could also be switched while maintaining the value of the resistors constant, or both the capacitors and resistors could be conjointly changed, to change the time constants of the oneshot circuits as required for the desired still frame operating mode.

When switches 384, 386 and 387 are in positions 2, 3 or 4, the processed drum tach pulses are divided by two, four or eight, respectively. Accordingly, the position of the transducing head 30 will be reset after scanning the second, fourth or eighth consecutive field of the recorded information as selected by the mechanically coupled switches 384, 386 and 387. However, the amplitude of the reset signal applied to the movable element 32 is correspondingly selected by the threshold circuitry operated in conjunction with the associated latches and gates as shown in FIG. 10d and described in greater detail hereinbelow. Because the movable contact of the switch 384 is ganged to operate with those of switches 386 and 387, the proper divided process drum tach signal is provided in the selected still frame mode for effecting issuance of the correcting head position reset signal to the movable element 32.

Thus, it may be appreciated that when the apparatus is operating in the still frame mode, an operator places the switches 384, 386 and 387 in position 1 for scanning a single field between resets of the transducing head 30. If, however, it is desired to scan two consecutive fields between resets of the head, such as for a complete monochrome frame, the operator places these switches in position 2. Position 3 of these switches will cause the transducing head 30 to scan four consecutive fields between resets which will produce a complete NTSC color frame, or a jitter-free color frame for SECAM television signals. The position 4 of these switches will cause the apparatus to produce a complete color frame from PAL television signals, when such signals are recorded on the tape.

The modified circuitry for generating the appropriate reset pulse of current that is coupled by line 132 (FIG. 3) to cause the integrator 134 to effect a correspondingly appropriate reset of the head position for the various single and multiple field still mode operations is shown in FIG. 10d. In the same manner as described hereinbefore, the variable threshold reference source 126 establishes head reset determining threshold voltage levels for the level detector 158 and associated AND gate 142 that generates, in response to the head deflection signal level on line 66, the appropriate forward head position reset current pulse placed on line 132 for operating modes below normal speed. Also, the level detectors 156 and 160 receive the fixed threshold voltage levels 1 track reverse and 1 track forward, respectively, for effecting the appropriate reset of the movable head 30 as described hereinbefore. For still mode operations, wherein a single television field is repetitively reproduced from the tape 30, the level detector 158 receives a threshold voltage from the reference source 126 corresponding to any head deflection in the reverse direction. At the occurrence of each processed drum tach pulse, the movable element 32 carrying head 30 will be in a deflected condition corresponding to reverse direction head deflection at the conclusion of the scan of the track by the head. Therefore, the level detector 158 enables the latch 172 which, when clocked places an enabling signal on one of the inputs of the associated AND gate 142, which passes the following reset pulse coupled to its other input by line 186 that extends from the flip-flop circuit 324 (FIG. 10a) of the pulse and clock generator 184 (FIG. 3). The single reset pulse pased by the AND gate 142 is converted by the resistor 148 to a pulse of current on line 132 at the conclusion of each revolution, hence, scan of a track, by the head 30, or at a frequency of 60 Hz in a 60 Hz field rate standard and at a frequency of 50 Hz in a 50 Hz field rate standard. This effects a 1 track forward reset of the head so that it rescans the track during its next revolution. As long as the record/reproduce apparatus is in the single field, still motion mode, the head 30 is repetitively reset by reset pulses of current generated by the AND gate 142 and associated resistor 148, whereby a single television field is repetitively reproduced from a repetitively scanned track.

For monochrome frame (composed of two interlaced odd and even television fields), still motion operating modes, level detectors 156 and 158, together with associated latches 170 and 172, AND gates 140 and 142 and current forming resistors 146 and 148, function to provide a two track forward reset current pulse over line 132 to the integrator 134, which responsively causes the repositioning of the movable head 30 after every two revolutions of the head to the track containing the first field of the repetitively reproduced two field sequence. This is accomplished by placing the movable contact of the switch 384 at the output of the eight bit divider circuit 380 (FIG. 10c) in position 2. With the switch 384 so positioned, the eight bit divider circuit 380 provides frequency divided processed drum tach pulse and reset pulse on lines 182 and 186, respectively, at the completion of every second revolution of the track scanning head 30, or at a frequency of 30 Hz in a 60 Hz field rate standard and at a frequency of 25 Hz in a 60 Hz field rate standard.

Since the reset current pulses will be provided to the integrator 134 after every two revolutions of the head 30, the integrator will provide a head deflection ramp signal, lasting for two head revolutions between consecutive reset current pulses, that deflects the movable element 32 a distance in the reverse direction corresponding to the distance separating three adjacent track centers. Therefore, upon the occurrence of the frequency divided processed drum tach pulse on line 182, both level detectors 156 and 158 are conditioned by the signal level on line 66 exceeding the threshold levels established for the latches, as described hereinbefore, to provide signals on lines 164 and 166, respectively, coupled to the D input of the latches 170 and 172 that enable the following associated AND gates 140 and 142 to pass frequency divided reset pulses when received over line 186. As described hereinbefore with reference to FIG. 3, the two reset pulses passed by the AND gates 140 and 142 are converted to corresponding current pulses by the resistors 146 and 148 and added together to produce a two track forward reset current signal on line 132. The two track forward reset signal causes the head deflection signal on line 66 to be reset and, thereby effect a two track forward deflection of the movable element 32 after each reproduction of a two field sequence. In this manner, a monochrome frame still image is provided by the record/reproduce apparatus for all television signal standards.

For color frame still motion operating modes with NTSC and SECAM standard signals, four consecutive television fields are repetitively reproduced in sequence to form the still motion color image. In these modes, a level detector 550, together with associated latch 552, AND gate 554 and resistor 556 connected to the output of the AND gate 554, function together to provide an additional two track forward reset current pulse over line 132 to the integrator 134. The impedance value of resistor 556 is selected to be one-half the value of the resistors 146 and 148 (resistors 146 and 148 being of equal value) so that a single reset pulse passed by AND gate 554 will be converted to a two track forward reset current pulse on line 132. In these still frame modes, AND gates 140 and 142 together also cause a two track forward reset current pulse to be provided over line 132, which is added to the additional two track forward reset current pulse to form a four track forward reset current signal for effecting a repositioning of the head 30 after four revolutions. The integrator 134 responds to the four track forward reset current signal on line 132 to cause the repositioning of the movable head 30 to the track containing the first field of a repetitively reproduced four field sequence after every four revolutions of the head. This is accomplished by placing the movable contact of the switch 384 at the output of the eight bit divider circuit 380 (FIG. 10c) in position 3. With the switch 384 so positioned, the eight bit divider circuit 380 provides frequency divided processed drum tach pulses and reset pulses on line 182 and 186, respectively, at the completion of every fourth revolution of the track scanning head 30, or at a frequency of 15 Hz in a 60 Hz field rate standard and at a frequency of 12.5 Hz in a 50 Hz field rate standard.

Since the reset current pulses will be provided to the integrator 134 after every four revolutions of the head 30, the integrator will provide a head deflection ramp signal, lasting for four head revolutions between consecutive reset current pulses, that deflects the movable element 32 a distance in the reverse direction corresponding to the distance separating four adjacent track centers. Therefore, upon occurrence of the frequency divided processed drum tach pulse on line 182, all level detectors 156, 158 and 550 are conditioned by the signal level on line 66 exceeding the threshold levels established for the latches to provide signals to the D input of the latches 170, 172 and 552, respectively, that enable the following associated AND gates 140, 152 and 554 to pass frequency divided reset pulses when received over line 186. For all color frame still motion modes, regardless of the television signal standard, a fixed head reset determining threshold voltage level is provided on line 558 extending to one of the inputs of the level detector 550 corresponding to a head deflection in the reverse direction equal to the distance separating the centers of four adjacent tracks.

As described hereinabove, the three reset pulses passed by the AND gates 140, 142 and 554 and converted by resistors 146, 148 and 556 to the appropriate pulse current levels are added together on line 132 to produce a four track forward reset signal at the input of the integrator 134. The four track forward reset current signal causes the head deflection signal on line 66 to be reset and, thereby, effect a four track forward deflection of the movable element 32 after each reproduction of a four field sequence. In this manner, either an NTSC or SECAM color (depending on the signals being reproduced) still motion image is provided by the record/reproduce apparatus.

For PAL standard color frame (composed of eight consecutive television fields) still motion operating modes, a level detector 560, together with associated latch 562, AND gate 564 and current forming resistor 566 connected to the output of AND gate 564 function together to provide an additional four track forward reset current pulse over line 132 to the integrator 134. To form the four track forward reset current pulse from a single reset pulse passed by AND gate 564, the impedance value of the current forming resistor 566 is selected to be one-quarter the value of resistors 146 and 148. In this still frame mode, AND gates 140, 142 and 554 also cause a four track forward reset current pulse to be provided over line 132, which is added to the additional four track forward reset current pulse to form an eight track forward reset current signal for effecting a repositioning of the head 30 after eight revolutions. The integrator 134 responds to the eight track forward reset current signal on line 132 to cause the repositioning of the movable head 30 to the track containing the first field of a repetitively reproduced eight field PAL color frame sequence after every eight revolutions of the head. This is accomplished by placing the movable contact of the switch 384 at the output of the eight bit divider circuit 380 (FIG. 10c) in position 4. With the switch 384 so positioned, the eight bit divider circuit 380 provides frequency divided processed drum tach pulses and reset pulses on lines 182 and 186, respectively, at the completion of every eighth revolution of the track scanning head 30, or at a frequency of 6.25 Hz in a 50 Hz field rate PAL standard.

Since the reset current pulses will be provided to the integrator 134 after every eight revolutions of the head 30, the integrator will provide a head deflection ramp signal, lasting for eight head revolutions between consecutive reset current pulses, that deflects the movable element 32 a distance in the reverse direction corresponding to the distance separating eight adjacent track centers. Therefore, upon the occurrence of the frequency divided processed drum tach pulse on line 182, all level detectors 156, 158, 550 and 560 are conditioned by the signal level on line 66 to provide signals to the D input of the latches 170, 172, 552 and 562 respectively, that enable the following associated AND gates 140, 142, 554 and 556 to pass frequency divided reset current pulses when received over line 186. For the PAL color frame still motion mode, a fixed eight track reverse reference threshold voltage level is provided over a line 572 extending to one of the inputs of the level detector 560. As described hereinabove, the four reset pulses passed by the AND gates 140, 142, 554, 564 and converted by resistors 146, 148, 556 and 566 to the appropriate current pulse levels, and added together on line 132 to produce an eight track forward reset signal at the input of the integrator 134. The eight track forward reset signal causes the head deflection signal on line 66 to be reset and, thereby, effect an eight track forward deflection of the movable element 32 after each reproduction of an eight field PAL color frame sequence. In this manner, a PAL color frame still image is provided by the record/reproduce apparatus. It should be appreciated that when the record/reproduce apparatus is not operated to reproduce multiple field still motion displays, the variable threshold reference source 126 is set to place disabling signals on lines 558 and 572 extending to one of the inputs of the level detectors 550 and 560, respectively. As described hereinbefore with respect to the function of level detector 154 in the other operating modes of the record/reproduce apparatus, this prevents the level detectors 550 and 560 from enabling their associated AND gates to pass reset pulses to the line 132 (FIG. 3) that controls the resetting of the integrator 134.

The modified portion of the automatic head tracking servo circuitry shown in FIG. 10d cooperates with the modified portion of the servo circuitry shown in FIG. 10c to provide the required reset pulse signal for the various still frame operating modes described hereinabove to prevent the servo system of the apparatus from locking in the ambiguous states described hereinabove. In this respect, line 574 extends from the NAND gate 345 (FIG. 10a), which provides the aforedescribed latch hold signal lasting for a period of ten reset pulses. The unmodified head tracking servo circuitry shown in FIGS. 10a and 10b is arranged to provide a latch hold signal only to the set terminal of the latch 172 because the servo circuitry is arranged to produce still motion displays from a single repetitively reproduced field and this requires only a one track forward reset of the head 30. In a monochrome frame still motion mode, a 2 track forward reset signal is required because two consecutive fields are repetitively reproduced. To provide a 2 track forward reset signal for the ten-reset-pulse period, a switch 576 is closed when operating in the monochrome frame still motion mode so that the set terminal of the latch 170 also receives the latch hold signal placed on line 574. Since both latches 170 and 172 are placed in the set state for the ten-reset-pulse period, their associated AND gates 140 and 142, respectively, are enabled for the same period, which, as described hereinbefore, results in the generation of a 2 track forward reset current signal on the line 132 extending to the input of the integrator 134.

In either an NTSC standard or SECAM standard color frame still motion operation, a 4 track forward reset current signal is required because four consecutive fields are repetitively reproduced. To provide a 4 track forward reset current signal for the ten-reset-pulse period, both switches 576 and 578 are closed when operating in all color frame still motion modes so that the set terminals of the latches 170 and 552 also receive the latch hold signal placed on line 574. Since the three latches 170, 172 and 552 are placed in the set state for the ten-reset-pulse period, their associated AND gates 140, 142 and 554, respectively, are enabled for the same period, which, as described hereinbefore, results in the generation of a 4 track forward reset current signal on line 132.

In the PAL color frame still motion mode, an 8 track forward reset current signal is required for the ten-reset-pulse period because eight consecutive fields are repetitively reproduced. To effect the generation of an 8 track forward reset current signal for the ten-reset-pulse period, a switch 580 is also closed so that the set terminal of the latch 562 also receives the latch hold signal placed on line 574. Since all of the latches are placed in the set state for the ten-reset-pulse period, their associated AND gates are enabled for the same period, which, as described hereinbefore, results in the generation of an 8 track forward reset current signal on line 132.

The exemplary embodiment of the automatic head tracking servo circuitry shown in FIGS. 10a and 10b have provisions for performing other special functions in accordance with certain input signals received. For example, because the head positioning error signal typically is a low rate error signal in normal speed operating modes, it is advantageous to sample the synchronous detector output signal on line 80 during the intermediate portion of the scan of a track by the rotating head 30. For this purpose, a normally open switch 122 (FIG. 10b) is interposed in the line 80 of the head position error feedback path extending between the output of the synchronous detector 78 and the input of the integrator 134. During normal speed modes, the AUTO TRK signal on input line 283 enables an NAND gate 429 to pass a DC GATE signal provided on input line 430. The DC GATE signal is derived from the 60 Hz drum tach signal and is delayed to occur intermediate of consecutive drum tach signals. The DC GATE signal is passed by the NAND gate as a low level pulse signal lasting for about 4 MSEC. If the automatic head tracking circuit shown in FIGS. 10a and 10b is switched on, the following low level AND gate 431 issues a high level pulse corresponding in duration to the DC GATE signal to enable the switch 122 to pass the low rate head positioning error signal to the integrator 134, which responds by adjusting the DC level of the head position servo correction signal provided on line 68 extending to the second summing circuit 69 (FIG. 12).

The automatic head tracking servo circuit also includes means to disable it in the event the drum portion 22 of the tape guide drum assembly 20 (FIG. 4), hence, movable head 30 is not rotating. If the drum portion 22 is not rotating, a low logic signal level is placed on input line 434 (FIG. 10b) that is processed by the logic circuitry 111 of the automatic head tracking servo circuit to provide disabling signals that open switches 312 and 316.

Frequently, a recorded tape will be placed back on different record/reproduce apparatus. In many instances, the recording apparatus and reproducing apparatus will be characterized by differential geometric head-to-tape tracking trajectory variations that lead to interchange errors. Because such geometric variations are random in nature, severe mistracking conditions can occur during reproduction operations. To facilitate the control of the movable head 30 so that the tracks of such recordings can be precisely followed, a switching means 433 is included in the dither oscillator 60 that is controllable by an operator to double the amplitude of the dither signal provided to the movable element 32 via the line 62. The twice amplitude dither signal is selected by an operator causing, through suitable control device, a high logic level AST RANGE signal to be placed on input line 435. Applying a twice amplitude dither signal to the movable element 32 has the effect of increasing the servo capture gain of the head tracking servo circuit, thereby extending the servo capture range.

As previously described herein, the movable element 32 has a limited range over which it can be deflected. For record/reproduce apparatus previously constructed for commercial applications, this range has been selected to be a distance corresponding to ±1.5 times the distance separating adjacent track centers. To facilitate tracking of the recorded information without the introduction of undesirable disturbing effects in the reproduced signals when the apparatus is operated in the aforedescribed extended range, the apparatus includes an automatic tape slew drive command signal generator 436, which is responsive to the combined DC error plus head deflection signal present on line 66a to generate one or more track slew tape drive commands on the appropriate one of the output lines 437 and 438. These lines extend to the capstan motor drive amplifier 220 for coupling the tape slew commands thereto. Because of the severe mistracking conditions encountered in the extended range operating mode, the movable element 32 frequently is displaced towards one of its limits. To maintain the movable element within its deflection range in such mode of operation, the generator 436 is arranged to provide a slew command to the capstan motor drive amplifier 220 whenever the deflection of the movable element 32 exceeds ±15% of the distance separating adjacent track centers. In this manner, the movable element 32 is maintained within its deflection range limits. In the event the movable element 32 exceeds the 15% deflection limit in the forward deflection direction, the head deflection threshold reference level associated with the tape slew reverse control is exceeded and SLEW REV commands are provided by the generator 436 over output line 438 to slow down, or reverse the direction of the transport of the tape 36, whichever is needed. SLEW FWD commands are provided by the generator 436 over line 437 when the movable element 32 exceeds the 15% deflection limit in the reverse deflection direction.

Turning now to FIGS. 11a, 11b and 11c, there is shown one embodiment of specific circuitry that can be used to carry out the operation of a portion of the transport servo illustrated by the block diagram of FIG. 8. The portions of the tape transport servo shown in the block diagram of FIG. 8 not included in FIGS. 11a, 11b and 11c are those previously identified, namely, the control track phase comparator 270, control track error window detector 276 and color frame detector 280, as being included in typical helical scan video record/reproduce apparatus that provide signals used by the tape transport servo to carry out its operations. Furthermore, the transport servo is arranged to control the transport of the tape 30 so that the record/reproduce apparatus can be operated to record and reproduce television signals of both 50 Hz and 60 Hz line standards. The 50/60 Hz signal level placed on the input line 338 sets the transport servo in the operating condition necessary for the television signal standard of concern. The specific circuitry shown in FIGS. 11a, 11b and 11c is arranged to control the transport of the tape when recording or reproducing NTSC television signals. For PAL and SECAM television signals, certain timing provided by the transport servo circuitry shown in FIGS. 11a, 11b and 11c is preferably changed to account for differences in the timing associated with such signals, which changes will be readily apparent from the following description of the transport servo and, hence, need not be described in detail herein.

The record/reproduce apparatus, for which the transport servo illustrated by FIGS. 11a, 11b and 11c is constructed, has several operating modes that can be selected through the operation of operator controls, with each operating mode requiring a different response from the illustrated transport servo. In slow/still operating modes, an operator initiated slow/still mode command ($\overline{\text{SLOW}}$) is placed on input line 353 (FIG. 11a) and is coupled thereby to condition the logic circuitry 224 (FIG. 8) so that the transport servo provides the required control of the transport of the tape 30. At tape transport speeds less than 95% normal speed, the transport servo provides velocity control of the transport of the tape 30.

With reference to FIG. 11a, velocity control of the tape transport at less than normal speeds during slow/still operating modes is provided by the variable slow motion control circuitry 240. The control circuitry generates the variable capstan drive for driving the capstan motor 202 (FIG. 8) within a speed range from a very slow speed up to a maximum of about 95% of normal speed. The operation of the entire circuitry 240 is described in detail in the aforementioned application of Mauch, Ser. No. 874,739. The variable width pulses generated by the variable slow motion control circuitry 240 for driving the capstan motor 202 in velocity control servo modes of operation at speeds below the crossover velocity of about 1/5 normal speed are provided on line 242 in response to the pulse reference signal received over input line 355, which is a level and gain adjusted signal corresponding to the setting of the potentiometer 240' (FIG. 8). At tape transport speeds below the cross-over velocity, a velocity drive control circuit 356, which is coupled to examine the output of the frequency discriminator circuit 210, issues a command over one of the control lines 230a that causes switch means 226 to connect the pulse drive output line 242 of the variable slow motion control circuitry 240 to the motor drive amplifier 220 (FIG. 8) via line 218 and disconnects the capstan and control track phase comparators 212 and 270 from the capstan motor drive circuitry. This circuit condition corresponds to the block diagram illustration of FIG. 8 with the movable contact means 228 of the switch means 226 in position 1.

The tachometer input appears on line 208 in the upper left corner of FIG. 11a and is coupled for processing by tachometer input processing circuitry 352, the processed capstan tachometer signal being coupled to the input of the velocity loop frequency discriminator 210. The velocity loop frequency discriminator is operatively connected to a velocity loop error amplifier 354 and the velocity drive switch control circuit 356 to provide velocity control over the transport of the tape 36. When the potentiometer 240' (FIG. 8) of the variable slow motion control circuitry is adjusted to cause the capstan 200 (FIG. 8) to be driven to transport the tape 36 at speeds within the range of about 1/6 to ⅓ normal speed, the velocity drive switch control circuit 356 responds to the velocity related signal level provided by the frequency discriminator 210 and a following integrating circuit 357 by issuing commands over control line 230a that toggles the switch means 226 respectively between its two conditions. As described in detail in the aforementioned Mauch application, Ser. No. 874,739, toggling switch means 226 alternately couples to the capstan motor drive amplifier 220 (FIG. 8) via line 218 the pulse drive signal present at line 242 of the variable slow motion circuitry 240 and the analog drive signal present on line 217, which is generated by the frequency discriminator 210 and associated circuitry in response to the tape velocity related signal in the form of processed capstan tachometer signals and a velocity reference signal generated by the velocity reference circuitry 250. At tape speeds in excess of ⅓ normal speed, the switch means 226 is maintained in a condition to couple the drive signal generated by the cooperative action of the velocity reference circuit 250 and the frequency discriminator 210. In these higher slow motion operating modes, the tape transport speed is controlled by the potentiometer 240' (FIG. 8), which is connected to provide the slow speed control signal on input line 363. A command placed on command line 252a by the logic circuitry 224 enables a switch means 362 to permit the slow sped control signal to be coupled to establish a voltage level at the input of an integrating circuit 359 of the velocity reference circuit 250 that corresponds to the setting of the potentiometer 240'. The output signal provided by the velocity reference circuit is coupled to one input of a summing junction formed by a summing amplifier 361 for subtraction with the velocity feedback signal, generated by the frequency discriminator 210 and coupled to another input of the summing amplifier 361. Any difference between the signals represents a tape velocity error and is coupled as a velocity error signal to the output line 217 of the velocity loop error amplifier 354 for application to the capstan motor drive amplifier 220 (FIG. 8) via switch means 226 and line 218.

The transport servo also provides velocity control over the transport of the tape 30 whenever the record/reproduce apparatus is operated to accelerate the tape to enter a normal reproduce mode of operation. A normal speed reproduce mode of operation is initiated by the operator activating controls that places a PLAY mode command signal on line 364, which causes the logic circuitry 224 to place the command on the command line 252b that results in the generation of a voltage step on line 363. The integrating circuit 359 responds to the voltage step by generating on its output line 254 a ramp signal of a fixed, selected interval for application to the summing amplifier 361. As described hereinbefore, the output of the summing amplifier is coupled to drive the capstan motor 202 and, when the summing amplifier 361 receives a ramp signal from the integrating circuit, the capstan motor 202 is caused to accelerate according to the slope of the ramp signal.

The tachometer reference divider 260 is shown in FIG. 11a and is controlled by control line 262 which has a low logic level when the tape 30 is transported at the 95% of normal tape speed and a high logic level when it is transported at 100% of normal tape speed, with the line 262 extending from logic circuitry shown in FIG. 11c. The transport servo is placed in the capstan tach phase lock mode by an operator initiated PLAY mode command coupled to input line 364. Initially, the transport servo logic circuitry places the transport servo in the aforedescribed acceleration mode of operation for a predetermined acceleration interval of about 0.5 sec., if the tape 30 is stopped at the time the PLAY mode command is received and a correspondingly shorter time if the tape is already in motion when the PLAY command is received. The interval is set to provide sufficient time for the servo to establish the desired velocity controlled servo lock condition. A one-shot 365 provides a settling delay of about 0.3 sec. after control of the transport servo is switched to the capstan tach phase comparator 212. Upon initiation of the 0.3 sec. settling delay interval, the logic circuitry issues a command over one of the control lines 230b to close the switch 232a (FIG. 11c) and, thereby, allow the capstan phase comparator 212 to be coupled to control the capstan drive. In addition, the logic circuitry places a low logic level on line 262, which causes the variable divider 260 to generate a 95% normal speed mode servo reference signal from the 64H clock on input line 264, which reference signal is coupled by line 258 to the input of the capstan tachometer servo loop phase comparator 212 (FIG. 11c). Any phase error between the capstan tach signal received on input line 208 and the 95% normal speed mode servo reference signal is detected by the phase comparator 212, which responsively provides a proportionate voltage level signal on the input line 369 of a tachometer lock error amplifier 360 shown in FIG. 11c.

The output of the tachometer loop error amplifier 360 is coupled by the closed switch 232b (which corresponds to the movable contact means 234 of the switching means 232 shown in FIG. 8 being in position 2) to line 244 that extends to the summing junction 214 and, as described hereinbefore, eventually to the capstan drive amplifier via line 218 for driving the capstan 200 under the desired capstan tach phase lock conditions.

Servo control of the transport of the tape 30 is switched from 95% normal speed capstan tach phase lock mode to the 100% normal speed capstan tach phase lock mode when the initial color framing is complete, i.e., the correct field sequence for proper color frame conditions is reproduced, and the detected control track error is within the aforedescribed ±10% window defined by the control track servo reference signal, so that the initial color frame condition will not be lost when servo control is switched. The logic circuit portion 374 (FIG. 11b) primarily coordinates the acquisition of the correct field for reproduction operations and controls the switching of the transport servo system from the capstan tach phase lock mode to the control track phase lock mode. When the initial color frame operation performed with respect to the reproduced control track signal is complete, the color frame detector 280 (FIG. 8) provides a high logic signal level, designated CT COLOR FRAME, at its output on line 284a (FIG. 11b), which extends to a pair of cascaded D latches 373 included in the portion 374 of the logic circuitry. Also, a studio reference signal, designated CT REF, is coupled by the line 284b to the clock input of the first of the cascaded D latches 373. The CT REF signal is a 30 Hz logic level changing signal having a low-to-high logic signal level transition displaced in time relative to the occurrence of the 30 Hz studio control track reference by an amount equal to 1/60 sec. This signal serves to clock the level of the CT COLOR FRAME signal present on line 284a to the second of the cascaded D latches. When the control track error signal present on line 274 at the output of the control track phase comparator 270 is within the aforedescribed ±10% error window, the control track error window detector circuit 276 (FIG. 8) generates a high logic signal level, designated CT WINDOW, on line 278 extending to the clock input of the second of the cascaded D latches 373. If this occurs following the establishment of the proper color frame reproduction conditions, the low-to-high signal level transition of the CT WINDOW signal clocks the proper complementary logic signal levels at the output of D latch circuitry 373. These signals condition the following logic circuitry to cause a high logic signal level to be placed on line 262, which sets the variable divider 260 to generate a 100% normal speed mode control track servo reference signal. This servo reference signal is coupled to line 258 that extends to the input of the capstan tachometer servo loop phase comparator 212. Because at this time the tape 30 is being transported at a speed corresponding to 95% of the normal speed, the capstan tach phase comparator 212 generates an error signal that is processed by the tachometer lock error amplifier 360 to provide a corresponding capstan motor drive signal for accelerating the transport of the tape 36 to the normal speed characteristic of normal motion reproduction operations. After a settling interval of about 0.6 sec. determined by the active interval determining time constant of the one-shot 371, the logic circuitry 224 generates a CT SERVO command over control line 230c (FIGS. 11c) that closes switch 232b while simultaneously opening the switch 232a by terminating the switch closure command on line 230b. Placing switches 232a and 232b in the aforedescribed states corresponds to the movable contact means 234 of the switching means 232 shown in FIG. 8 being in position 3. Opening the switch 232a removes the capstan tach phase comparator 212 from tape transport servo loop. The closed switch 232b couples the control track error signal generated by the control track phase comparator 270 on the line 274 to the summing junction 214 and, as described hereinbefore, eventually to the capstan motor drive amplifier 220 (FIG. 8) for providing the drive to the capstan 200 under the desired control track phase lock conditions.

As previously discussed herein, the control of the tape transport servo is coordinated with the control of the automatic head tracking servo circuitry shown in FIGS. 10a and 10b. This coordination is accomplished primarily by the portion 370 of the logic circuitry shown in FIGS. 11b and 11c, which couples the appropriate coordinating control signals to the automatic head tracking servo circuitry over lines 372a, 372b, 372c and 372d. When the apparatus is operating in the slow/still mode, the logic circuitry portion 370 places a low logic signal level on line 372a that enables the automatic head tracking servo circuitry to control the position of the movable head during slow/still modes of operation. When the apparatus is operating in the capstan tach phase lock mode during both the 95% and 100% normal speed modes, the logic circuitry portion 370 places a low logic signal level on line 372b after the control of the transport servo is switched to the capstan tach phase lock mode. This signal is designated AST TACH and is coupled by line 372b to condition the automatic head tracking servo circuitry to control the position of the movable head during capstan tach phase lock mode that occurs during the 95% and 100% normal speed operating modes. When the transport servo is commanded to accelerate the tape 36 to a speed corresponding to 100% normal speed, the logic circuitry portion 370 places a low logic level pulse 503 (FIG. 16) on line 372c, which has a duration of about 0.6 sec. This signal, designated 100% TACH, is coupled to the automatic head tracking servo to condition it for controlling the position of the movable head at the completion of the initial capstan tach phase lock mode portion of the 100% normal speed mode. As described hereinbefore, the presence of the 100% TACH pulse signal at the input of the inverter 450 (FIG. 10a) disables the level detector 158 by conditioning the associated open collector gates of the variable reference threshold level source 126 to place a high voltage level on line 196. Consequently, only the level detectors associated with 1 TRK REV and 1 TRK FWD threshold levels are enabled to control the position of the movable head 30 during the b 100% normal speed mode. Furthermore, the trailing edge 503a (FIG. 16) of the 100% TACH pulse enables the color frame verification circuitry 340 to respond to the FIELD MISMATCH signal present at the one of the inputs of the AND gate 441 to reposition the movable head 30 a distance in the appropriate direction corresponding to the distance separating adjacent track centers in the event a field mismatch is detected at the time control of the transport servo is switched to the control track phase comparator 270 (FIG. 8).

Synchronous reproduction of the recorded signals under automatic tracking servo conditions is commenced in response to the provision of the AUTO TRK signal on line 372d at the conclusion of the 100% TACH signal if an AST AUTOTRK enabling mode command signal is received on input line 358 as a result of an operator initiated control switch. The AUTO TRK signal occurs simultaneously with the presence of the CT SERVO signal on the control line, which as described hereinabove, inserts the control track phase comparator 270 in the transport servo for controlling the transport of the tape. The AUTO TRK signal is coupled to mode control line 285 of the automatic head tracking servo to condition it for controlling the movable head during the normal speed mode as previously described herein.

The exemplary embodiment of the transport servo shown in FIGS. 11a, 11b and 11c have provisions for performing other special functions in accordance with certain input signals received. For example, the logic circuitry 224 includes means to inhibit sequencing of transport servo if certain operating conditions are not satisfied. If the drum portion 22 is not rotating, hence, record and reproduce operations not being carried out, a DRUM OFF high logic signal level is provided by the apparatus on input line 368 (FIG. 11a) that inhibits the logic circuitry sequence. Similarly, in the event reproduced video is not present, the apparatus inhibits the logic circuitry sequence by removing an enabling high logic level RF PR signal from the input line 375 (FIG. 11b). If the video signal is being reproduced from a tape that does not include a recorded control track signal (or the control track signal is momentarily lost), the logic circuitry sequence is interrupted at (or returned to) the 95% normal speed mode condition and servo control of the transport of the tape 30 is retained by the capstan tach phase comparator 212 as a result of the removal of the high logic level CT PR signal from input line 376 (FIG. 11b). Automatic resumption of the transport servo sequencing occurs if the switch 293 (FIG. 11b) has its movable contact in the AUTO position. If the switch 293 is in the MAN position, resequencing of the transport servo is initiated by causing one of mode commands to be placed on an input line to the transport servo.

The transport servo is also arranged to permit control of the transport of the tape 30 with respect to a remotely occurring event, such as the recording on a remotely located record/reproduce apparatus of the video signal reproduced by the record/reproduce apparatus controlled by the illustrated transport servo. Program editing is an example of this. In such operations, the transport of tape 30 must be carefully controlled relative to the transport of the remotely located tape so that the reproduction of the video signal from the tape 30 is initiated at the desired instant. To release the transport servo to remote control, an operator initiated low logic signal level, designated TSO mode command, is placed on the input line 377 (FIG. 11b). The logic circuitry responds to the TSO mode command signal by placing the transport servo in the velocity servo mode and enabling the tape speed override circuitry 378 (FIG. 11c) to couple on external velocity reference signal to the input of the summing amplifier 361 (FIG. 11a) for comparison with the velocity feedback signal generated by the frequency discriminator 210. Thusly, the tape 30 is transported at a speed determined by the external velocity reference signal present at the input line 379 of the tape speed override circuitry 378.

Reverse tape drive operations are controlled by the transport servo by coupling operator initiated mode command signals, designated REV JOG ENABLE and REV JOG SWITCH, to the input lines 290 and 291, respectively. The generation of these two signals is initiated by adjusting the potentiometer 240' (FIG. 8) to provide reverse velocity drive. Signal processing circuitry, like that provided for processing the PULSE REF and SLOW SPEED CONTROL signals, generates the REV JOG ENABLE and the REV JOG SWITCH signals. The REV JOG SWITCH mode command signal is coupled to place the capstan motor 202 in the reverse drive operating condition, as long as the reverse tape velocity is less than about ⅓ normal tape speed. The REV JOG ENABLE mode command signal conditions the variable slow motion control circuitry 240 to provide reverse tape motion velocity control in the same manner as described hereinbefore with respect to forward tape motion velocity control at reverse tape speeds less than about ⅓ normal tape speed.

From the foregoing description, it should be appreciated that a method and apparatus has been described which is particularly adapted for use with a signal record/reproduce apparatus of the type which has a transducing head that is movable to automatically follow a track during the transfer of information with respect to the record medium and which can then move the transducing head to the appropriate track depending upon a mode of operation of the apparatus. By uniquely controlling the interaction of the transport servo system that controls record medium movement as well as the automatic tracking circuitry that controls transducing head movement, non-disruptive, noise free transfers of information, such as a video image can be maintained, even though significantly different circuit operations occur. The resulting advantages are most evident in the absence of disturbing effects in the transferred information during the mode transitions, which are important operational considerations in commercial broadcasting of television information where such problems are avoided wherever possible. In addition, by employing processed signals generated by the dither motion of the movable element itself as reference signals for the automatic head tracking circuitry, any changes in the natural resonant frequency of the transducing head assembly are automatically compensated. An exemplary advantage of this arrangement is that fewer manual adjustments are required following replacement of the transducing head assembly.

It should be understood that although preferred embodiments of the present invention have been illustrated and described, various modifications thereof will become apparent to those skilled in the art; and, accordingly, the scope of the present invention should be defined only by the appended claims and equivalents thereof.

Various features of the invention are set forth in the following claims.

What is claimed is:

1. In a recording and/or reproducing apparatus having transducing means operatively supported for transferring information with respect to tracks along a record medium, the transducing means mounted on movable means for displacing the transducing means in opposite directions in response to a signal being applied thereto, the combination comprising:
   means for generating an oscillatory signal coupled to effect oscillatory motion of said movable means;
   signal generating means responsive to the oscillatory motion of said movable means for generating an oscillatory motion signal having a selected frequency component corresponding to the oscillatory motion of said movable means;
   means responsive to the oscillatory motion of said movable means for generating a signal corresponding to the position of said transducing means relative to the tracks along the record medium;
   means responsive to said signal representative of the motion of said movable means for producing a reference signal that is in correspondence with said motion, said means for producing the reference signal including means for filtering said selected frequency component from said oscillatory motion signal for generation of said reference signal, said means for filtering comprising a commutating capacitor filter operative in response to the oscillatory signal and higher frequency reference timing signal for filtering the selected frequency component from the oscillatory motion signal; and
   means responsive to said signal corresponding to the position of said transducing means relative to the tracks along the record medium and said reference signal and coupled to the movable means for controlling the position of the movable means.

2. The apparatus as in claim 1 further characterized by said means for producing the reference signal includes wave-shaping means coupled to an output of said means for filtering for forming said reference signal from the filtered frequency component.

3. In a recording and/or reproducing apparatus having transducing means operatively supported for transferring information with respect to tracks along a record medium, the transducing means mounted on movable means for displacing the transducing means in opposite directions in response to a signal being applied thereto, the combination comprising:

means for generating an oscillatory signal coupled to effect oscillatory motion of said movable means;

signal generating means responsive to the oscillatory motion of said movable means for generating a signal representative of the motion of said movable means;

means responsive to the oscillatory motion of said movable means for generating a signal corresponding to the position of said transducing means relative to the tracks along the record medium, said signal corresponding to the position of the transducing means being a first AC signal of a frequency corresponding to that of the oscillatory signal applied to the movable means;

means responsive to said signal representative of the motion of said movable means for producing a reference signal that is in correspondence with said motion, said reference signal producing means providing a second AC signal of a frequency corresponding to that of the oscillatory signal applied to the movable means; and means responsive to said signal corresponding to the position of said transducing means relative to the tracks along the record medium and said reference signal and coupled to the movable means for controlling the position of the movable means, said transducer position controlling means including a synchronous detector responsive to the AC signals for controlling the movable means in accordance with the phase and amplitude relationship of said first and second AC signals.

4. The apparatus as in claim 3 wherein the signal representative of the motion of the movable means is an oscillatory motion signal having a selected frequency component corresponding to the oscillatory motion of said movable means, and said means for producing the reference signal includes a controllable filter means coupled to receive the oscillatory motion signal and the oscillatory signal generated by the signal generating means and responsive to pass the selected frequency component of the oscillatory motion signal for providing the reference signal.

* * * * *